US010429183B2

(12) United States Patent
Johnson

(10) Patent No.: US 10,429,183 B2
(45) Date of Patent: Oct. 1, 2019

(54) NON-CONTACT COORDINATE MEASURING MACHINE USING HYBRID CYCLIC BINARY CODE STRUCTURED LIGHT

(71) Applicant: Philip M. Johnson, Durham, NH (US)

(72) Inventor: Philip M. Johnson, Durham, NH (US)

(*) Notice: Subject to any disclaimer, the term of this patent is extended or adjusted under 35 U.S.C. 154(b) by 0 days.

(21) Appl. No.: 15/711,238

(22) Filed: Sep. 21, 2017

(65) Prior Publication Data

US 2018/0080766 A1 Mar. 22, 2018

Related U.S. Application Data

(60) Provisional application No. 62/397,630, filed on Sep. 21, 2016.

(51) Int. Cl.
| | |
|---|---|
| *G01C 3/00* | (2006.01) |
| *G01S 17/00* | (2006.01) |
| *G01C 3/08* | (2006.01) |
| *G01S 13/06* | (2006.01) |
| *G01S 17/02* | (2006.01) |
| *G02B 26/10* | (2006.01) |
| *G01B 11/00* | (2006.01) |
| *G01B 11/25* | (2006.01) |
| *G02B 9/34* | (2006.01) |

(52) U.S. Cl.
CPC .............. *G01C 3/08* (2013.01); *G01B 11/005* (2013.01); *G01B 11/2513* (2013.01); *G01B 11/2545* (2013.01); *G01S 13/06* (2013.01); *G01S 17/02* (2013.01); *G02B 9/34* (2013.01); *G02B 26/10* (2013.01)

(58) Field of Classification Search
USPC ......................................... 367/3.09; 356/3.09
See application file for complete search history.

(56) References Cited

U.S. PATENT DOCUMENTS

| | | | |
|---|---|---|---|
| 2,632,058 A | 3/1953 | Gray | |
| 3,799,675 A | 3/1974 | Johnson et al. | |
| 4,015,253 A * | 3/1977 | Goldstein ............. | H03J 5/0272 116/257 |
| 4,846,577 A | 7/1989 | Grindon | |
| 5,371,608 A | 12/1994 | Muto et al. | |
| 5,410,399 A | 4/1995 | Johnson | |

(Continued)

OTHER PUBLICATIONS

International Search Report & Written Opinion dated Nov. 17, 2017, issued in PCT Patent Application No. PCT/US2017/052673, 14 pages.

(Continued)

*Primary Examiner* — James R Hulka
(74) *Attorney, Agent, or Firm* — Grossman Tucker Perreault & Pfleger PLLC

(57) ABSTRACT

Technologies for determining positional coordinates on the surface of an object are disclosed. In some embodiments the technologies utilize a code drum to encode incident light into structured light and non-structured light that is projected on the surface of the object being measured. The code drum may include a plurality of hybrid cyclic binary code (HCBC) patterns, wherein the plurality of HCBC patterns include a plurality of weighted numbering system patterns, and a plurality of unweighted numbering system patterns. Systems and methods for measuring positional coordinates on a surface of an object being measured are also described.

24 Claims, 54 Drawing Sheets

(56) References Cited

U.S. PATENT DOCUMENTS

| | | | |
|---|---|---|---|
| 6,379,632 B1 | 4/2002 | Kinoshita et al. | |
| 6,700,645 B1 | 3/2004 | Shigematsu | |
| 7,366,425 B2 * | 4/2008 | Mamyshev | H04B 10/505 |
| | | | 398/188 |
| 8,586,287 B2 | 11/2013 | Tonchev et al. | |
| 9,479,757 B2 * | 10/2016 | Michel | G02B 5/04 |
| 2003/0175036 A1 | 9/2003 | Mamyshev et al. | |
| 2013/0052592 A1 * | 2/2013 | Tonchev | G03F 1/60 |
| | | | 430/320 |
| 2014/0320605 A1 | 10/2014 | Johnson | |
| 2015/0301468 A1 * | 10/2015 | Adachi | G03G 15/0142 |
| | | | 399/301 |
| 2016/0173855 A1 | 6/2016 | Michel et al. | |

OTHER PUBLICATIONS

Joseph E. Petrzelka, et al., Laser Direct Write System for Fabricating Seamless Roll-to-Roll Lithography Tools, Massachusetts Institute of Technology, Proc of SPIE vol. 8612, 861205, Mar. 9, 2013, 15 pages.

Texas Instruments, TIDA-00254: Accurate Point Cloud Generation for 3D Machine Vision Applications Using DLP® Technology and Industrial Camera, Users Guide, Literature No. DLPU019A, Aug. 2014, 61 pages.

F.G. Heath, Origins of the Binary Code, Scientific American, Aug. 1972, 6 pages.

\* cited by examiner

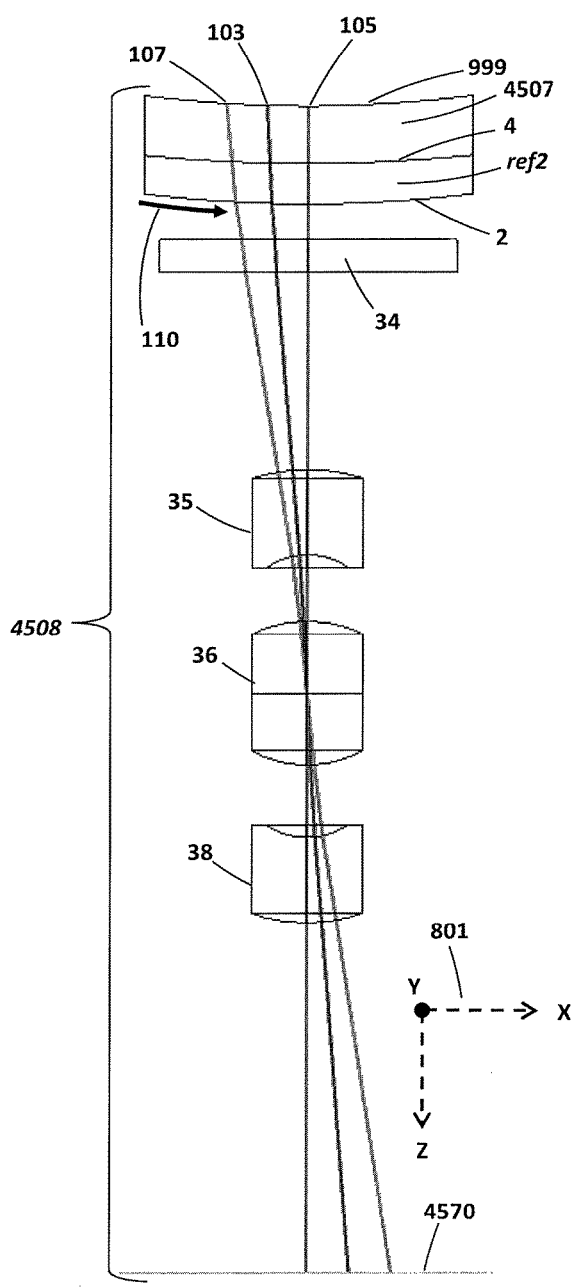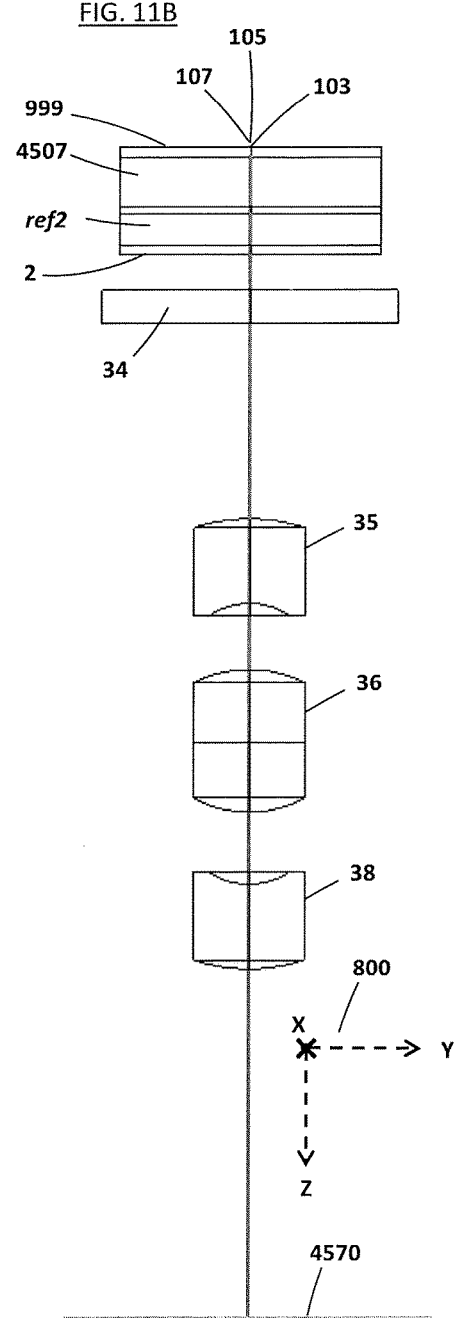

GRAY CODE
MODELED AS A SET OF 2-D PATTERNS
GRAY CODE MODELED AS A SET OF
CHARACTERISTIC SQUARE WAVES
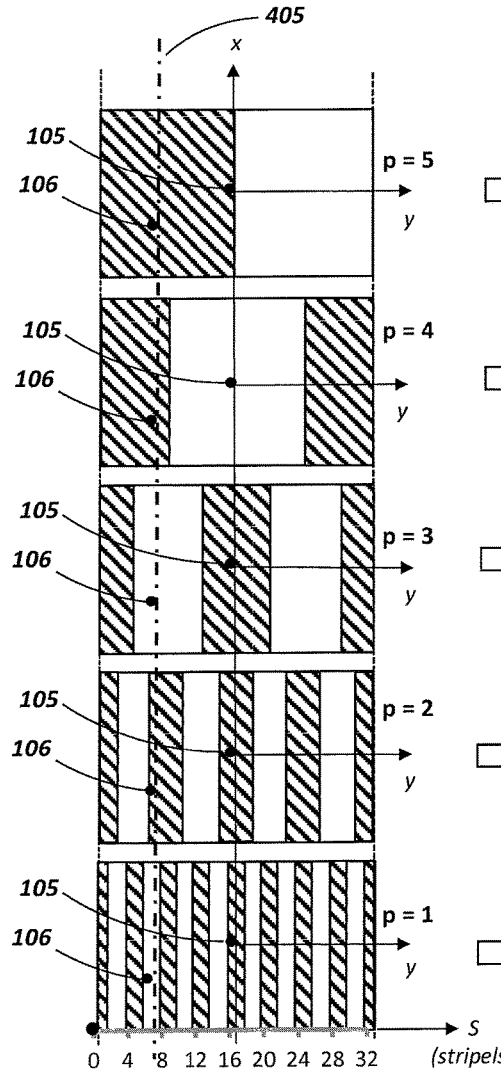
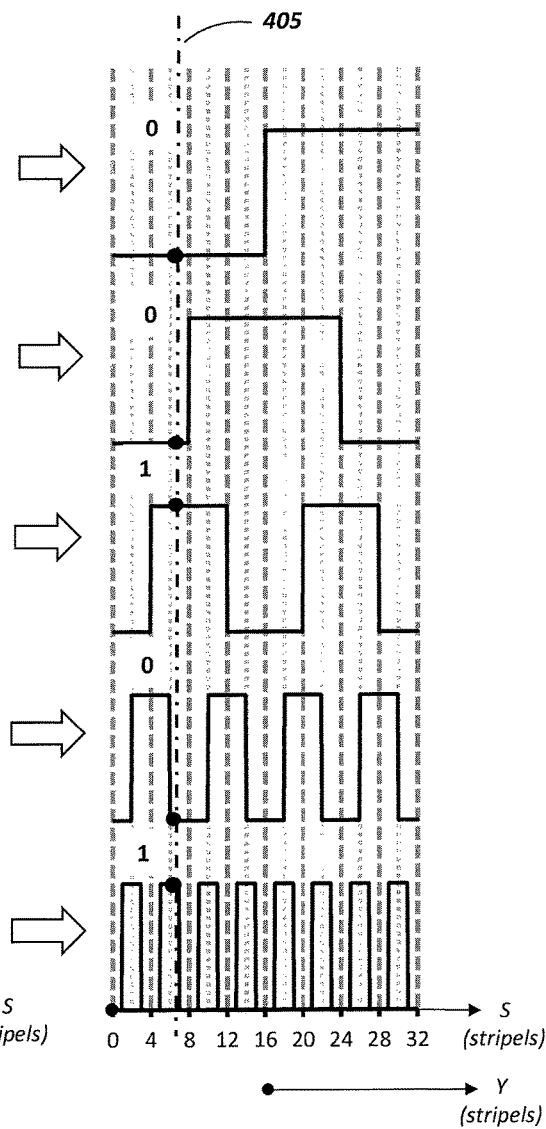
FIG. 19A
PRIOR ART
FIG. 19B
PRIOR ART

| Minimum Square Wave Period $A_{MIN}$ | Number of Encoded Stripels $N_s$ | | | | | | | | | | | | | Required Total No. Unweighted Patterns |
|---|---|---|---|---|---|---|---|---|---|---|---|---|---|---|
| | 16 | 32 | 64 | 128 | 256 | 512 | 1,024 | 2,048 | 4,096 | 8,192 | 16,384 | 32,768 | 65,536 | |
| | Required Total No. of HCBC Weighted Plus Unweighted Numbering System Patterns or Bits $p_{max}$ | | | | | | | | | | | | | |
| 4 | 4 | 5 | 6 | 7 | 8 | 9 | 10 | 11 | 12 | 13 | 14 | 15 | 16 | 0 |
| 8 | 5 | 6 | 7 | 8 | 9 | 10 | 11 | 12 | 13 | 14 | 15 | 16 | 17 | 3 |
| 16 | 8 | 9 | 10 | 11 | 12 | 13 | 14 | 15 | 16 | 17 | 18 | 19 | 20 | 7 |
| 32 | 15 | 16 | 17 | 18 | 19 | 20 | 21 | 22 | 23 | 24 | 25 | 26 | 27 | 15 |
| 64 | 30 | 31 | 32 | 33 | 34 | 35 | 36 | 37 | 38 | 39 | 40 | 41 | 42 | 31 |
| 128 | 61 | 62 | 63 | 64 | 65 | 66 | 67 | 68 | 69 | 70 | 71 | 72 | 73 | 63 |
| 256 | 124 | 125 | 126 | 127 | 128 | 129 | 130 | 131 | 132 | 133 | 134 | 135 | 136 | 127 |
| 512 | 251 | 252 | 253 | 254 | 255 | 256 | 257 | 258 | 259 | 260 | 261 | 262 | 263 | 255 |
| 1,024 | 506 | 507 | 508 | 509 | 510 | 511 | 512 | 513 | 514 | 515 | 516 | 517 | 518 | 511 |
| 2,048 | 1,017 | 1,018 | 1,019 | 1,020 | 1,021 | 1,022 | 1,023 | 1,024 | 1,025 | 1,026 | 1,027 | 1,028 | 1,029 | 1,023 |
| 4,096 | 2,040 | 2,041 | 2,042 | 2,043 | 2,044 | 2,045 | 2,046 | 2,047 | 2,048 | 2,049 | 2,050 | 2,051 | 2,052 | 2,047 |
| 8,192 | 4,087 | 4,088 | 4,089 | 4,090 | 4,091 | 4,092 | 4,093 | 4,094 | 4,095 | 4,096 | 4,097 | 4,098 | 4,099 | 4,095 |

Number of required HCBC patterns or binary bits as a function of the chosen total number of stripels and the chosen minimum square wave period.

FIG. 28C

NON-CONTACT COORDINATE MEASURING MACHINE USING HYBRID CYCLIC BINARY CODE STRUCTURED LIGHT

BACKGROUND

The present disclosure relates to a non-contact coordinate measuring machine (CMM) incorporating an electro-optical sensor using a new structured light code. Some past CMM's have made use of mechanical stylus probes which contact the surface being measured at a single point. Such machines can measure a few selected coordinates on precision-manufactured parts with an accuracy of the order of 1-5 microns (0.00004 to 0.0002 inches). However, there is growing interest in the possibility of replacing the mechanical stylus with a non-contact optical sensor of comparable or better accuracy, faster measurement, and a denser spacing of measurement points.

Non-contact three dimensional (3D) optical sensors using a single scanned projected laser line are now commercially available. One or two digital cameras view the reflected light from the object's surface at a different angle from the laser light direction, enabling the distance to points on the surface to be measured by triangulation. Although this arrangement increases the area scan rate beyond that possible with a stylus probe, the reported accuracy of currently available sensors of this type does not yet appear to match the accuracy of traditional stylus-type CMM's.

Sequential projection of structured light patterns covering more area than a single laser line on the surface being measured has been considered as a potential means to increase area scan rate and accuracy. One type of structured light that has recently received discussion and experimentation is based upon an optical implementation of the binary Gray code. See for example "*Accurate Point Cloud Generation for* 3D *Machine Vision Applications using DLP® Technology and Industrial Camera*", Texas Instruments Application Report TIDA-00254 Test Results, June, 2014.

Projected Gray code patterns are two-dimensional clear and opaque grating patterns, alternately called bar patterns, and sometimes stripe patterns. There are several unique bar patterns in the Gray code sequence, each with a different periodicity. The coded dimension is perpendicular to the long side of the bars while the length of the bars may be changed as desired to change the area coverage. There is a potential scan rate advantage with Gray code structured light as compared to a single projected laser line system because of its area coverage.

More background concerning the Gray code is provided by the reference "*Origins of the Binary Code*", F. G. Heath, Scientific American, August 1972. In that reference, the author states that what is now called the Gray code was first used in France in the mid to late 19'th century by Emile Baudot to eliminate ambiguities in coding and print-out of telegraphic signals. Baudot's name for the code is reported to be "cyclic-permuted code".

On Mar. 17, 1953, Frank Gray of the Bell Telephone Laboratory was granted U.S. Pat. No. 2,632,058, in which he claimed a "reflected binary code", now generally called the "Gray code". It should be noted that this use of the word "reflected" refers to an even symmetry in the code pattern geometry rather than any physical ability to reflect light. Although Gray did not describe his code as cyclic or periodic, it can be seen in FIG. 2 of U.S. Pat. No. 2,632,058 that it is periodic and therefore also cyclic. It is "reflected" for all patterns except the most significant one, which has a single knife edge transition from black to white and was designated by Gray as a sign bit.

It can also be seen from FIG. 2 in U.S. Pat. No. 2,632,058 that the shortest period of a cyclic Gray code used for any purpose is equal to the width of four digital resolution elements. When that code is used to create structured light, an ideal spatial waveform of the minimum period pattern is a square wave having exactly one-half period with full illumination and exactly one half period with zero illumination.

Although many CMM's have been developed and are useful, there is an interest in new CMM technologies with reduced measurement error.

BRIEF DESCRIPTION OF THE DRAWINGS

FIG. 11A is a 3D layout of the projector's optical imaging lens group in an X-Z view showing three example chief rays passing through an absorbing cylindrical lens, in accordance with embodiments of the present disclosure.

FIG. 11B is a Y-Z view of the 3D layout in FIG. 11A, in accordance with embodiments of the present disclosure.

FIG. 19A illustrates an example sequence of five two-dimensional slides projected in sequence to encode 32 resolution elements with Gray code structured light, consistent with the prior art.

FIG. 19B illustrates a graphical means of defining a prior art Gray code sequence using characteristic square waves, consistent with the prior art.

FIG. 28C is a numerical table of the number of required HCBC patterns as a function of chosen total number of stripels and chosen minimum waveform period, in accordance with embodiments of the present disclosure.

DETAILED DESCRIPTION

Figure 1:
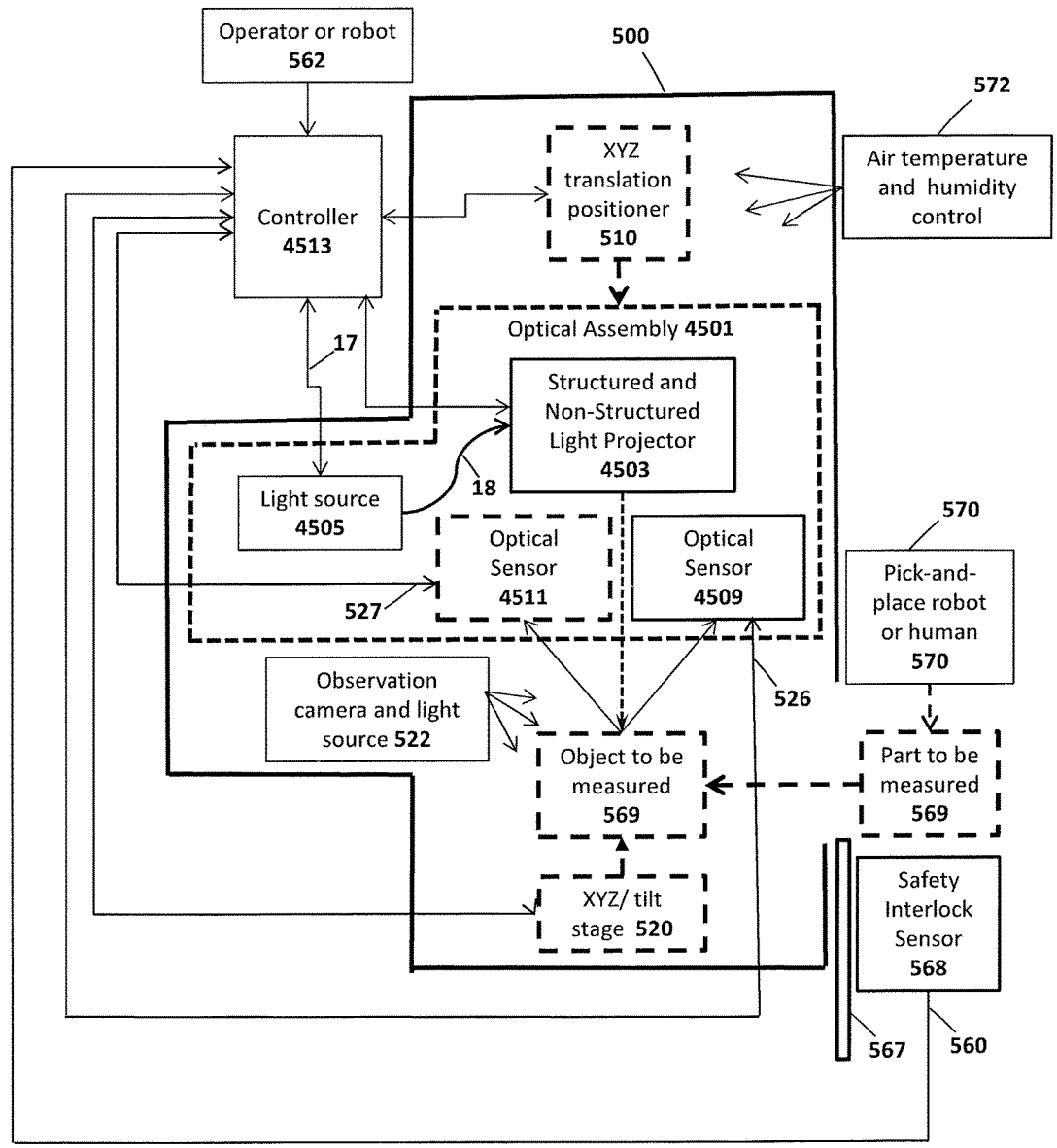
FIG. 1 is a system block diagram showing the major components of an example non-contact coordinate measuring machine, in one non-limiting example consistent with various embodiments of the present disclosure.

The following terms, names, symbols, and conventions are used throughout the present disclosure:

1. "ABS(Number)" means the absolute value of (number).

2. The acronym "BDRF" means Bidirectional Reflectance Distribution Function (BRDF), a function of four real variables that defines how light is reflected at an opaque surface.

3. The term "bit" in the present disclosure means a binary value (either "one" or "zero") in either a non-weighted or a weighted binary numbering system. Also in the present disclosure the binary value of a signal associated with a projected single pattern with index p may be called a "bit" value.

4. The acronym "3D" means Three-Dimensional.

5. The acronym "CMOS" means Complementary Metal Oxide Semiconductor.

6. The acronym "CMM" means Coordinate Measuring Machine.

7. The acronym "FPA" means focal plane array of an optical sensor (e.g., a digital camera), and is used in this disclosure to indicate a 2-D camera pixel array whether or not it is located exactly at a camera focal plane.

8. The term "binary pattern" refers to a pattern characterized by two and only two different values of optical transmission.

9. The acronym "HCBC" means Hybrid Cyclic Binary Code, a new arrangement of physical structures such as binary (clear or opaque) grating patterns for the purpose of determining linear or angular displacement, disclosed herein for use in a structured light CMM, but may also be useful for other purposes. The term "hybrid" refers to the fact that this code makes use of a combination of both weighted and non-weighted binary numbering systems, as opposed to using a pure weighted binary numbering system such as in prior art Gray code and natural binary code.

10. The acronym "ERP" means Extrapolation Reference Point.

11. The acronym "LED" means Light Emitting Diode.

12. The acronym LSF means "Line Spread Function" and is synonymous with "1-D optical blur" or "line blur."

13. The term "MOD" means the mathematical "modulo" function as provided in Microsoft® Excel® computer software. It may be convenient for use with periodic functions such as the characteristic square waves described in this disclosure and is described graphically in FIG. 29C.

14. The terms "MSB" and "LSB" in any form of structured light binary code respectively mean the most significant and least significant "bit" respectively, and may be also applied to patterns in a pattern sequence, specifically meaning the patterns with the longest and the shortest repetition periods.

15. The acronym "NA" means Numerical Aperture, which is an optical design term for the reciprocal of the product of the sine of a maximum ray angle and the refractive index of the medium in which the ray is located.

16. The acronym "NLC" means Non-Linearity Compensation.

17. The acronym "NSL" means Non-Structured Light.

18. The term "optical sensor" is used herein to generally refer to a device that can sense light. In embodiments, an optical sensor may be or include a focal plane array and/or one or a plurality of camera pixels. The optical sensors described herein may also include an imaging lens.

19. The acronym "PSF" means "Point Spread Function" and is synonymous with "2-D optical blur spot" or "point blur."

20. The acronym "RMS" means Root Mean Square.

21. The acronym "SBM" means Surface Being Measured.

22. "Scheimpflug" is an improved focus condition achieved by tilting and decentering a camera FPA with respect to the camera's optical axis when imaging or projecting to a tilted reference plane.

23. The term "slide" means a periodic (cyclic) bar pattern or a uniform optical transmission reference feature located at a projector's object surface. It is often used interchangeably with "pattern."

24. The term "code drum" refers to a spinning transparent cylindrical shell, which carries a number of precision HCBC structured light bar patterns and a number of uniform non-structured light optical transmission reference features.

Figure 16:
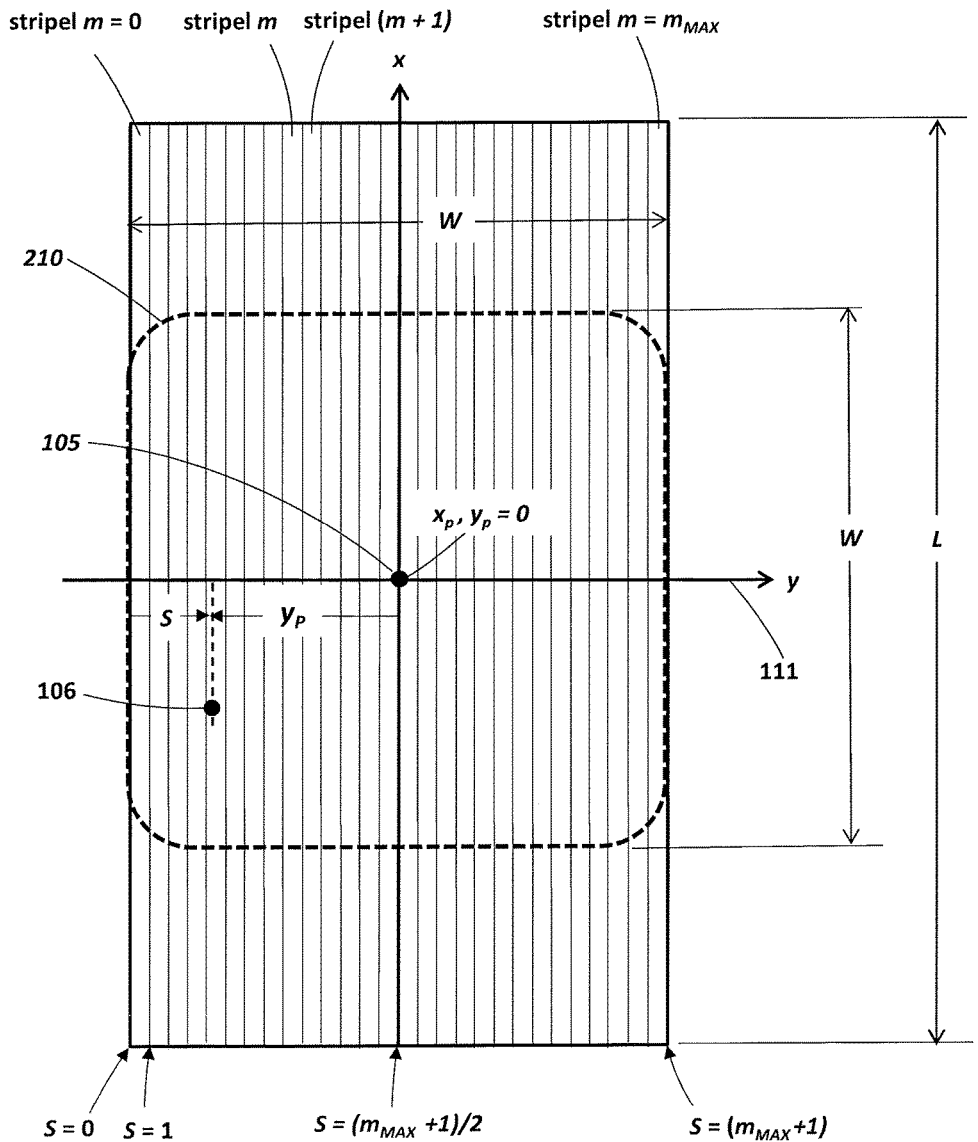
FIG. 16 is a schematic drawing of a decoded array of projector stripels in accordance with embodiments of the present disclosure.

25. The name "stripel" (from "strip element") refers to a digital measurement unit in a binary code sequence used to encode space in one dimension. It is applicable to both the HCBC of the present disclosure and to the prior art Gray code. It has previously been called "digital resolution element", "quantization increment", or simply "bin". It should be noted that the term "projector pixel" is not used in this disclosure because the term "pixel" (from "picture-element") refers to square or low aspect ratio rectangular elements in a two-dimensional array rather than long strips in a one dimensional array. It is important to note that although stripels can only be used for one-dimensional measurement, that is sufficient for depth measurement by triangulation. Stripels can be visualized as long and thin rectangular strips as illustrated in FIG. 16. The long dimension defines the length of one side of the projected pattern but does not contribute to the encoding. The thin dimension of the strip defines one stripel width, and therefore the total encoded width is equal to the product of stripel width and the total number of stripels. In the present disclosure, stripel width $Q_s$ is defined at the projector's slide plane surface. The magnified width of a stripel as projected onto a reference plane surface is defined as $Q_{REF}$. An important difference between stripels and pixels is that stripels are virtual instead of physical entities. Another is that stripel fill factor is 100%. There is zero space between stripels, as opposed to the physical gaps between pixel active areas in a digital camera's focal plane array.

26. Stripel indices m are integers starting at 0, and stripel distance S is the encoded distance from a reference starting point at S=0 to a specified point inside a single stripel m. As a non-limiting example of this convention, stripel index number m=0 may represent the space between stripel distance 0 and stripel distance m=1 in stripel units. Likewise, stripel index number m=1 may represent the space between stripel distance 1 and stripel distance 2, and so forth. The round-down mathematical function INT(S) as available for example in Microsoft® Excel® computer software yields an integer which is the stripel index number m for any given distance S in stripel units.

Figure 20:
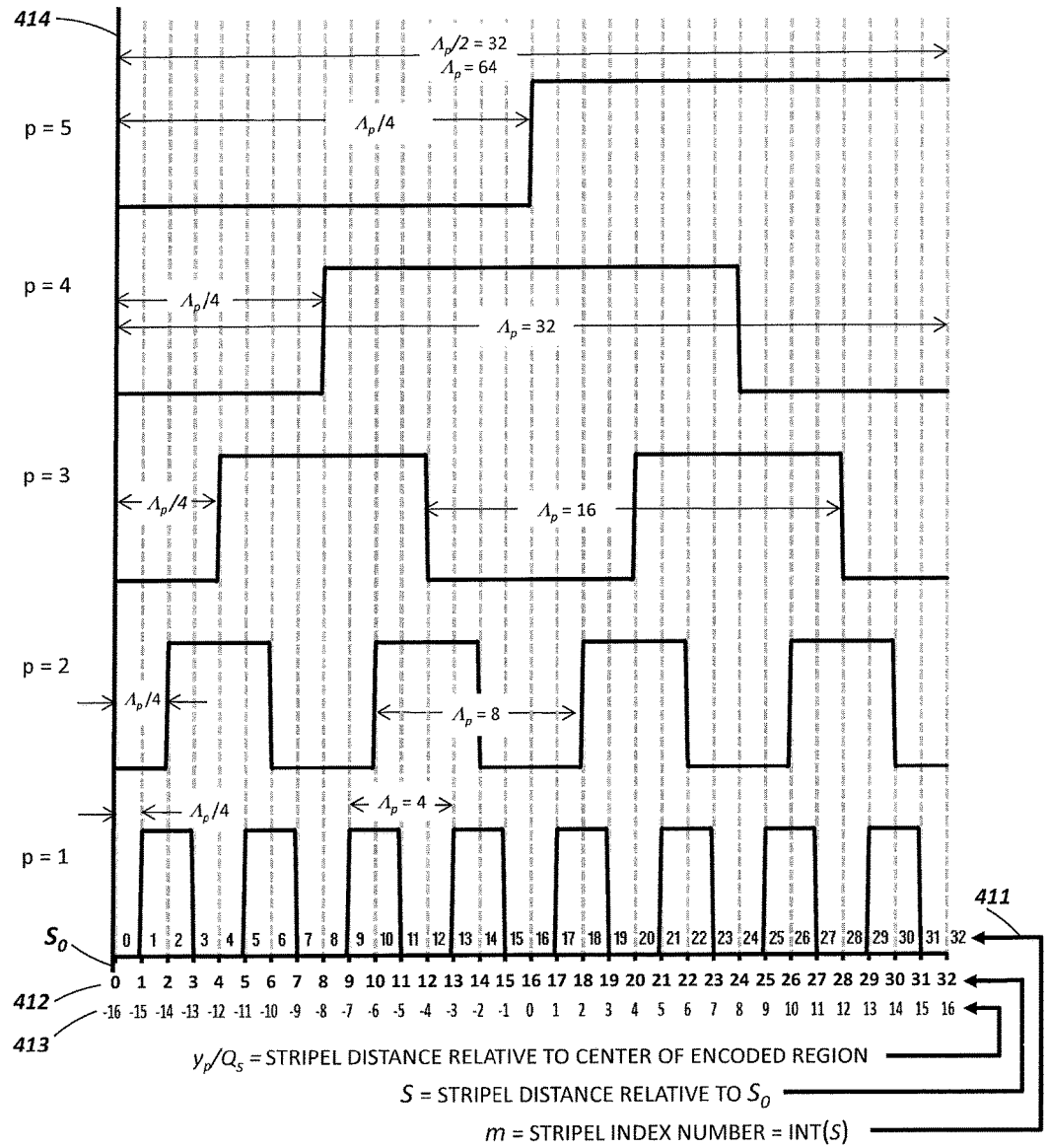
FIG. 20 is a set of annotated graphs of Gray code characteristic square waves of FIG. 19B showing additional mathematical features in accordance with embodiments of the present disclosure.

27. A variant of stripel distance S may be defined as $y_p/Q_s$, in which the measurement starting point is at the center of the total encoded distance as seen in FIG. 20.

28. The name "Gray code" means the prior art binary Gray code sequence of stripe patterns as defined in U.S. Pat. No. 2,632,058, in which the minimum pattern repetition period in a code sequence can be seen to be four stripels in the language of the present disclosure. In embodiments all or a part of the Gray code is used as a subset of the HCBC.

29. The term "irradiance" means the optical power density (watts per square centimeter or equivalent) incident on a surface.

Figure 29A:
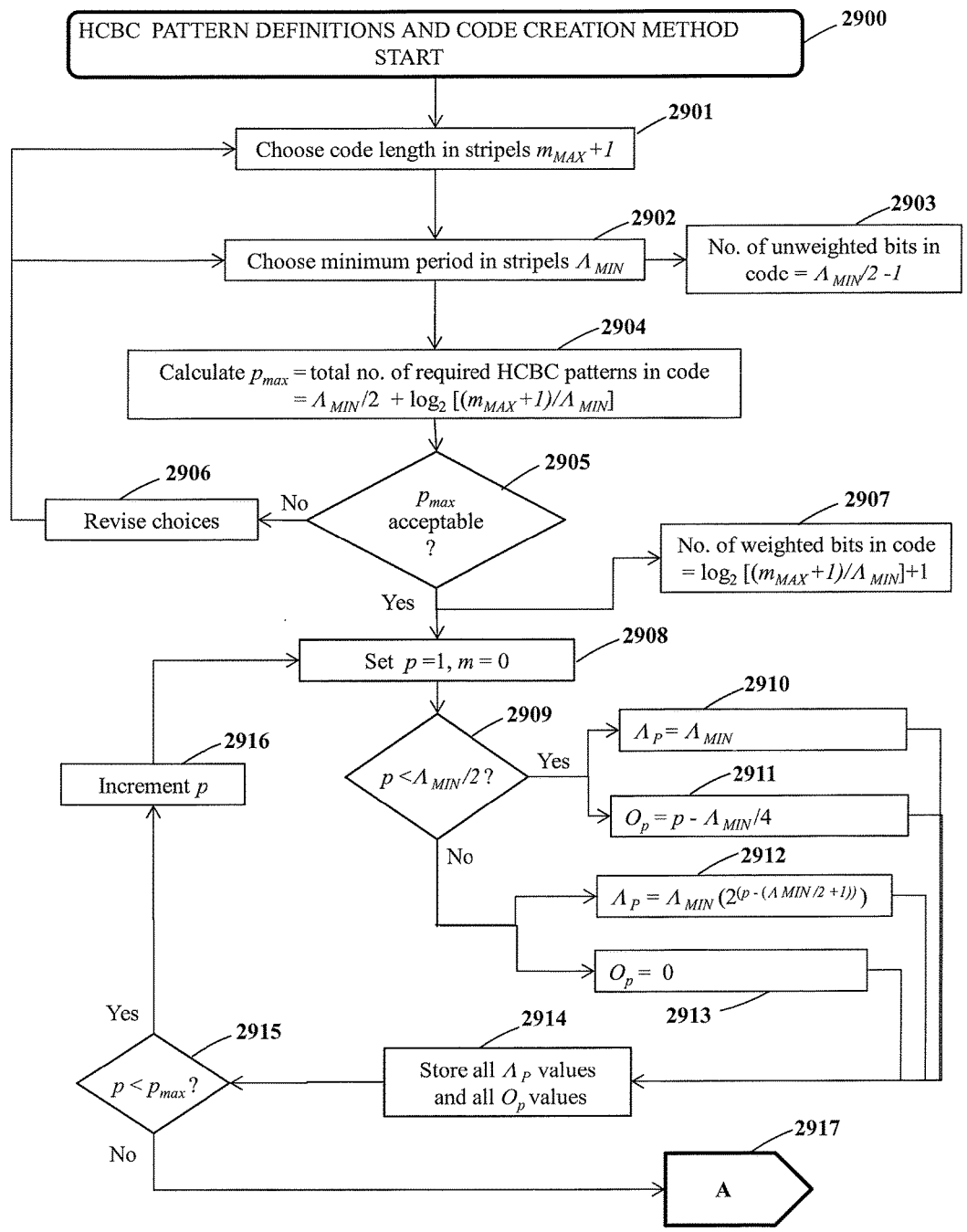
FIG. 29A is a first part of a flow chart of example operations of a logical method for creating an HCBC structured light code, in accordance with embodiments of the present disclosure.

30. The term "characteristic waveform" in relation to the HCBC means a mathematical one-dimensional square wave associated with a chosen pattern index p within a series of increasing integers from p=1 to p=$p_{MAX}$. The waveform is defined by three parameters related to chosen pattern index p: 1) waveform period $\Lambda_p$ in stripels, 2) a chosen minimum waveform period $\Lambda_{MIN}$ in stripels (flow chart FIG. 29A provides one method of choosing $\Lambda_{MIN}$, where $\Lambda_{MIN}$ is the common waveform period of all of the un-weighted numbering system HCBC waveforms), and 3) waveform offset $O_p$ as defined by $O_p=0$ for weighted numbering system waveforms and $O_p=\Lambda_p/4-p$ for un-weighted numbering system waveforms. It should be noted that characteristic waveforms may be used to represent the spatial variation of either the slide transmission at the projector's coding surface or the projected irradiance on a reference surface.

31. The term "chief ray" means any optical ray originating at a designated point and passing either a) through the center of any lens group's physical aperture stop or b) through the center of a projector's virtual aperture stop, or c) through a principal point of a lens group.

32. The term "big endian" means the common convention for arranging numerical digits in a weighted numbering system, in which the most significant digit or bit is on the left.

33. The term "object" is used in the optical design sense as a surface that contains designated points which originate one or more rays.

34. The term "field" is used in the optical design sense as the set of specific points on the object that originate optical rays.

Figure 3:
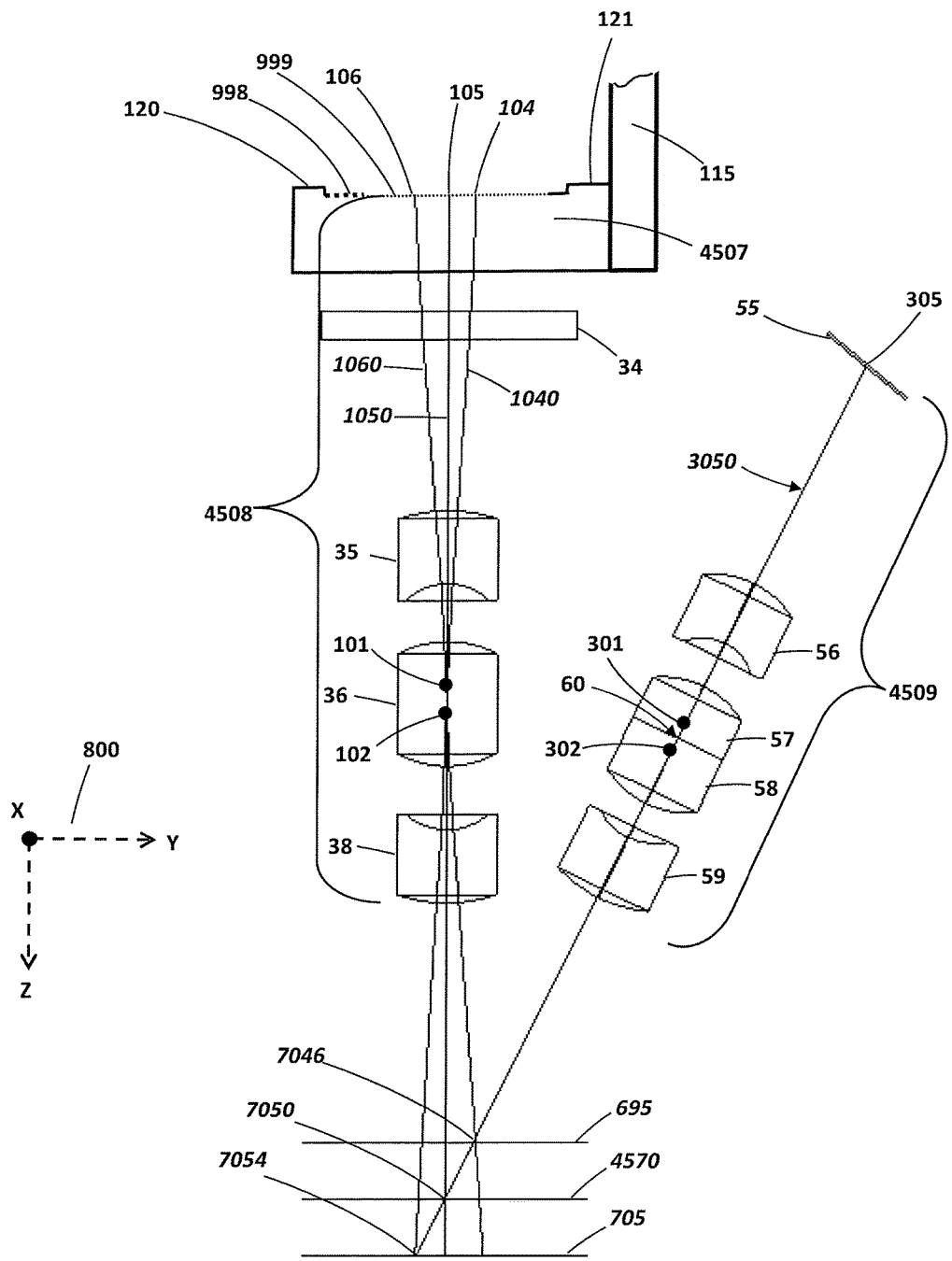
FIG. 3 is a 3D layout view in the Y Z plane of the imaging optics of a structured and non-structured light projector and one representative optical sensor (camera), showing a partial view of the projector's transparent cylindrical code drum, in accordance with embodiments of the present disclosure.

35. The term "back-projection" refers to an optical ray trace that models the camera as a projector or the projector as a camera. For camera back-projection ray tracing, the object field points may be in a rectangular grid array of pixel centers on the FPA. For projector back-projection, the object field points may be intercepts of back-projected camera rays with a reference plane surface as illustrated in FIG. 3.

36. The term "convolution" refers to the mathematical process used in this disclosure to compute the resultant optical LSF blur function and blurred characteristic waveform when several individual contributing LSF blur functions are known, such as projector blur, camera blur, and pixel active response function.

37. The term "exposure", denoted by the symbol "E" in the present disclosure, means the total amount of optical energy in watt-seconds (joules) that is deposited on a single sensor pixel during a specified exposure time, or alternatively the total number of radiant energy photons that are incident on the same single sensor pixel during a specified exposure time.

38. The origin of global coordinate frame X, Y, Z chosen for the present disclosure is located at the SBM side principal point of the projector's imaging lens group, specifically point 102 in FIG. 3 and FIG. 17.

Figure 17:
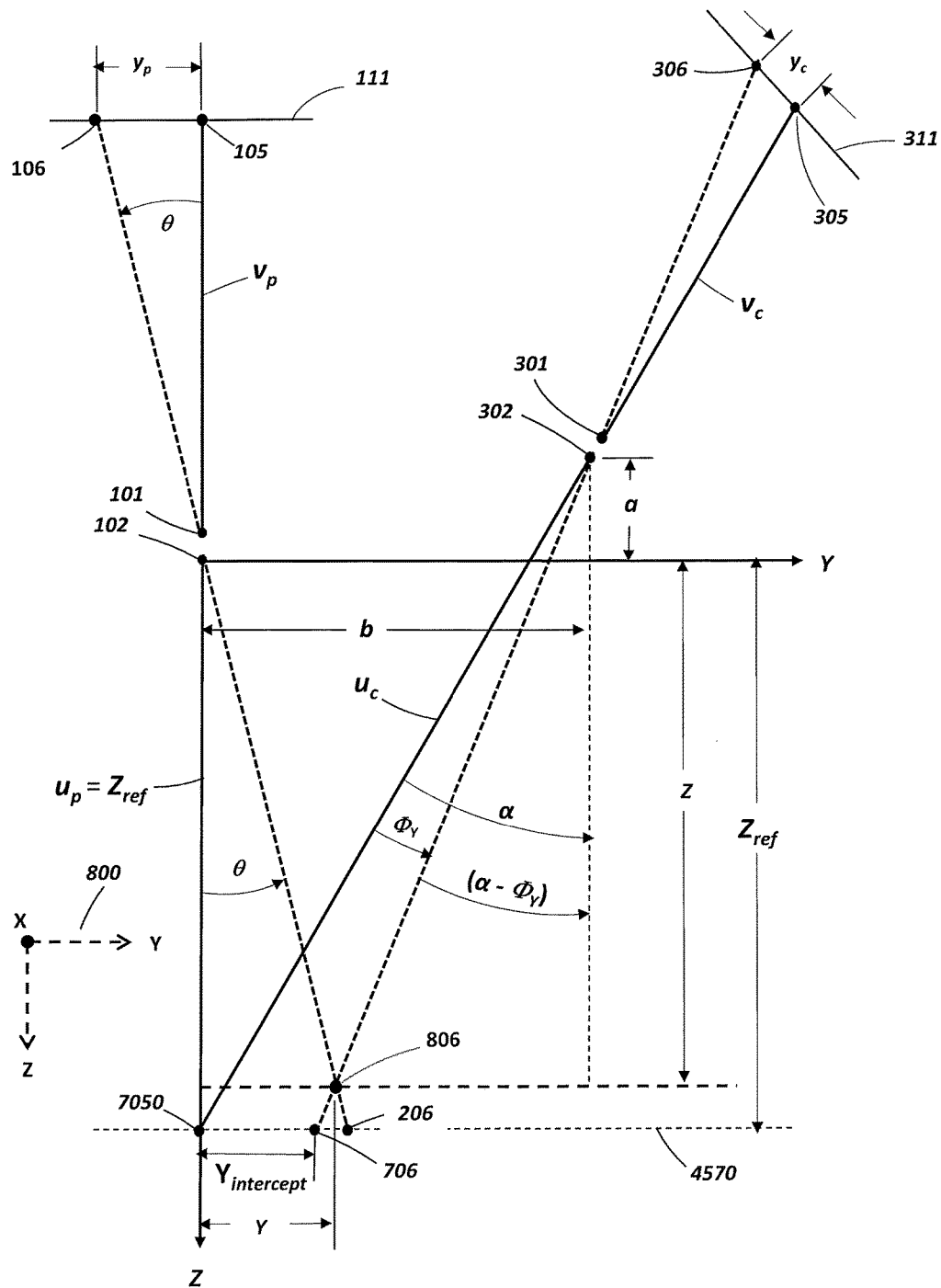
FIG. 17 is a 3D layout drawing of triangulation measurement geometry as seen in a Y Z view, representing a central structured light projector and a single optical sensor/camera.

39. The following is a Glossary of other terms and symbols:

θ("theta")=one-dimensional encoded projector chief ray angle in any plane parallel the to the Y,Z plane of FIG. 17 and containing a point X,Y,Z determined by the intersection of a back-projected ray from a selected camera pixel and a surface such as the SBM or a reference plane. $\Phi_x$ ("phi x")=one dimensional camera chief ray angle in the X, Z plane of FIG. 18, determined by the row index number i of a selected camera pixel.

$\theta_Y$ ("phi y")=one-dimensional camera chief ray angle in the Y, Z plane of FIG. 17, determined by the column index number j of a selected camera pixel.

$LP_p$=signal proportional to recorded laser power at time of projection of pattern p. E=total amount of optical energy in watt-seconds (joules) that is deposited on a single sensor pixel during a specified exposure time.

m=stripel index (an integer, i.e., 0, 1, 2, 3 . . . ) which is the rounded-down integer value of stripel distance S from a reference.

$m_{1p}$=stripel index at the first transition from zero to one in the characteristic waveform associated with pattern p.

$m_{MAX}$=highest stripel index used to encode a total $m_{MAX}$+1 stripels ms=milliseconds.

nm=nanometers.

μm=micrometers ("microns").

NLE=Non-Linearity Error, the difference between ideal sensor signal magnitude and sensor signal magnitude when it is reduced by the effect of sensor signal saturation or partial saturation.

$O_p$=Waveform offset of an HCBC characteristic square-wave as the distance between a waveform center of symmetry and a fixed common offset reference position (e.g., $S_0$) in units of stripels, which in embodiments may apply to non-weighted numbering system binary square wave waveforms and bar patterns. It is essentially a phase shift, but a different symbol is used in this disclosure to differentiate it from the phase shift of a pure sinusoidal waveform.

p=a general slide pattern index number starting at p=1 for a coded HCBC sequence, without consideration of associated uniform optical transmission reference patterns that may also be projected.

$p_{max}$=the total number of spatially coded patterns in one HCBC sequence, not including uniform optical transmission reference slides. In an example design in this disclosure, $p_{max}$=23 and the total number of slides is 26.

ref1=first uniform optical transmission reference feature.

ref2=second uniform optical transmission reference feature.

ref3=third uniform optical transmission reference feature.

ref4=fourth uniform optical transmission reference feature.

ref n=a general n'th uniform optical transmission reference feature.

S=distance in stripels from a zero reference at the beginning of a stripel array (numerically lower edge of stripel m=0). S may be any number, such as a fraction or a multi-digit decimal number.

ΔS=distance in stripels from an ERP to an extrapolated point within a decoded stripel.

Figure 42:
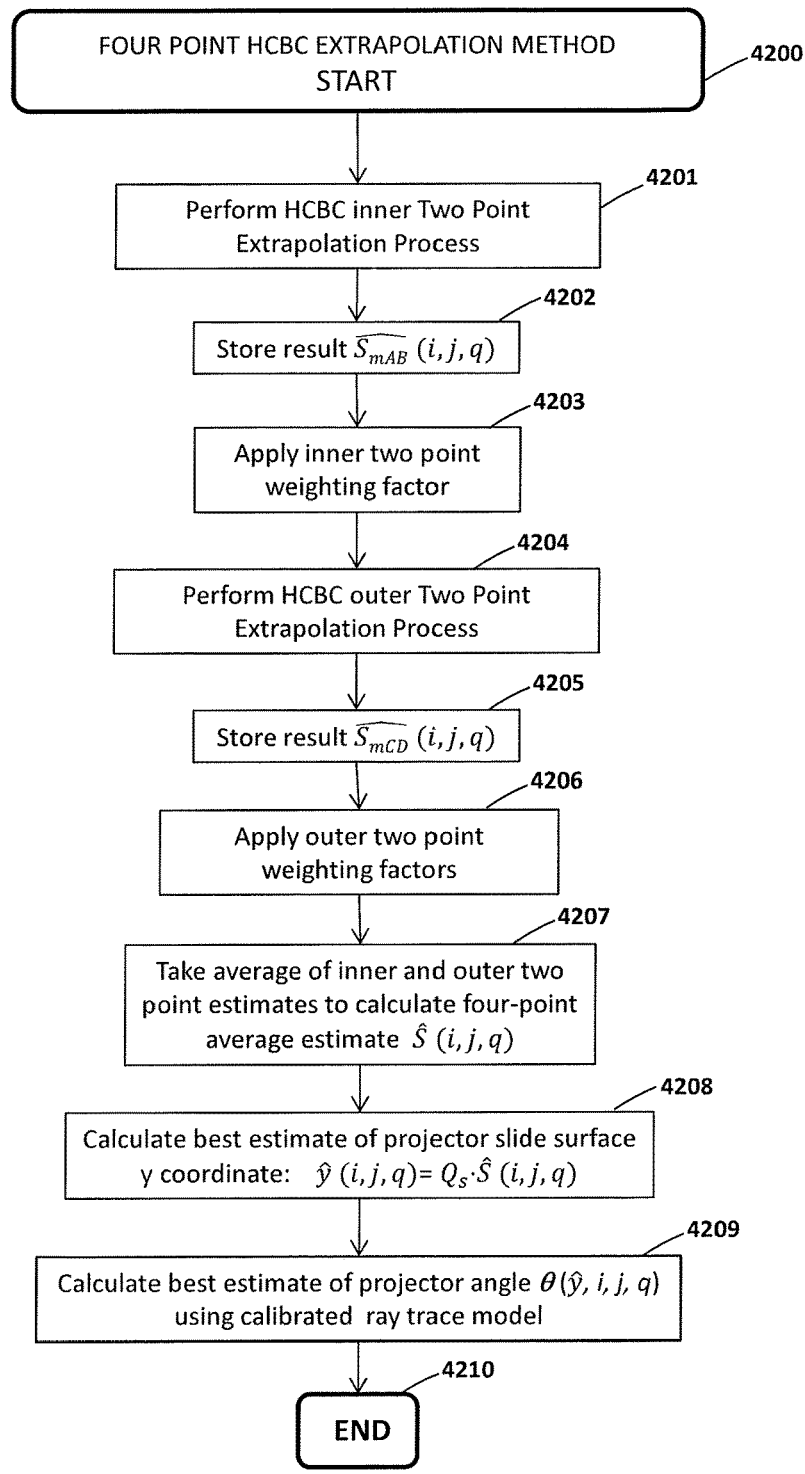
FIG. 42 is a flow chart of example operations of a method for a four-point sub-stripel extrapolation process, in accordance with embodiments of the present disclosure.
Figure 43:
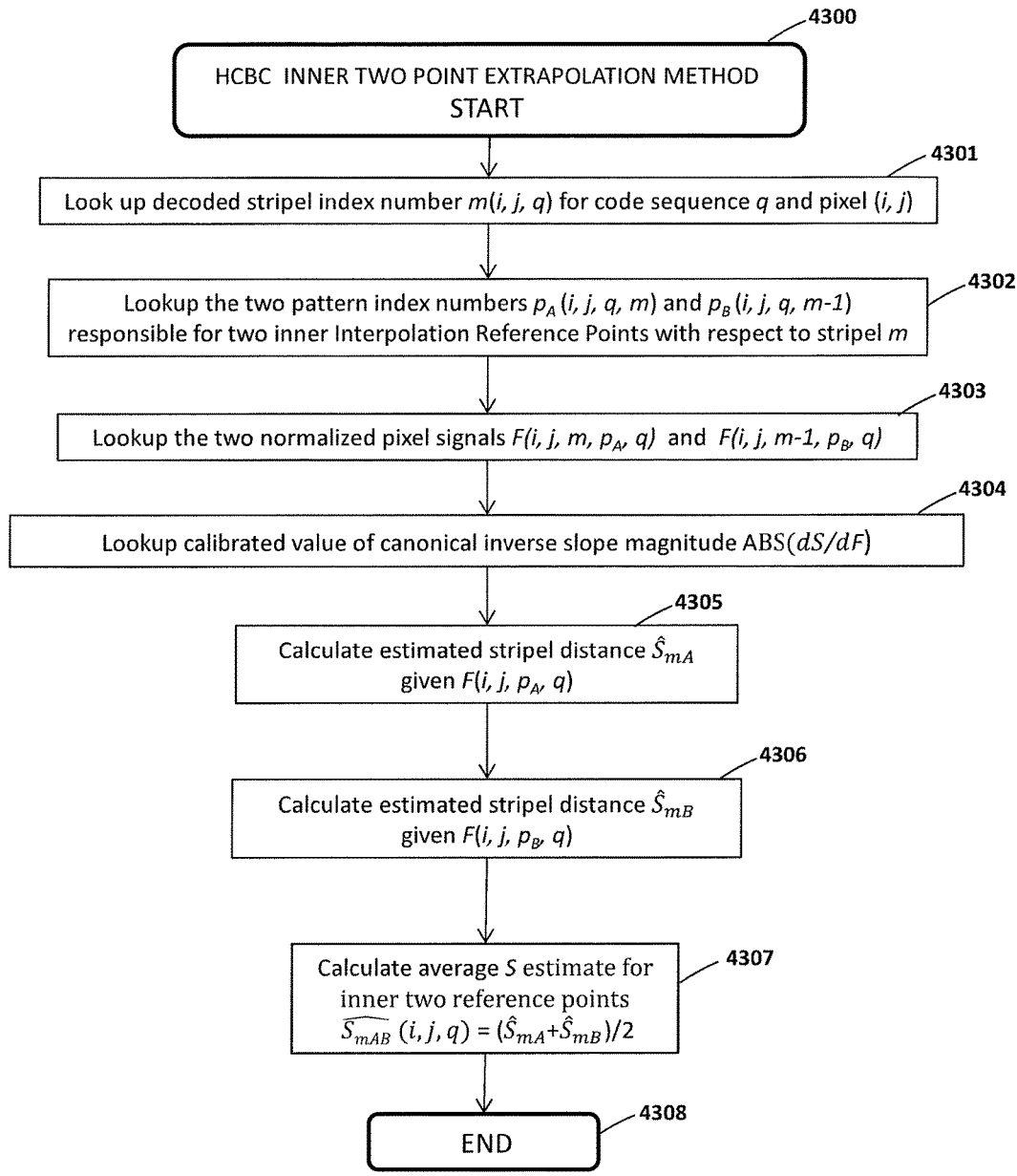
FIG. 43 is a flow chart of example operations of an inner two-point sub-stripel extrapolation method, in accordance with embodiments of the present disclosure.
Figure 44:
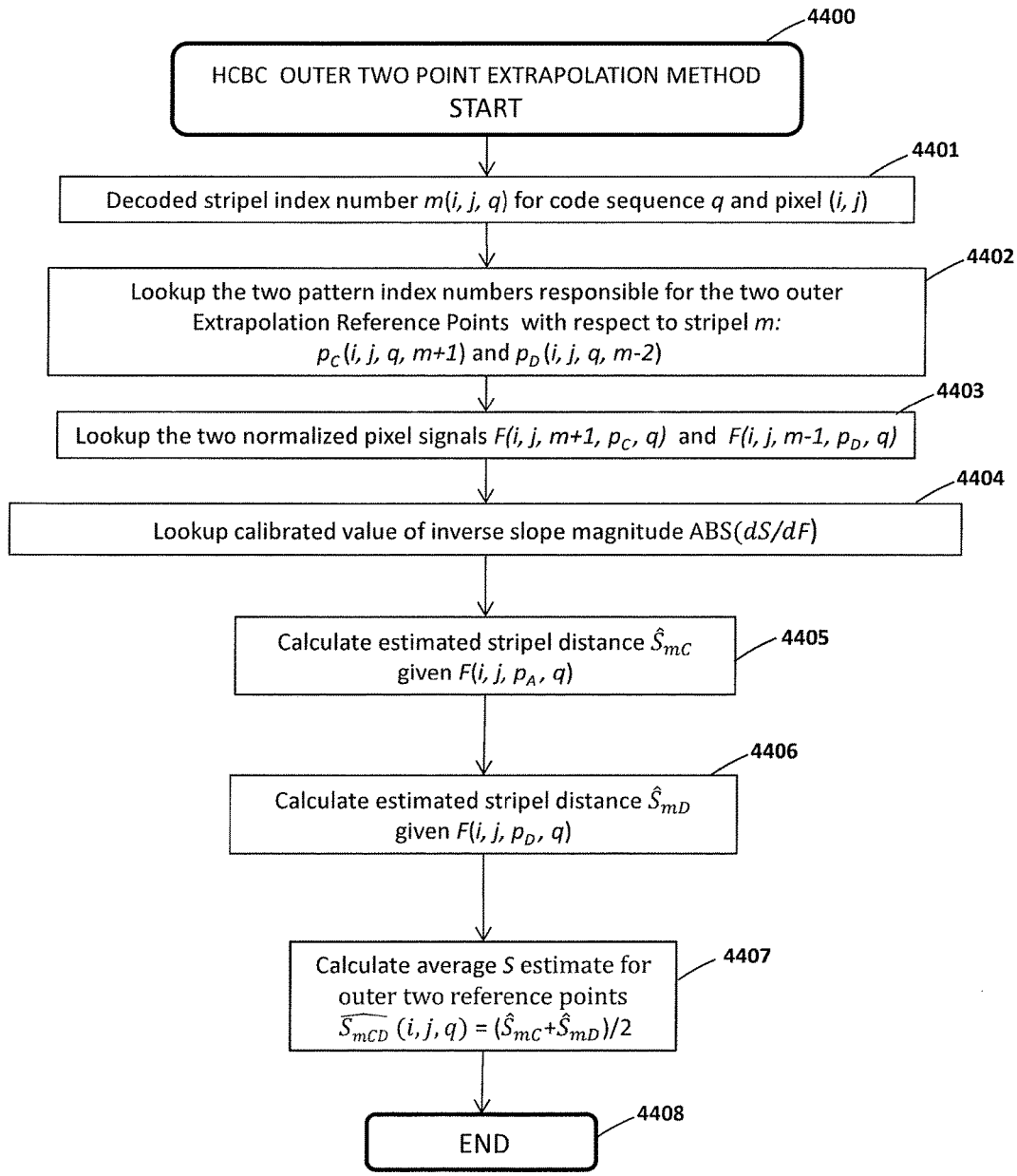
FIG. 44 is a flow chart of example operations of an outer two-point sub-stripel extrapolation method, in accordance with embodiments of the present disclosure.

$\hat{S}_m$=Estimate of the stripel distance from S=0 to a decoded and extrapolated point in the interior of stripel m (see for example the equations in FIGS. 42 through 44).

$T_{ref1}$=Percent or fractional transmission of a first uniform optical transmission reference feature.

$T_{ref2}$=Percent or fractional transmission of a second uniform optical transmission reference feature.

$T_{ref3}$=Percent or fractional transmission of a third uniform optical transmission reference feature.

$T_{ref4}$=Percent or fractional transmission of a fourth uniform optical transmission reference feature.

y=physical distance on the projector's coding surface with reference to the point of intersection of the projector lens optical axis and the coding surface.

Λ=("lambda") the spatial period of a general HCBC characteristic waveform, in units of stripels.

$\Lambda_p$=Spatial period of the HCBC characteristic square-wave corresponding to slide index p, in units of stripels.

$\Lambda_{min}$=Shortest spatial period in stripels in an entire HCBC sequence, and common to all non-weighted numbering system patterns.

q=sequence number when more than one HCBC sequence and associated reference patterns are projected and decoded.

f_rot=cylindrical shell (drum) rotation frequency in Hz

ρ ("rho")=Radius of the inner cylinder wall of a spinning cylindrical shell.

β ("beta")=Angular spacing of projector slide patterns on the inside of the spinning cylindrical shell drum in degrees or radians.

$N_s$=total number of projected slides in one sequence=sum of $p_{max}$ and the number of uniform optical transmission reference slides.

i=optical sensor FPA row index number, associated with x and X coordinate axes. This convention is also used for grid distortion ray tracing and calculations.

j=optical sensor FPA column index number, associated with y and Y coordinate axes. This convention is also used for grid distortion ray tracing and calculations.

$N_{row}$=number of optical sensor/camera FPA pixel rows.

$N_{col}$=number of optical sensor/camera FPA pixel columns.

$K_{pm}$=irradiance or signal transition slope at numerically higher edge of a decoded stripel m and associated with pattern index p.

$k_{yp}$=y distortion correction parameter for projector.

$k_{yc}$=y distortion correction parameter for camera.

$k_{xc}$=x distortion correction parameter for camera.

$Q_s$=stripel width at the projector's drum coding surface in millimeters or microns.

$Q_{ZREF}$=stripel width at a reference plane in millimeters or microns.

pp=pixel pitch at the camera FPA in millimeters or microns.

ff=pixel area fill factor provided by camera manufacturer, varying between 1.0 for 100% light collection area between pixel centers and 0.0 for no light-collecting area.

FFDT=Full field dwell time for slide pattern dwell time on nearly all camera pixels.

RFDT=Reduced field dwell time for slide pattern dwell time on a selected group of FPA rows.

SRDT=Single row dwell time for a selected FPA row.

$v_p$=object distance from the center point of a slide to be projected to the first principal point of the projector lens group.

$v_c$=back-projected object distance from the center point of a camera's FPA to the first principal point of the camera lens.

$u_p$=image distance from the second principal point of the projector lens group to the center of the on-axis best focus image on a reference surface at Z=Z_ref.

$u_c$=back-projected image distance from the second principal point of a camera lens to the center of the on-axis best focus image on a reference surface at Z=Z_ref.

h(i, j, p, q)=decoded binary bit value for camera pixel coordinates (i, j), projector pattern index p and projection sequence number q.

H(i, j, p, q)=electrical signal magnitude from a camera pixel with row index i and column index j that is created by pattern p during projection sequence q.

F(i, j, p, q)=A single optical sensor/camera pixel electrical signal magnitude measured during projection sequence q, associated with projected pattern index parameter p, and normalized with respect to both measured temporal variations in laser power and measured pixel signal magnitude resulting from projection of a calibrated 50% optical transmission reference pattern. See blocks 3005 and 3006 in FIG. 30.

$M_{proj}$=projector lateral magnification at a reference image plane defined by $Z=Z_{REF}$.

$M_{cam}$=camera lateral magnification at a back-projected image of the central region of the FPA onto a reference image plane defined by $Z=Z_{REF}$.

ROI=optional "region of interest" shutter mode capability in measurement cameras.

Figure 7:
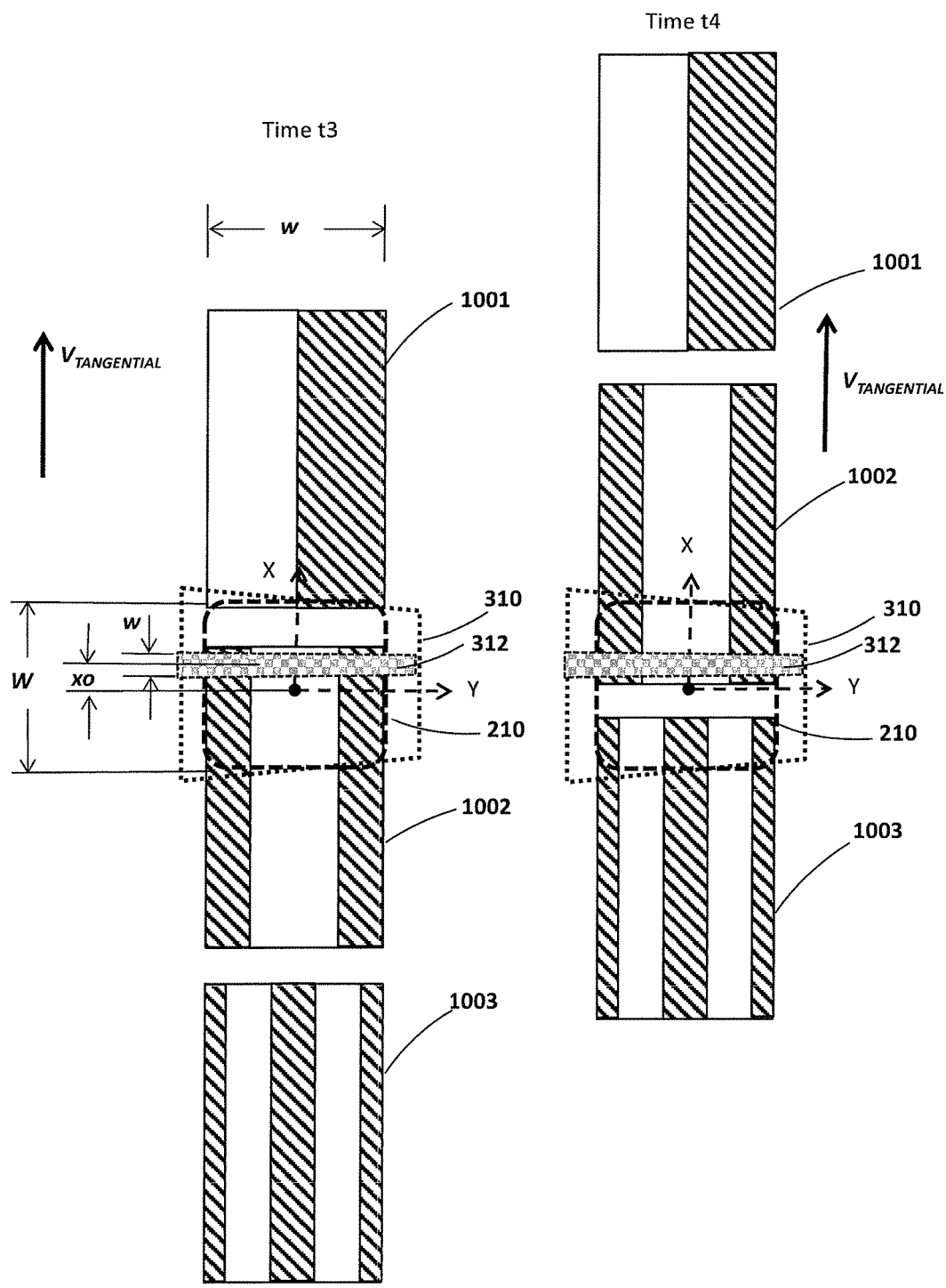
FIG. 7 is a diagram of a rolled-out imprint of moving slide patterns on a projector's coding surface entering and leaving the projector's illumination window, in which a selected subset of camera pixels may have an increased exposure time, in accordance with embodiments of the present disclosure.

W=width of projector illumination window, in a non-limiting form of square in the present disclosure.

x_o=Offset distance in the non-measurement x direction on the projector slide plane as caused by any camera exposure timing offset, illustrated in FIG. 7.

In many structured light applications for non-contact CMM's there will be structured light projector and optical sensor/camera optical diffraction and defocus effects that serve to blur the ideal sharp edges in projected and measured binary bar patterns. The most serious effect of this is with a Gray code minimum period pattern. It is desirable for the minimum period to be kept large enough so that one bar width (one-half period) is considerably larger than the total optical blur diameter. Since the digital resolution element of any Gray code sequence is one-half of one minimum bar width (one-fourth of the minimum spatial period), this has been found to result in the digital resolution elements of optical CMM's using conventional Gray code being considerably larger than desired, i.e., larger than the 1-5 micron measurement error of conventional contact CMM's.

If the digital resolution element is larger than the desired measurement error, it is sometimes possible to improve measurement accuracy by interpolating or extrapolating inside it based upon measurement of the normalized magnitude of the received signal measured by a given optical sensor/camera pixel. However, the accuracy with which this can be done depends upon two conditions, the first being an available means to accurately normalize the received signal level and the second being a large enough change in pixel signal magnitude for a given lateral measurement distance. If the optical blur width approaches the distance between rising and falling intensity edges in a projected bar pattern (one-half of the bar pattern period), there may be such a small change in signal amplitude versus distance that the second condition cannot be met, with the result that interpolation or extrapolation would provide only an insignificant gain in accuracy even if an acceptable means of signal normalization were available.

In addition it is known that when a surface being measured has regions of high specular (mirror-like) reflectivity some regions may be angled such that an unusually large amount of reflected light may be directed into individual sensor elements (pixels). Depending upon the dynamic range capability of the sensor elements there may be partial or total signal saturation, in some cases causing errors in measured surface coordinates. A reduction of measurement errors associated with this condition is therefore desirable.

Figure 45:
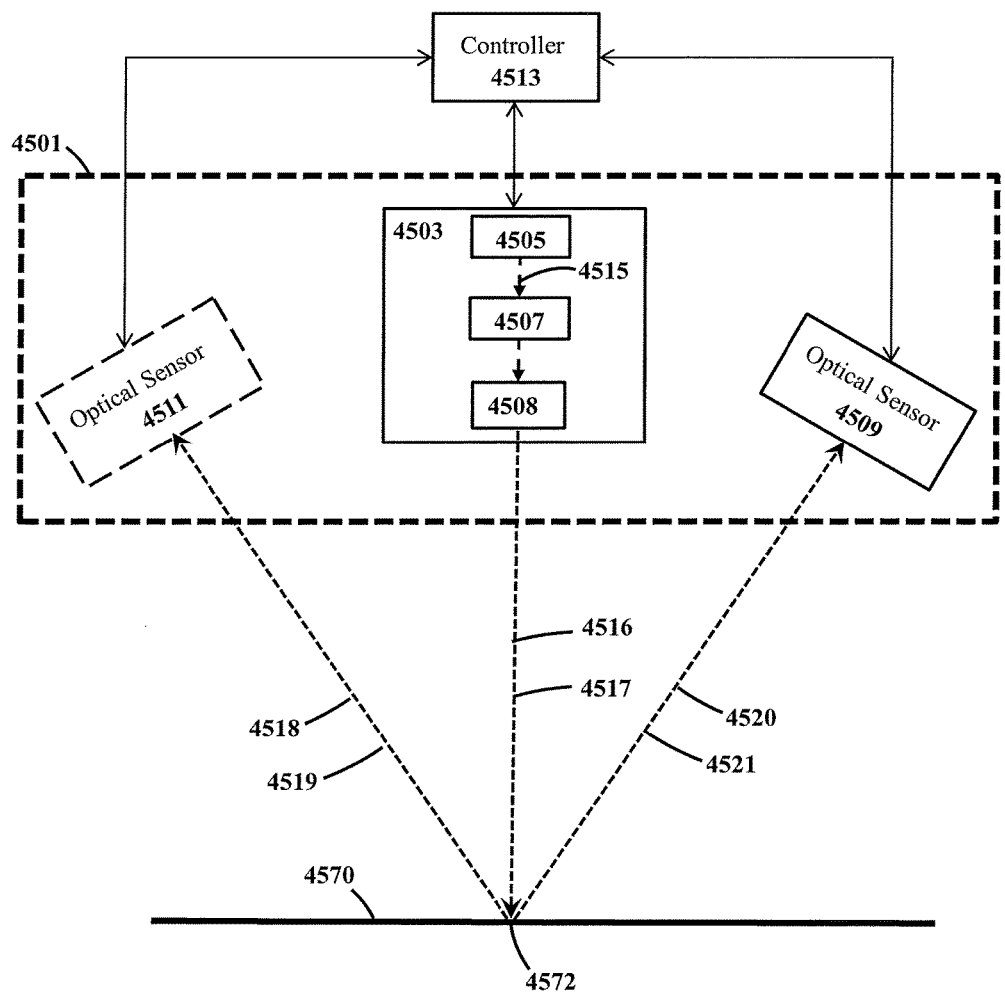
FIG. 45 is a high level block diagram of one example of a non-contact coordinate measurement machine consistent with the present disclosure.

With the foregoing in mind, one aspect of the present disclosure relates to a non-contact coordinate measurement machine (CMM) for determining positional coordinates on (i.e., mapping) the surface of an object being measured. In that regard reference is made to FIG. 45, which is a high level block diagram of one example of a non-contact CMM consistent with the present disclosure. It is noted that FIG. 45 depicts a generalized configuration of a non-contact CMM consistent with the present disclosure with various components omitted in the interest of clarity and ease of understanding. Further details with regard to the components illustrated in FIG. 45 and other components that may be included in such a system are provided herein, e.g., in connection with the description of other figures.

As shown, non-contact CMM 4500 includes optical assembly 4501, which in turn includes structured light and non-structured reference light projector 4503 and at least one optical sensor (e.g., a first optical sensor 4509 and an optional second optical sensor 4511). The structured light and non-structured reference light projector 4503 includes light source 4505 (e.g., a laser), code drum 4507 (also referred to herein as a shell, cylinder, etc.), and projection lens 4508.

In addition, non-contact CMM 4500 further includes controller 4513. In general, controller 4513 is configured to cause light source 4505 to project incident light rays 4515 (hereinafter, incident light 4515) onto code drum 4507 as code drum 4507 rotates about an axis. Incident light 4515 passes through patterned and non-patterned regions of code drum 4507 and is then focused by projection lens 4508 onto a surface of an object being measured, i.e., onto SBM 4570, as structured light 4516 and non-structured light 4517.

In general, controller 4513 is configured to cause structured light and non-structured reference light projector 4503 to emit structured light 4516 and non-structured reference light 4517 onto a surface of an object being measured, i.e., onto SBM 4570. Controller 4513 is therefore configured to control the emission of light rays 4515 by light source 4505. For example, controller 4513 may produce one or more control signals that are configured to control the production of light rays 4515 by light source 4505. Controller 4513 also controls exposure times of the at least one optical sensor as well as performing processing and storage of signals produced by the at least one optical sensor. With respect to the response of light source 4505 to control signal(s) from controller 4513, light source 4505 may emit light rays 4515, such that light rays 4515 are incident on code drum 4507, as shown. Light rays 4515 may therefore be referred to as incident light, as at least a portion of light rays 4515 are incident on code drum 4507 and focused by projection lens 4508, resulting in the presence of structured light rays 4516 and (non-structured) reference light rays 4517 in a region downfield of code drum 4507.

Any suitable light source may be used as light source 4505. Without limitation, in some embodiments light source 4505 is an incoherent light source that emits light in a desired region of the electromagnetic spectrum, such as one or more of the ultraviolet, visible, or infrared regions. In specific non-limiting embodiments, light source 4505 is an incoherent laser light source that emits light rays 4515 in the ultraviolet, visible, or infrared regions.

Code drum 4507 and projection lens 4508 are generally configured to convert at least a portion of light rays 4515 (i.e., incident light rays) incident on some regions of the drum to spatially structured light rays 4516 (hereinafter referred to as "structured light") and also to convert at least a portion of light rays 4515 (i.e., incident light rays) incident on other regions of the drum into reference light rays 4517 that produce substantially uniform reference illumination on SBM 4570 (hereinafter referred to as "non-structured reference light").

The code drum 4507 includes structured light regions/features and non-structured (uniform optical transmission) reference light regions/features. The structured light regions/features of the code drum 4507 are configured to encode light with respect to one or more positional coordinates on the drum, whereas the non-structured uniform optical transmission reference light regions/features are configured for the purpose of improving the accuracy of decoding the structured light, and detection and correction of sensor signal saturation or partial saturation (i.e., nonlinearity). Code drum 4507 may include one or more (e.g., one, two, three, four, or more) non-structured uniform optical transmission light reference regions/features on the drum, each of which may be configured to transmit a known percentage amount of incident light (e.g. light rays 4515). The amount of light transmitted by each uniform optical transmission reference feature may range from about 10% to about 100% of the incident light thereon. In embodiments, at least one of the uniform optical transmission reference regions/features is configured to transmit between about 49% and about 51% of incident light, such as between about 49.9% and about 50.1% of incident light, or even about or exactly 50.0% of the incident light. In such instances, such a feature is referred to as a "50% transmission" or "50% transmission reference."

In some embodiments code drum 4507 is configured to create structured light rays 4516 using a plurality of hybrid cyclic binary code (HCBC) patterns, which in embodiments may include one or a plurality of weighted numbering system/varying period (e.g., Gray code) binary patterns and a plurality of unweighted numbering system/common/constant period (i.e., non-Gray code) binary patterns. In some embodiments all or a portion of the plurality of the HCBC patterns and the non-structured light reference regions are formed on and/or within a surface of code drum 4507.

For example, in some embodiments code drum 4507 includes a (e.g., cylindrical) shell that includes transparent (or substantially transparent) regions and opaque (or substantially opaque) regions that are configured with projection lens 4508 to create structured light. In general, the transparent or substantially transparent regions are configured to transmit a relatively large amount of incident light (e.g., light rays 4515), whereas the opaque or substantially opaque regions are configured to block (i.e., not transmit) a relatively large amount of incident light (e.g., light rays 4515). Such regions may individually or collectively define one or more of the plurality of HCBC patterns. Moreover, such regions may individually or collectively function to selectively transmit light through code drum 4507 and projection lens 4508, resulting in the production of structured light rays 4516 in the region downfield of projection lens 4508.

The transparent and opaque sub-regions of the structured light regions of code drum 4507 may be formed in any suitable manner. For example, in some embodiments code drum 4507 includes a shell having an inner surface and an outer surface (not shown in FIG. 45). In such instances the shell may be configured to transmit at least a portion of the incident light thereon (e.g., light rays 4515). For example, in some embodiments the shell may be formed from or include a material that has been antireflection coated and, considering the effect of both inner and outer surfaces, transmits greater than or equal to about 95% of light incident thereon, such as greater than or equal to about 98%, greater than or equal to about 99%, or even about 100% of light incident thereon. Without limitation, in some embodiments the shell is formed from or includes a material that transmits greater than or equal to about 98% of light rays 4515 incident thereon, including, e.g., two surfaces that are each coated with one or a plurality of antireflection thin film layers.

Again considering the structured light regions/features of the code drum, in some embodiments an additional type of coating that is opaque or substantially opaque may be present on at least a portion of the inner surface, outer surface, or both the inner and outer surface of the shell when it is formed from a transparent or substantially transparent material, as will be described later. In such instances the coating may be formed from an opaque or substantially opaque material, i.e., a material that blocks (does not transmit) at least a portion of light incident thereon (e.g., at least a portion of light rays 4515). For example, in some embodiments the coating may be formed from a material that blocks greater than or equal to about 90%, greater than or equal to about 95%, or even about 100% of light incident thereon. Put in other terms, the coating may be configured to transmit less than or equal to about 10%, less than or equal to about 5%, or even less than or equal to about 1% of light incident thereon (e.g., light rays 4515). Details regarding specific materials that may be used to form the coating are provided later, but it should be understood that any suitable material may be used to form the coating, so long as the coating blocks a sufficient amount of incident light. Non-limiting examples of suitable materials for forming such a coating include metals, alloys, and polymers that are opaque or substantially opaque to light rays 4515, and combinations thereof.

In some embodiments the transparent regions and opaque regions may be defined by removing select regions of an opaque or substantially opaque coating on the shell, thereby exposing select regions of the shell (which as noted previously may be formed from a transparent or substantially transparent material). For example, such regions may be defined by forming a substantially continuous coating of an opaque or substantially opaque material on the inner and/or outer surface of a transparent or substantially shell of code drum 4507, after which select regions of the opaque or substantially opaque material may be removed to form a patterned coating. Formation of the patterned coating may be accomplished in any manner, such as by etching, photolithography, or another suitable process that can remove select regions of the coating to expose the underlying (transparent) shell. The plurality of HCBC patterns may be defined by the patterned coating, or more specifically by the opaque and transparent regions defined by the patterned coating and the exposed regions of the underlying transparent shell. Depending on the desired configuration, the patterned coating may be configured as a "positive" pattern (i.e., where the HCBC patterns are defined entirely by exposed regions of the underlying surface of the shell of code drum 4507), a "negative" pattern (i.e., where the HCBC patterns are defined entirely by the portions of the coating that remain following the removal), or a "hybrid" pattern (i.e., wherein at least some of the HCBC patterns are defined by the exposed portions of the underlying surface of code drum 4507 and at least some of the HCBC patterns are defined by portions of the coating that remain following removal). One or more antireflection coatings may be applied to the inner and outer surfaces of the shell either before, during or after definition and creation of the HCBC patterns.

Of course, the plurality of HCBC patterns need not be defined by an opaque or substantially opaque coating on the surface of a drum that includes a transparent or substantially transparent shell. In some embodiments for example, code drum 4507 may include a shell that is formed from an opaque or substantially opaque material. In such instances the plurality of HCBC patterns may be defined by removing select portions of the shell, so as to form openings there through. In such instances, the openings may be considered transparent regions, and the remaining portions of the code drum may be considered opaque regions, with the transparent and opaque regions defining all or a portion of the plurality of HCBC patterns.

In various embodiments code drum 4507 may include one, two, three, four or more uniform optical transmission reference regions/features in order to create non-structured reference light. For example, in some embodiments code drum 4507 includes a first uniform optical transmission reference feature, a second uniform optical transmission reference feature, a third uniform optical transmission reference feature, and a fourth or more uniform optical transmission reference feature, wherein the first, second, third, fourth or more uniform optical transmission reference features are configured to transmit different amounts of light incident thereon. The first uniform optical transmission reference feature may be configured to transmit a first amount of light (e.g., 98% to 100% of the incident light). In some embodiments the function of the first reference feature may alternatively be provided by 98% to 100% uniform transmission regions of one or more of the structured light patterns on code drum 4507. The second uniform optical transmission reference feature may be configured to transmit a second amount of light, wherein the second amount of light is less than that of the first transmitted amount of incident light (e.g., about 50% transmission), the third uniform optical transmission reference feature may be configured to transmit a third amount of incident light that is more than that of the second transmitted amount (e.g., the third reference feature may provide about 70% transmission) and a fourth uniform optical transmission reference feature may be configured to transmit a fourth amount of incident light, that is less than the second amount of transmitted light (e.g., the fourth reference feature may provide about 30% transmission).

Figure 4:
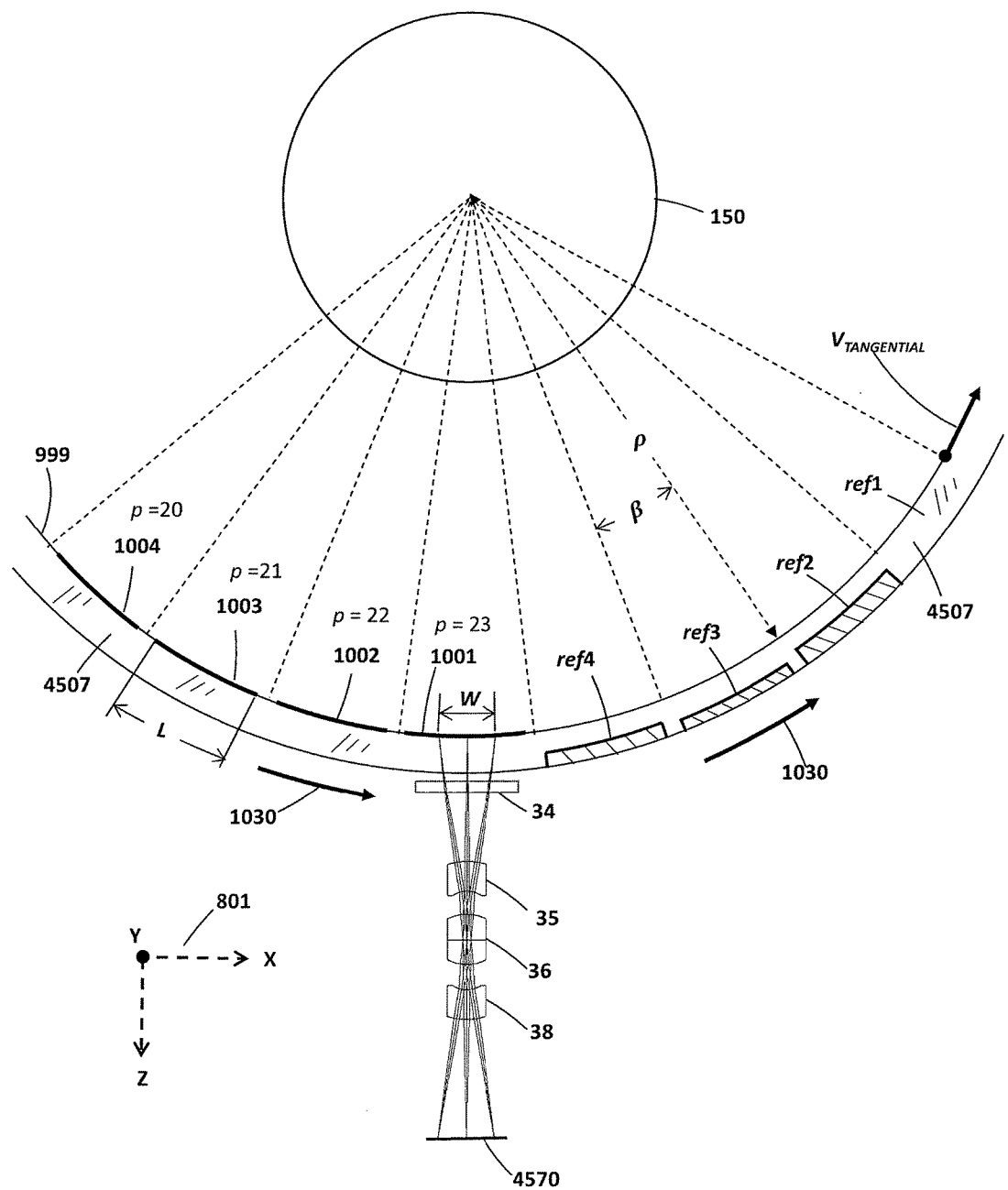
FIG. 4 is a cross-section view in the X Z plane of a structured and non-structured light projector code drum, showing embedded optical transmission reference features, edge-on views of slide patterns on an inner drum surface and the projector's optical imaging lens, in accordance with embodiments of the present disclosure.

In the present disclosure the numbering of the uniform optical transmission reference features is arranged to be consistent with an example projection sequence on code drum 4507 as illustrated in FIG. 4. However, the order of projection may be made different from the example of FIG. 4, and in any case using a different criterion may result in a different ordering of the uniform optical transmission reference feature names without affecting system performance. The one, two, three, four or more uniform optical transmission reference features may be initially integral with or initially separate from code drum 4507. In the former case, an integral portion of code drum 4507 may be configured to transmit a known first, second, third or fourth amount of light, as discussed above. For example in instances where code drum 4507 includes a transparent (cylindrical shell), an exposed portion of the shell may be configured to serve as a first reference, while a different region of the code drum 4507 may be configured to serve as second, third, or fourth uniform optical transmission reference features. For example, where the first uniform optical transmission reference is an exposed portion of a transparent shell, a second uniform optical transmission reference may be formed from a different exposed portion of the transparent shell that has been covered (e.g., coated) or joined with a material such that the amount of light transmitted through the material and the second exposed portion is 50% of the amount of light that is transmitted through the exposed portion which serves as a first uniform optical transmission reference feature.

In the latter case, the second, third, and fourth uniform optical transmission reference features may at least partially comprise components that are initially separate from code drum 4507 and may be later adhered or otherwise retained at discrete locations on or within code drum 4507. For example, in some embodiments one or more of the uniform optical transmission reference elements may be in the form of a plate which may exhibit curvature of its surfaces in one dimension (e.g., a cylindrical lens), and code drum 4507 may include one or more retention features that are configured to retain such plate(s) or lenses. In embodiments, code drum 4507 includes a transparent (cylindrical) shell with an inner surface and an outer surface, wherein one or more uniform optical transmission reference retention features are disposed on or within the inner surface, the outer surface, or a combination thereon. In some non-limiting embodiments, code drum 4507 includes a transparent cylindrical shell with an inner surface and outer surface, wherein at least one uniform optical transmission reference retention feature in the form of a slot, depression, or the like is formed in the inner or outer surface, and each of the one or more references is disposed within at least one such uniform optical transmission reference retention feature. In such instances the uniform optical transmission reference retention features may extend fully or partially through the thickness of the transparent shell. That is, the uniform optical transmission reference retention feature(s) may be an opening configured to receive and retain a uniform optical transmission reference element, such as a reduced thickness region of the transparent shell (e.g., a slot, depression, etc.), combinations thereof, and the like.

The type and configuration of the uniform optical transmission reference features is not limited, and any suitable uniform optical transmission reference features may be used. That being said, in some embodiments first, second, third, and fourth reference features are used. In such instances second, third and fourth uniform optical transmission reference features may be formed at least in part from a materials that differ from the transparent shell material. For example, in some embodiments the code drum 4507 includes a transparent shell that includes a transparent shell substrate material, and the first, second, third and fourth uniform optical transmission reference features may include some amount of the transparent shell substrate material.

The position and configuration of uniform optical transmission reference features in code drum 4507 may vary widely, and any suitable type and configuration of uniform optical transmission reference feature(s) may be used and any sequence of projection of the uniform optical transmission reference features may be used, i.e., the uniform optical transmission reference features may be grouped together or interspersed between structured light patterns on the shell.

Regardless of its configuration, code drum 4507 is generally configured to rotate about an axis, to support a plurality of non-structured light uniform optical transmission reference features and to selectively transmit or block incident light thereon so as to produce structured light. More specifically as code drum 4507 rotates, light rays 4515 emitted by light source 4505 are incident on an inner or outer surface thereof. In any case, light rays 4515 are selectively transmitted/blocked by the transparent and opaque regions of the binary bar patterns on code drum 4507, resulting in the production of structured light (e.g., structured light rays 4516) and non-structured uniform optical transmission reference light (e.g., non-structured reference light rays 4517) in a region downfield of projection lens 4508. As shown in FIG. 45, the combination of structured light rays 4516 and non-structured reference light rays 4517 are directed onto the surface of an object being measured, i.e., onto SBM 4570 at example surface point 4572. At least a portion of light rays 4516 and 4517 may reflect or otherwise be redirected from point 4572 on SBM 4570, resulting in the production of reflected structured light and reflected non-structured light being received by optical sensors 4509 and 4511. The light rays received by optical sensors 4509 and 4511 as a result of reflections from any surface such as point 4572 may be substantially different as a result of fine structure (e.g., small regions of different surface tilt, vertical height and reflectivity) in the vicinity of the point in question such as point 4572. As a result, optical sensor 4509 may receive reflected structured light 4518 that is different with respect to reflected structured light 4520 received by optical sensor 4511 and in the same manner also receive reflected non-structured uniform optical transmission reference light 4519 that is different from reflected non-structured uniform optical transmission reference light 4521 received by optical sensor 4511. Non-structured light received by either optical sensor from a given surface point may be used to create normalized optical sensor signal magnitudes that may be used for detecting and compensating for nonlinear operation (e.g., partial or full signal saturation) of individual optical sensor pixel elements in decoding the structured light, so as to improve the accuracy of decoding and extrapolating the structured light.

In embodiments, the plurality of HCBC patterns are formed such that the focused optical image on SBM 4570 resulting from structured light rays 4516 includes a sequence of binary bar patterns representing a weighted numbering system and a sequence of binary bar patterns representing an unweighted numbering system. Moreover, the HCBC patterns (and, more specifically, code drum 4507) may be configured such that each of the binary bar patterns is produced relative to a common offset reference position. In addition each of the plurality of binary bar patterns may be defined at least in part by a characteristic waveform consisting of a mathematical square wave with an assigned spatial repetition period and an offset distance, the offset distance being measurable from a single common offset reference position to a center of symmetry on the waveform. As will be described in detail later, the at least one optical sensor (e.g., optical sensor 4509 or optical sensor 4511) may comprise a set of sensor elements (such as a focal plane array of individual sensor elements (e.g., pixels) and an imaging lens group) and is generally configured to receive and measure at least a portion of the reflected structured light rays 4518 and 4520 and non-structured light rays 4519 and 4521, and to produce one or more sequences of measurement signals. In some embodiments, at least one of the one or more sequences of measurement signals is related (e.g., correlates) to positional coordinates of at least one point on a surface of the object being measured, i.e., to positional coordinates of at least one point on SBM 4570. The sequence of measurement signals produced by elements of optical sensor(s) 4509, 4511 may be conveyed to controller 4513. Controller 4513 may determine positional coordinates on the surface being measured that correspond to the information in a received measurement signal sequence.

System 4500 may also include other components, which for the sake of clarity have been omitted from the figure. For example, in some embodiments the system 4500 includes one or more positioning mechanisms that may be used to control the relative position of optical assembly 4501 to SBM 4570. For example, in some instances system 4500 includes a first positioning mechanism (e.g., positioner 510 in FIG. 1) that is configured to control the position of optical assembly 4501, and a second positioning mechanism (e.g., positioner 520 in FIG. 1) that is configured to control a position of an object being measured, or, more specifically, of SBM 4570. As such, the relative position of SBM 4570 and optical assembly 4501 may be controlled by one or both of the first and second positioning mechanisms. Controller 4513 may therefore be configured to send one or more position control signals to the first and/or second positioning mechanisms. The position control signal(s) may be configured to cause the first and/or second positioning mechanisms to adjust the relative position of SBM 4570 and optical assembly 4501, e.g., for the purpose of adjusting the focus of projection lens group 4508 and the focus of at the least one optical sensor on SBM 4570.

System 4500 may also include features that can be leveraged to compensate for measurement errors that may be introduced by temporal variations in the light output of structured and reference light projector 4503 or, more specifically, from light source 4505. For example, system 4500 may include a light source sensor, which may be integral with or separate from structured light and reference light projector 4503. In any case, the light source sensor may be configured to detect the intensity of the light output (i.e., the intensity of rays 4515) from light source 4505, and to output a light source sensor signal to controller 4513, wherein the light source sensor signal is representative of the detected intensity of rays 4515. With that in mind, controller 4513 may, in addition to receiving the light source signal, further normalize the measurement signals produced by optical sensor(s) 4509 and 4511 by use of signals produced by projection of non-structured optical transmission reference features located on code drum 4507.

As will be described in detail later, system 4500 may be configured such that the measurements made by optical sensor(s) 4509 and 4511 can be used to precisely determine positional coordinates on SBM 4570. For example, in some embodiments the system 4500 is configured such that positional coordinates of points on SBM 4570 may be measured with an error that is less than or equal to about 5 microns, such as less than or equal to about 3.5 microns, or even less than or equal to about 1 micron.

Figure 46:
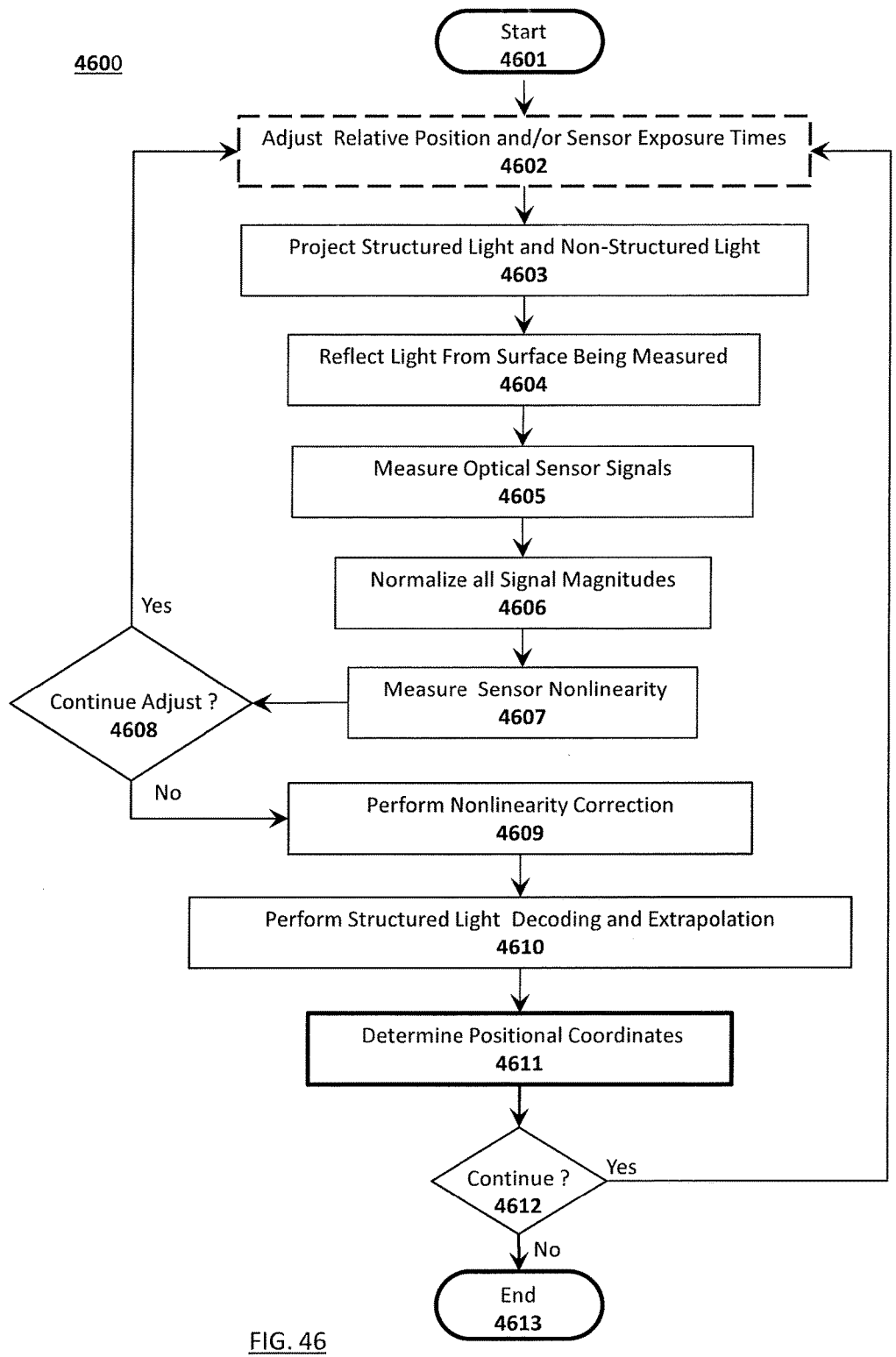
FIG. 46 is a flow diagram of example operations consistent with a method of measuring positional coordinates of a surface of an object being measured with a non-contact coordinate measurement machine consistent with the present disclosure.

Another aspect of the present disclosure relates to a method for measuring positional coordinates of a surface of an object being measured with a non-contact coordinate measurement machine. Reference is therefore made to FIG. 46, which is a flow chart of example operations of one example method 4600 of measuring positional coordinates consistent with the present disclosure. It is noted that method 4600 assumes the use of a non-contact coordinate measurement machine consistent with the present disclosure (e.g., the machine described above in connection with FIG. 45), the details of which are not reiterated in the interest of brevity.

As shown method 4600 begins at block 4601. The method may then advance to optional block 4602, pursuant to which the position and tilt of a surface of an object being measured and the optical assembly may be adjusted independently or relative to one another, as described above and further described later, and/or additionally the optical sensor exposure times may be adjusted. For example, in some embodiments a controller of a non-contact coordinate measurement machine may issue a position control signal to at least one of a first positioning mechanism and a second positioning mechanisms, wherein the first and second positioning mechanisms are configured to adjust the position and tilt of a surface being measured with respect to the position of an optical assembly. More specifically, the first and second positioning mechanisms may adjust the relative position of the surface being measured and the optical assembly in response to the at least one position control signal, e.g., for the purposes of adjusting a focus of the projection lens group and the at least one optical sensor on the surface of the object being measured and/or also laterally adjusting the region of measurement. In addition, because the magnitude of reflected light from the various structured light patterns on the code drum as measured by any one sensor or sensor element may be affected by unknown reflectivity and tilt angle of regions of the surface being measured, in some embodiments a controller of the non-contact measuring machine may pre-adjust the exposure time of the optical sensor or sensors according to a calibration procedure described separately in the flow chart of FIG. 47. A sensor exposure time adjustment procedure described with respect to the flow charts of FIG. 46 and FIG. 47 may provide for improved optical sensor dynamic range (i.e., higher ratio of maximum un-saturated signal value to minimum detectable sensor signal), during system operation when there is a substantial range of reflectivity values on the various types of surface to be measured.

Again considering FIG. 46, following operations of optional block 4602 (or if such operations are omitted), the method may advance to block 4603. Pursuant to block 4603, both structured light and non-structured reference light may be produced, e.g., using a light projector including a code drum as described herein. More specifically, structured light may be produced in a region downfield of a code drum and projection lens, such that the structured light is incident on the surface of the object being measured. Details of the code drum, projection lens and the sequence of structured light and patterns are described elsewhere in the present disclosure (e.g., in connection with FIG. 45 and other figures) and therefore are not reiterated. Similarly, non-structured reference light may be produced on the same region of the SBM downfield as covered by the structured light, by the process of sequentially projecting each of a plurality of optical transmission reference features on the same code drum used to produce the structured light.

The method may then advance to block 4604, pursuant to which structured light and non-structured reference light are reflected from a surface being measured (i.e., production of reflected structured light and reflected non-structured optical transmission reference light). In that regard, it may be understood that operations pursuant to block 4604 include projecting structured and non-structured optical transmission reference light onto a surface being measured, such that at least a portion of such light is reflected.

Figure 47:
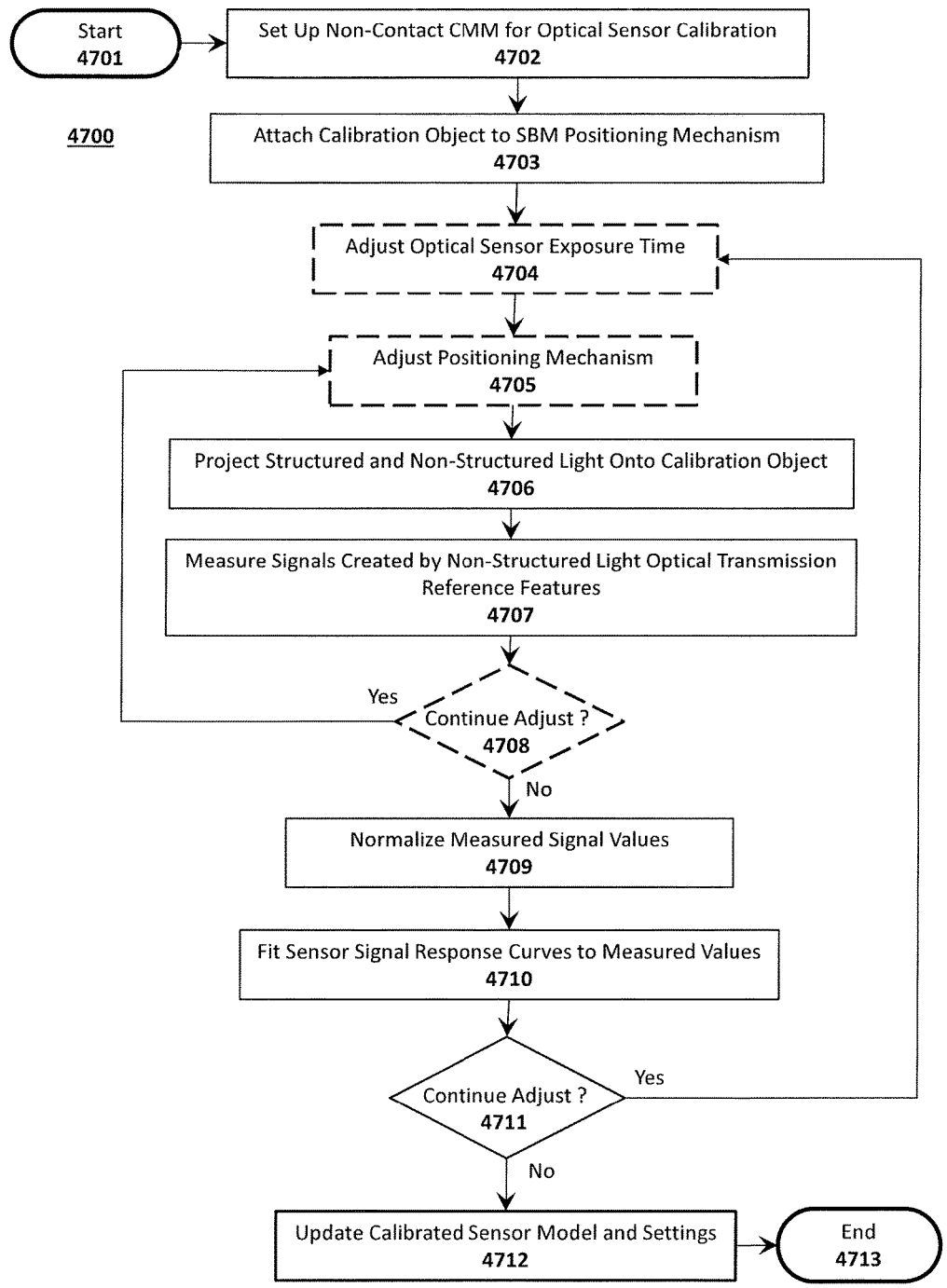
FIG. 47 is a flow diagram of example operations consistent with a method of calibrating optical sensors in the presence of varying amounts of sensor nonlinearity or saturation, in accordance with embodiments of the present disclosure.

Following or concurrent with the operations of block 4604, the method may proceed to block 4605, pursuant to which the reflected light may be measured with one or more optical sensors and one or more individual optical sensor elements, e.g., pixels, as generally described herein and specifically associated with a calibrated signal response model as described in method flow chart in FIG. 47. Further details regarding the specific measurements in block 4605 are provided later, but it may be understood that the outcome of such measurements is the production of at least one sequence of measurement signals, wherein the at least one sequence of measurement signals is based at least in part on measured reflected structured light and measured reflected non-structured reference light. As described herein, the at least one sequence of measurement signals may be transmitted to a controller of a non-contact coordinate measurement machine for processing, with the understanding that the relative magnitudes of measured signals depend not only upon coordinates of the point being measured on SBM 4570 and the surface reflectivity and tilt in the region of the measured point as discussed above, but also upon the degree of any signal saturation or nonlinearity in the one or more optical sensor elements (pixels) in the one or more optical sensors.

The method may then proceed to block 4606, pursuant to which all of the sensor signals corresponding to the at least one measurement sequence may be normalized, based at least in part on at least one light source sensor signal sequence (e.g., signal 17 as shown in a detailed example system block diagram in FIG. 1), and at least in part on the optical transmission reference signals produced by individual optical sensor elements (pixels) in each optical sensor (i.e., optical sensor 4511 or 4509) resulting from projection of a second optical transmission reference feature (e.g, a non-structured reference region as previously discussed on the slide drum with optical transmittance being 50% or close to 50%). To normalize the measurement signal, both the measurement signal, the light source signal, and the signal measured in response to the second optical transmission reference signal may be transmitted to a controller of a non-contact coordinate measurement machine, wherein the controller is to first divide the measurement signal value by the light source signal magnitude to provide a first normalization value and then to divide the first normalization value by the value of the signal measured in response to projection of a second optical transmission reference feature (e.g., ref2, a substantially uniform or completely uniform 50% transmission region on the code drum), so as to produce a final normalized measurement signal.

Following the operations of block 4606 the method may proceed to block 4607, pursuant to which an estimate of a degree of sensor signal nonlinearity caused at least in part by partial or full saturation in one or more sensor signals in the at least one projected sequence may be determined, e.g., by system controller 4513. In embodiments such estimation may be performed using measured sensor signals that result from projection of the first, second, third and fourth optical transmission reference features as discussed in relation to FIG. 4, FIG. 11A, FIG. 11B, FIG. 48 and FIG. 49. Details of the nonlinearity estimate calculation and compensation are provided in discussions relating to FIG. 47 and discussions related to the example sensor saturation curve diagrams in FIG. 48 and FIG. 49.

The method may then proceed to decision block 4608, pursuant to which a determination is made as to whether or not continued adjustments in sensor exposure are required in order to reduce excessive nonlinearity measured in block 4607. If so (YES), the method loops back to optional block 4602, pursuant to which the sensor exposure time is decreased by a first estimated amount. The method then repeats operations in blocks 4603 through 4608, re-iterating the looped operations until the measured nonlinearity in block 4607 is low enough to produce a "no" decision in block 4608. The amount of reduction of exposure time for each iteration may be adjusted in a secondary iteration loop not shown in the interest of brevity.

If the decision pursuant to block 4608 is "no", any nonlinearity detected in block 4607 is small enough to qualify for a calculated nonlinearity correction without reduction of optical sensor exposure time, which condition may desirably result in a greater sensor signal dynamic range. The method may then advance to block 4609, pursuant to which nonlinearity corrections on individual signal magnitudes may be performed in the system controller. Details of one example method to perform the nonlinearity corrections are provided in discussions related to FIG. 48 and FIG. 49.

Following completion of the operations of block 4609 the method may proceed to block 4610, pursuant to which digital decoding of the structured light sequence is performed to determine a lateral position coordinate on code drum 4507 within one identifiable resolution element (e.g., stripel), followed by extrapolation to a more accurate position inside the identified stripel. Details of the decoding process may be found in the flow charts of FIG. 32, and details of the extrapolation processes may be found in drawings of FIG. 22 through FIG. 44 and the associated text. The lateral width of one stripel in absolute distance on the code drum may be less than one micron, one to three microns, greater than three microns, or any other suitable distance. The lateral position error after extrapolation may be less than one half of one stripel width, less than one quarter of one stripel width, less than one tenth of one stripel width, or any other suitable stripel fraction. Since the projection of a light pattern on the SBM 4570 may be characterized by a known lateral magnification from drum to SBM 4570, the projected stripel width on SBM 4570 may be less than, equal to, or greater than the stripel width on the drum and the lateral measurement error on SBM 4570 may be less than, equal to, or greater than the lateral measurement error on the drum.

Following the operations of block 4610 the method may proceed to block 4611, pursuant to which the three-dimensional surface positional coordinates of the surface point (e.g., point 4572 on SBM 4570) are determined. That determination may involve knowledge of the distances and angles and optical parameters of the system elements described in FIG. 45 and the estimated decoded and extrapolated position coordinate on the slide drum. Details of an example triangulation process for the above calculations are provided by FIGS. 3 and 15-18, the measurement process flow chart of FIG. 30, and the corresponding descriptions thereof.

Following the operations of block 4611 the process may proceed to decision block 4612, pursuant to which a decision is made as to whether the method is to continue. If yes, the method loops back to block 4602, e.g., allowing continued measurement of the same surface point with an additional measurement sequence using the same conditions as the preceding sequence or adjusting system conditions, e.g., adjusting relative position of the system and/or the surface being measured and/or adjusting the sensor element (e.g., pixel) exposure times. If not, however, the method proceeds to block 4613 and ends.

Reference is now made to FIG. 47, which is a flow chart of example operations consistent with a method for calibrating an optical sensor to provide for compensation of sensor response nonlinearity in the interest of improving CMM measurement accuracy consistent with the present disclosure. As shown, method 4700 begins at block 4701 and then proceeds to block 4702, pursuant to which an available non-contact optical coordinate measuring system is set up for the purpose of optical sensor calibration.

Following the operations of block 4702 the method proceeds to block 4703, pursuant to which a solid object (e.g., a calibration object having one or more flat or curved surfaces, each having been characterized by a known bidirectional reflectance distribution function (BRDF)), may be attached to a second positioning mechanism (e.g., X,Y,Z, tilt stage 520 in the example system configuration of FIG. 1). A selected surface on the calibration object may then be used as a surrogate for one or more classes of surfaces to be measured (e.g., SBM 4570) during normal operation of a non-contact coordinate measuring machine. The method may then proceed to optional block 4704, pursuant to which sensor exposure time is adjusted by a system controller 4513 to a previously estimated initial value.

Following the operations of block 4704 the method may proceed to optional block 4705, pursuant to which the first and second positioning mechanisms discussed previously may adjust the relative position and tilt of the calibration object in response to position control signals from system controller 4513. For an initial adjustment the first and second positioning mechanisms may be controlled to approximately aim light from structured and non-structured light projector 4503 and reflected by the calibration surface into or nearly into the optical sensor that is chosen for calibration.

The method then advances to block 4706, pursuant to which the non-contact coordinate measuring machine projects both structured HCBC light and non-structured optical transmission reference light onto the calibration object.

Figure 48:
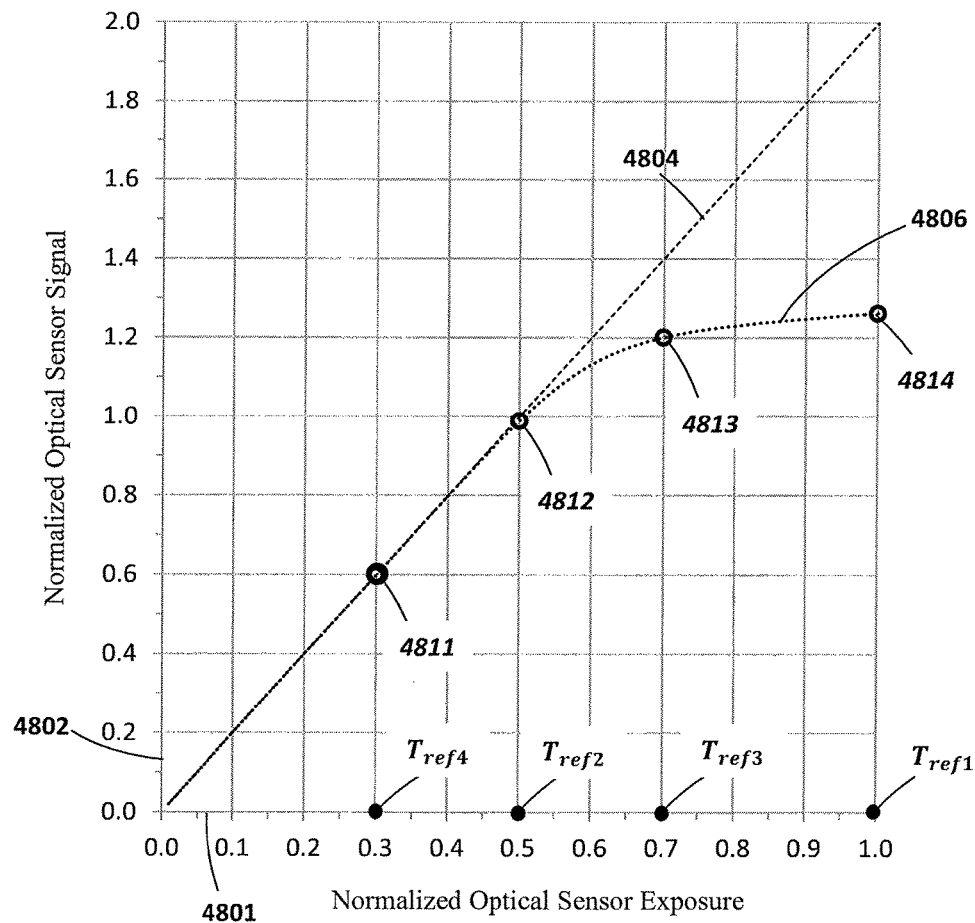
FIG. 48 is an annotated graph showing an example sensor signal curve model for a sensor pixel at an exposure resulting in moderate nonlinearity, also showing signal response calibration points provided by projector reference features, in accordance with embodiments of the present disclosure.
Figure 49:
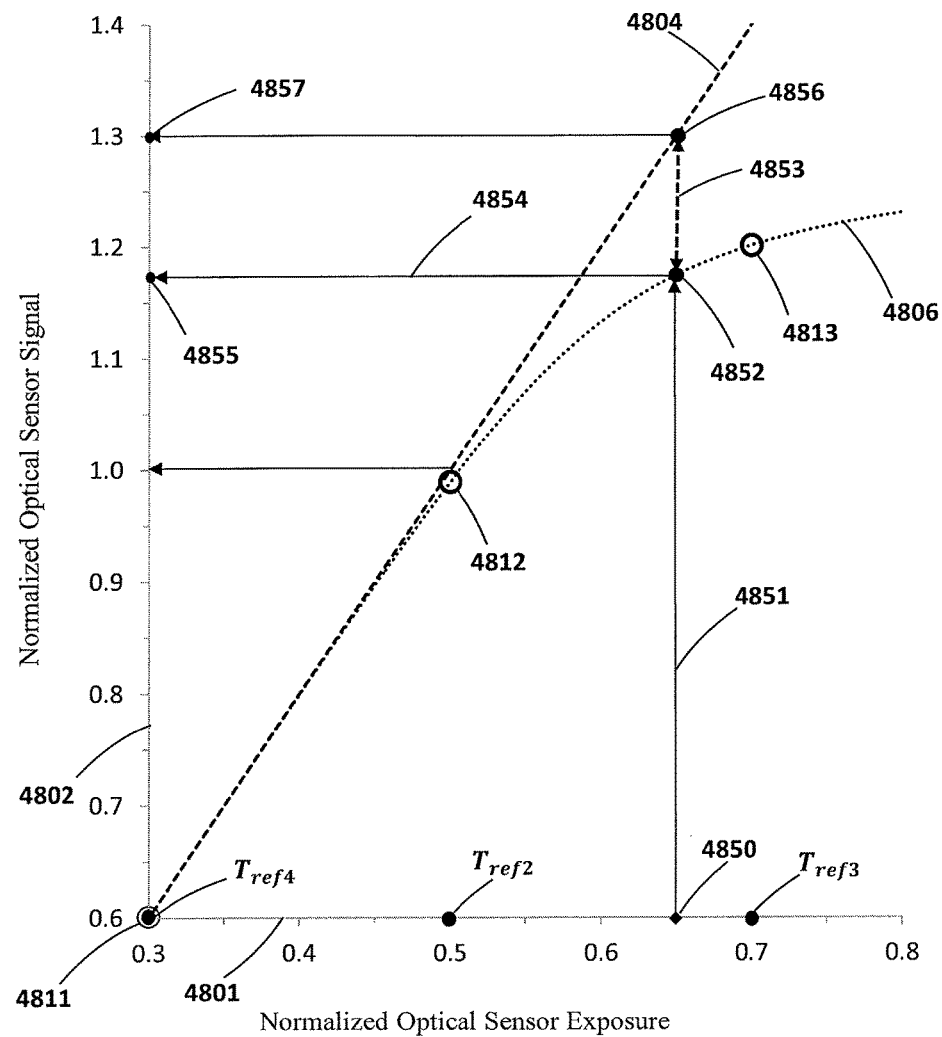
FIG. 49 is an expanded view of the sensor pixel response curve in FIG. 48, showing uncompensated and compensated sensor signal responses for an example exposure level, in accordance with embodiments of the present disclosure.

Following completion of block 4706 the method proceeds to block 4707, pursuant to which the magnitudes of signals resulting from projection of non-structured light optical transmission reference features (e.g., ref1, ref2, ref 3, ref 4 as illustrated in FIG. 4, FIG. 48 and FIG. 49) are measured.

The method then proceeds to optional decision block 4708, pursuant to which a determination is made as to whether further adjustments are needed. If so ("yes"), the method may loop back to block 4505 and reiterate. If not (or if block 4708 is omitted), however, the method may advance to block 4709.

Pursuant to block 4709 all reference signals may be normalized to the signal produced by projection of a 50% optical transmission reference feature (e.g., a second optical transmission reference feature ref2 with optical transmission $T_{ref2}$ on code drum 4507). Further details concerning reference signal normalization are provided elsewhere.

The method may then advance to block 4710, pursuant to which a sensor response model is calculated (e.g., by system controller 4513). In embodiments, the sensor response model may comprise or consist of a table of data value pairs (e.g., where each pair is or includes a normalized sensor exposure value and a normalized sensor signal value) for each specific calibration surface and measurement parameter (e.g., distance to the calibration object surface and other parameters). A graphical example of a normalized sensor response model is shown in FIG. 48 and FIG. 49 as curve 4806.

The method may then proceed to decision block 4711, pursuant to which it is determined whether further adjustment is needed. The outcome of block 4711 may depend, for example, on whether it is determined that additional calibrated sensor response data is required. If so (YES), the method loops back to block 4704 and system controller 4513 may increase or decrease the optical sensor exposure time by pre-determined amounts, followed by the method again following the path from block 4505 to a second arrival at decision block 4711. If at that time the decision in block 4711 is still "yes", the method may repeat the loop from block 4711 to block 4704 and back to decision block 4711. This loop may be repeated until a sufficient amount of sensor signal response versus surface types curves have been created in block 4710.

If the decision pursuant to block 4711 is "no," the method may advance to block 4712, pursuant to which calibration updates to the sensor model and settings are recorded in system controller 4513. The method may then proceed to block 4713 and end.

FIG. 48 is a graphical diagram of normalized optical sensor signal response that relates to blocks 4707 and 4709 of method 4700, and more specifically relates to detecting and compensating for sensor signal nonlinearity (i.e., partial or full signal saturation) in optical sensor signals that may occur when structured or non-structured light is reflected from a strongly reflective and specular region on SBM 4570. The horizontal scale 4801 in FIG. 48 represents optical sensor exposure values normalized to values between zero and one, e.g., by assigning a value of one to the exposure resulting from projection of about 100% optical transmission first reference feature ref1 and a value of 0.5 to the exposure resulting from projection of about 50% optical transmission second reference feature ref2. Optical sensor exposure time has no effect on normalized scale 4801, however it does affect the position of the knee ("break point") of nonlinear sensor response curve 4806 with respect to the normalized exposure values.

The vertical scale 4802 represents optical sensor signal values normalized to values between zero and two (e.g., they represent measured signal magnitudes divided by the measured signal from a 50% transmission second reference feature ref2, or in other words, signal magnitudes multiplied by two). Straight line curve 4804 represents an ideal (linear) sensor signal response as a function of normalized sensor exposure, whereas model curve 4806 represents a moderately saturated sensor response to the same exposures. The shape of model curve 4806 in FIG. 48 may be created in the system controller 4513 by a fitting a substantially general sensor response curve (e.g., controlled by three or four optimizable parameters in the curve fitting process) to fit known and calibrated points 4811, 4812, 4813 and 4814, associated with the optical transmissions of calibrated optical transmission reference features (i.e., optical transmissions $T_{ref1}$, $T_{ref2}$, $T_{ref3}$, and $T_{ref}4$ on code drum 4707). It may be seen that the example curve 4806 in FIG. 48 includes a gradual departure from linearity (i.e., a "knee" in the curve) at a pixel exposure of about 60% of maximum exposure. The exposure value corresponding to the "knee" or "breakpoint" of the signal curve may be one of the parameters used to define the various sensor nonlinearity models. Beyond the region of the knee, the modeled sensor signal may continue to rise with a low slope. Nonlinearity compensation may not be available in any region of low final slopes, but nonlinearity detection is still available.

FIG. 49 shows an enlarged view of the central region of FIG. 48 such that the knee region of the sensor signal model curve 4806 derived from measured reference signal points 4811, 4812 and 4813 can be seen more clearly. To start the process of illustrating how nonlinearity compensation is calculated, an arbitrary value of normalized sensor exposure is chosen, e.g., point 4850 representing an example normalized exposure of 0.65. Vertical construction line 4851 starts at exposure point 4850 and intercepts fitted model curve 4806 at point 4852. The un-compensated but normalized sensor signal value that would be measured can be found by tracing horizontal line 4854 to point 4855 on vertical scale 4802. In addition, provided that a signal vs. exposure model curve fitting process as described previously has been carried out, the model may be used as a lookup table in system controller 4513, such that the measured and normalized signal magnitude 4855 at model point 4852 may be used to find the normalized exposure value at point 4850 on horizontal scale 4801. In turn, exposure value 4850 may be used to calculate the expected value 4857 of perfectly linearized signal model curve 4804 by the simple process of multiplying normalized exposure value 4850 (e.g., 0.65 as in FIG. 49) by two. The resulting linearized and normalized sensor value 4857 (e.g., 1.30 as in FIG. 49) may then be used as a nonlinearity-compensated signal value in sub-stripel extrapolation processes such as are later discussed in relation to flow diagrams of FIG. 42, FIG. 43 and FIG. 44, substantially reducing system errors in measuring the coordinates of points on surface 4570.

The foregoing discussion has focused on a generalized description of various systems, methods, and articles consistent with the present disclosure. Further details regarding such systems, methods, and articles will be provided below in connection with various example embodiments.

One aspect of the present disclosure relates to the details of a non-contact optical coordinate measuring machine (CMM) system for mapping the surface of an object with structured light and optical sensors. In embodiments the optical sensors are or include digital cameras that each contain optical sensor elements including photodiode pixels arranged in a rectangular array of rows and columns, e.g., a rectangular CMOS FPA. FIG. 1 is a block diagram of one example of such a system. The system of FIG. 1 includes a number of system components that may be contained within stationary light-tight enclosure 500, which includes access door 567 and interlock sensor 568. Enclosure 500 may be made to meet the eye safety requirements of the American National Standard for Safe Use of Lasers Z136.1-2014 when using laser diode sources that emit continuous optical power output of up to at least 3 to 5 watts. It may be noted that enclosure 500 also helps temperature and humidity control subsystem 572 to stabilize the temperature of the optics, structural members of the system, and the part or object being measured 569, which may be desirable for 3D measurement accuracy in the micron and sub-micron range.

In use, a robot or human 570 may move an object to be measured 569 through door 567 in enclosure 500 and secure it to XYZ/tilt stage 520. While door 567 is not completely closed, safety interlock sensor 568 may send a signal 560 to controller 4513 to prevent emission from light source 4505, which may be a laser capable of emitting 3 or more watts of power. When door 567 is closed, signal 560 from interlock sensor 568 may be reconfigured to allow laser operation via communication from controller 4513. XYZ/tilt stage 520 may include a simple fixed reference surface and a set of clamps and/or an electronically controlled translation and rotation positioner. If XYZ/tilt stage 520 has sufficient lateral positioning range, XYZ translation positioner 510 may operate only in the vertical (Z) axis. Observation camera 522 includes a spectral filter and an illumination source which may operate in a spectral region different from that of light/laser source 4505 in order to not be blinded by reflected laser light during system operation. Operator or robot 562 may view images of the part to be measured 569 on a screen associated with controller 4513, where the images may be created both by observation camera 522 and by optical sensors 4509 and 4511. In addition these images may be transmitted to remote computers via wired or wireless communication link.

Optical assembly 4501 includes laser source 16, optical fiber 18, HCBC structured and non-structured light projector 4503, optical sensor 4509 and optional optical sensor 4511. Light source 4505 is preferably a Gallium Nitride (GaN) blue laser diode emitting incoherent light at a wavelength between 400 and 450 nm. These wavelengths provide reduced diffraction spreading of the projected light and therefore may improve measurement accuracy. Violet or ultraviolet diode laser sources at wavelengths less than 400 µm may be even more desirable for both reducing the blurring effect of diffraction and reducing the effect of specular reflection from polished surfaces, but optical photon to photoelectron quantum efficiency in available camera FPA's at these wavelengths may be lower and should be considered. The preferred operating mode of light source 4505 is continuous emission, with camera pixel exposures determined by electronic shutter control in the FPA's of optical sensors 4509 and 4511. A commercially available example of incoherent laser source 4505 in FIG. 1 is a 3.5 watt continuous wave 445 nm wavelength, fiber-coupled, multi-single emitter diode laser available from Necsel, Inc., Milpitas, Calif., USA. This specific laser or comparable others may be fitted with a small window port for monitoring the instantaneous laser power output during commanded camera exposure times, with this information transmitted to controller 4513 via signal 17. A detailed discussion of maximum optical sensor exposure times is provided later with regard to FIGS. 6 and 7. The long term absolute value of the source/laser optical power is not needed, but recorded values of measured laser power at a sample rate of at least the projected pattern rate may be used to correct for any output power changes during the projection of an entire HCBC pattern sequence (i.e., during one complete rotation of code drum 4507).

Figure 8:
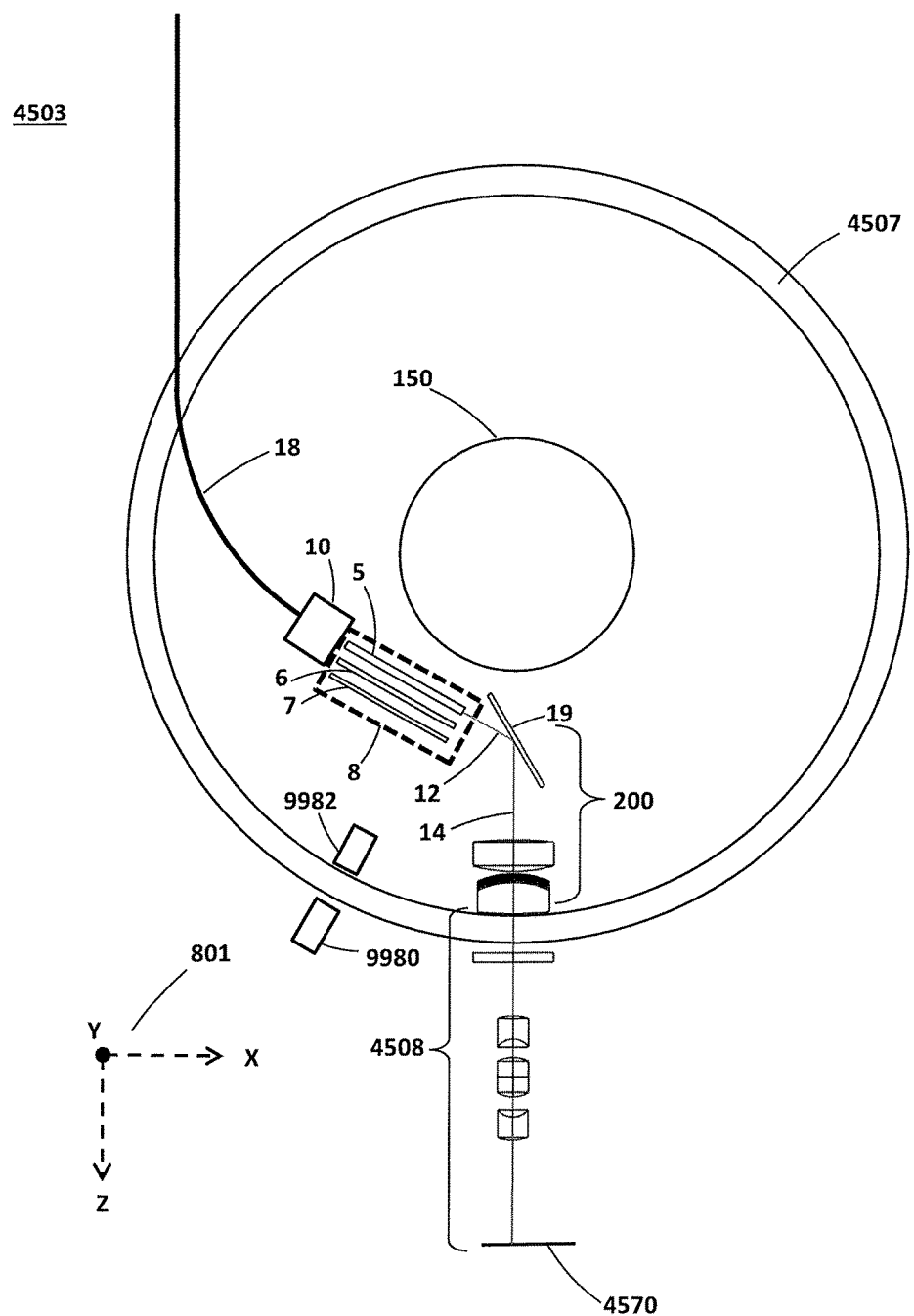
FIG. 8 is a 3D layout drawing of an X Z view of a Hybrid Cyclic Binary Code (HCBC) structured light and non-structured light projector, showing the projector's optical imaging lens and a code drum/cylindrical shell, with a flexible optical fiber delivering illumination to a light pipe assembly, in one non-limiting example consistent with various embodiments of the present disclosure.
Figure 9:
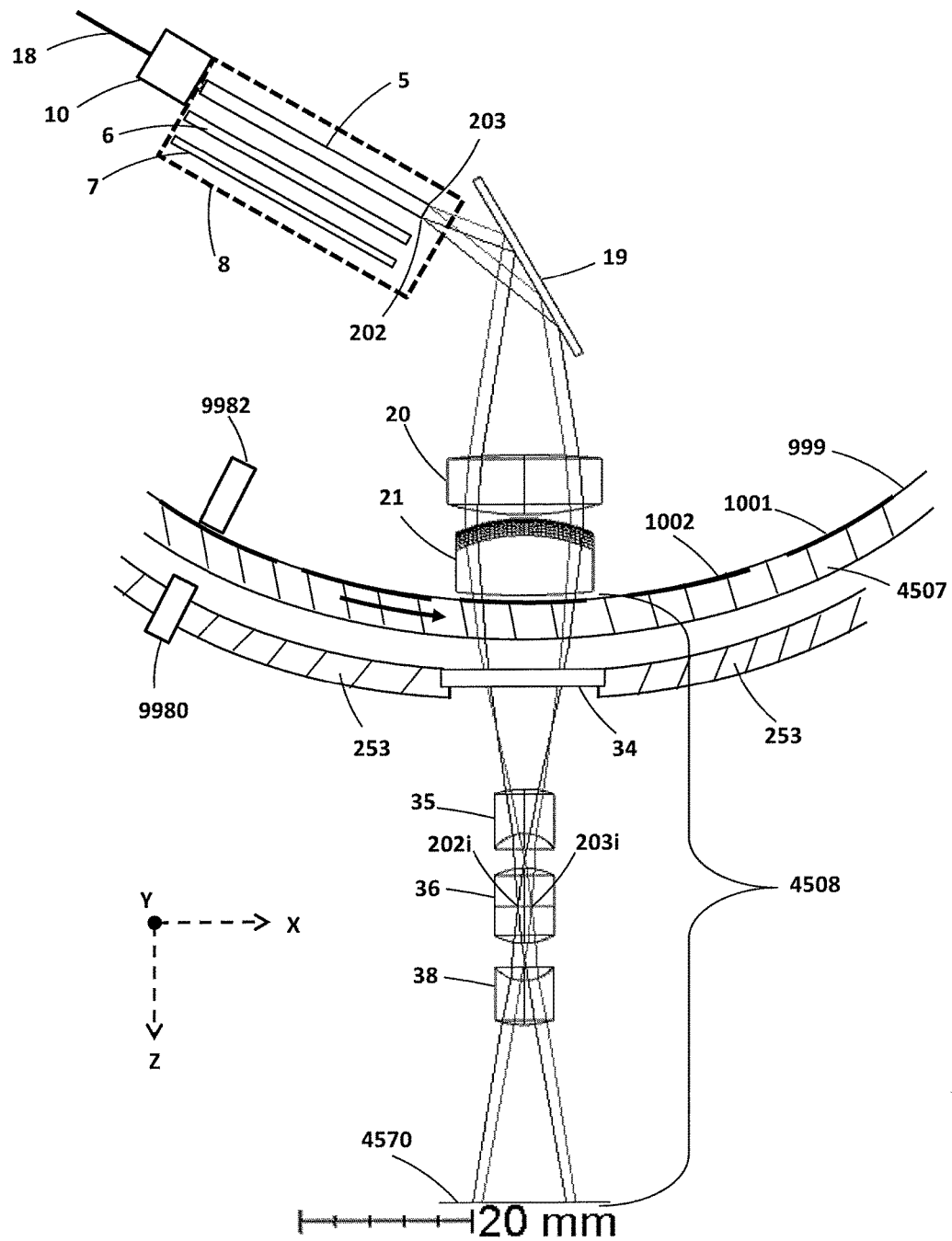
FIG. 9 is an enlarged 3D layout drawing of an X Z view of a portion of FIG. 8, showing a side view diagram of the projector's optical imaging lens, the light pipe assembly and a section of the rotating cylindrical shell inside a protective shroud, in accordance with embodiments of the present disclosure.

Laser coupling fiber 18 is preferably a 400 µm core diameter multimode fiber such as part number FG365UEC available from Thorlabs Inc. Multimode fiber core diameters as small as 200 µm may also be used. They are available and are compatible with lasers from other suppliers, however this is not required for the example system design of the present disclosure. Allowable bending radius of the example Thorlabs fiber is 40 mm, small enough so that the fiber can be bent into position and clamped to illuminate the proximal end of a rigid light pipe as illustrated in FIG. 8 and FIG. 9.

Optical sensors/cameras 4509 and 4511 may have CMOS FPA's with simultaneous start and stop exposure capability over all pixels, also called "global shutter", or may be operated in progressive scan "rolling shutter" mode or "region of interest mode" consistent with the one-dimensional moving illumination patterns formed by HCBC structured and unstructured Light Projector 4503. Example projected patterns and timing will later be discussed in relation to FIG. 5, FIG. 6, and FIG. 7. An example camera body and FPA that may be suitable for the optical sensors is the model GS-U3-2356M-C camera available from Point Grey Research, Inc. The FPA in this camera may be a model IMX252 with global shutter, manufactured by SONY® Corporation. This FPA has a maximum frame rate of 121 fps and has 2,048 by 1,536 pixels with a pixel pitch of 3.54 µm, including both active and non-active areas. At a 12 bit frame rate of 120 per second, the data transfer rate used to read out each FPA is $(12) \times (120) \times (2,048) \times (1,536) = 4.52$ gigabits per second (Gbits/s), slightly under the reported 5.0 Gbit/s capability of example USB-3 digital interface cables 526 and 527. The quantum efficiency of the example FPA is reported to be greater than 60% at 445 nm wavelength, and the dark/readout noise is reported to be less than 2 photoelectrons per exposure.

Figure 1A:
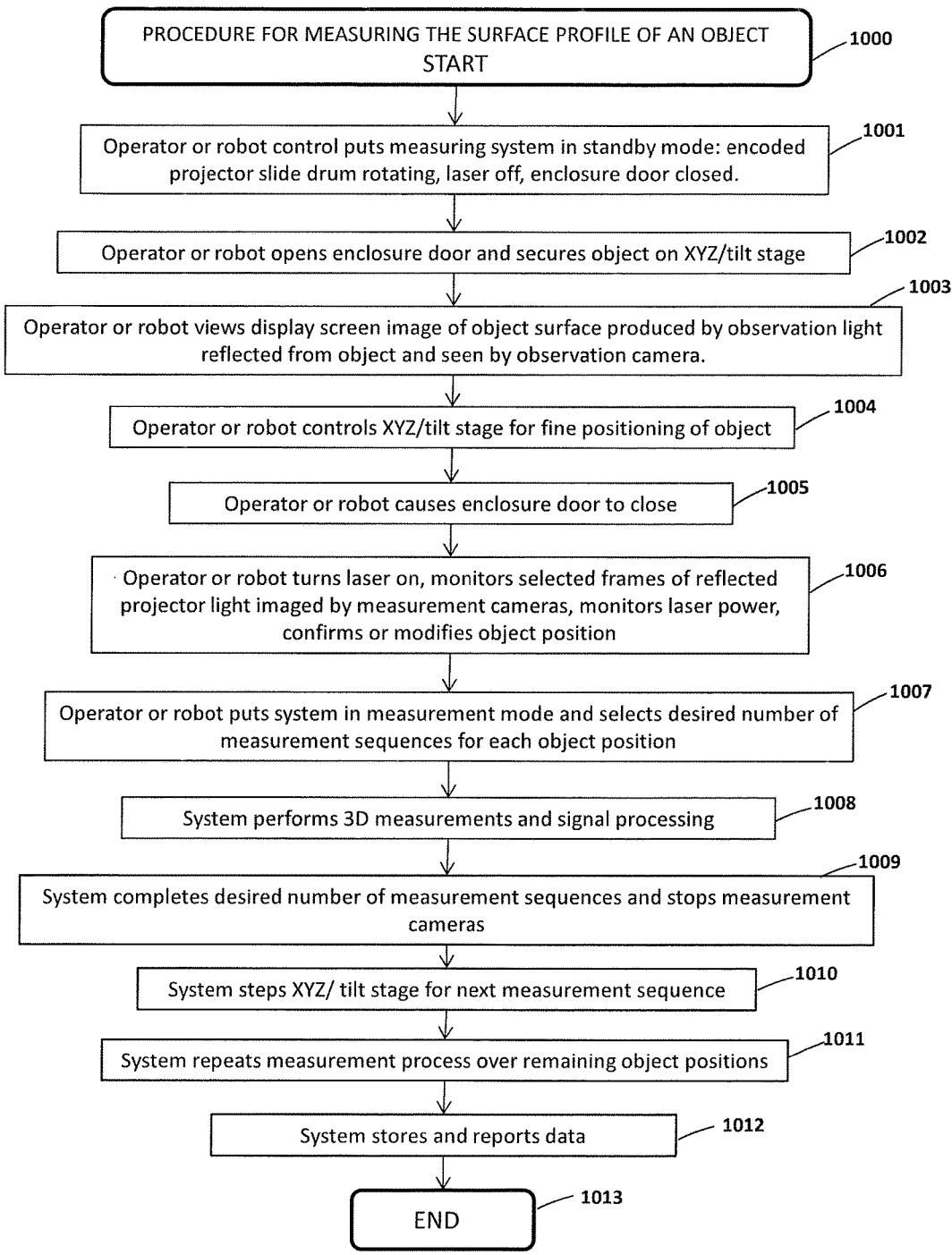
FIG. 1A is a flow chart of example operations of a time-ordered process of measuring the surface profile of an object with the system hardware shown in FIG. 1, in accordance with embodiments of the present disclosure.

FIG. 1A is a time-ordered flow chart of system operations in accordance with one example of a method for measuring the surface profile of an object with encoded structured light consistent with the present disclosure. As shown, the method starts at block 1000. The method then advances to block 1001, pursuant to which the system of FIG. 1 may be put into a standby mode by a human operator or by robotic means, with light source/laser 4505 in the "off" condition, enclosure door 567 closed, and air bearing spindle motor 150 and slide drum 4507 of structured light projector 4503, as shown in a Y-Z view in FIG. 2, rotating at normal operating speed. An X-Z view of example optical components that may include structured light and non-structured light projector 4503 may be seen in FIG. 8 and FIG. 9. The method then proceeds to block 1002, pursuant to which an object being measured may be secured to XYZ/tilt stage 520. The method then proceeds to block 1003, pursuant to which a (non-laser) light source in block 522 of FIG. 1 illuminates the object to be measured. The illumination is partially reflected by the object surface into an observation camera in block 522, separate from Optical Sensors 4509 and 4511, to provide a viewable image on a display screen. The method then proceeds to block 1004, pursuant to which an operator viewing the display may control the XYZ/tilt stage to position the object for measurement. The method then proceeds to block 1005, pursuant to which the operator or robotic control may cause the enclosure door to close, providing an eye-safe environment outside of the enclosure. The method then proceeds to block 1006, pursuant to which laser 4505 is turned on and the operator may view selected images of the object surface created by laser light reflected from the object surface and seen by one or both optical sensors. The laser light preferably illuminates the SBM continuously, but the optical sensors may only receive and measure the reflected light during controlled exposures occurring at times determined by the projector's timing track sensors, shown in the examples of FIGS. 5-7. The operator may view stored object surface images illuminated during selected camera exposure times in a drum rotation period, such that the display screen shows the SBM when it is illuminated only by selected patterns, for example a "knife-edge" pattern which has a single black to white transmission at the center of the projector's encoded beam.

The method then proceeds to block 1007, pursuant to which the system is put into measurement mode and a desired number of drum rotations (measurement sequences) per object position is defined, e.g., by the operator or by pre-programmed default. The method then proceeds to block 1008, pursuant to which 3D measurements and signal processing may be performed, e.g., in accordance with the a summary description of the method shown in FIG. 30. The method may then proceed to block 1009, pursuant to which the desired number of measurement sequences are completed and the camera exposures are stopped. The method then proceeds to block 1010, pursuant to which the system may step the XYZ/tilt stage such that a next region of the SBM may be measured. The method then proceeds to block 1012, pursuant to which the method of blocks 1008 and 1009 are repeated until all desired portions of the SBM have been measured. The method then proceeds to block 1012, pursuant to which the system reports measurement results to internal and external storage for further processing and evaluation. Following the operation of block 1012, the method may proceed to block 1013 and end.

Figure 2:
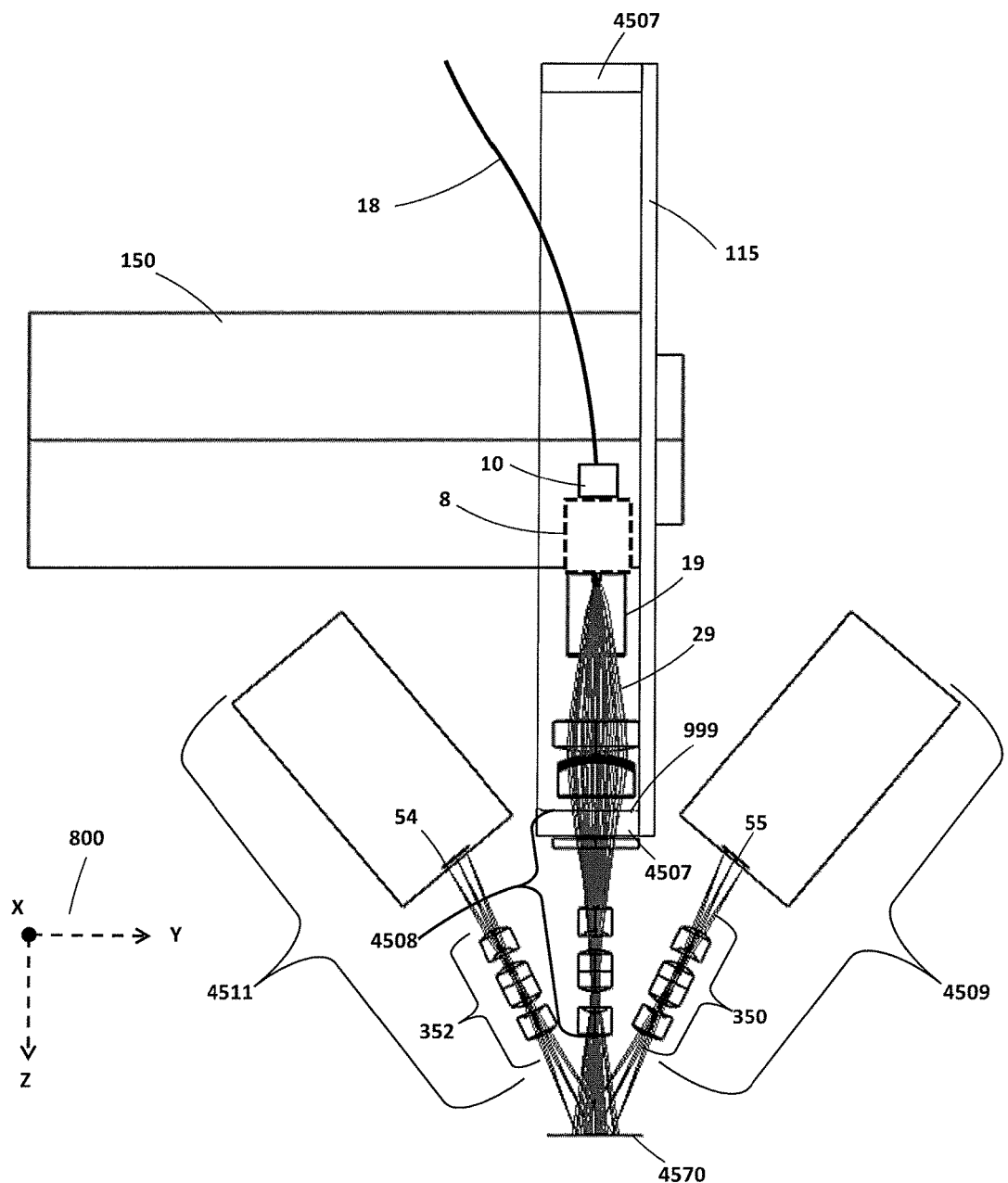
FIG. 2 is a 3D layout view in the Y Z plane of selected components of an example hybrid cyclic binary code (HCBC) optical assembly, showing two optical sensors and a central structured and non-structured light projector with an air bearing spindle motor and a rotating cylindrical code drum, in accordance with embodiments of present disclosure.

FIG. 2 is a 3D view of an example optical assembly 4501 as seen in the Y-Z view as shown by orientation indicator 800. Air bearing spindle motor 150 is shown rotating code drum 4507 supported by mounting flange 115. In some embodiments, the projector's coding surface 999 on the inner surface of code drum 4507 comprises thin film metallic patterns created by direct photolithography; however pattern creation may be accomplished by other means. Again in the example design of the present disclosure, code drum 4507 includes 27 different slide positions, 23 of which are HCBC structured light bar patterns and four others are optical transmission reference features previously discussed (i.e., ref1, ref2, ref3, ref4) and as shown in the X-Z view of FIG. 4.

Code drum 4507 and flange 115 may be made of silica glass, bonded together, e.g., with a high strength UV-cured bonding agent. Laser coupling fiber 18 is shown passing over the inside rim of drum 4507 to positioning clamp 10. Laser light is emitted by the distal end of fiber 18 and passes across an air gap to a selected larger diameter rigid light pipe inside an example light pipe assembly 8. In one example embodiment there may be several selectable circular cylinder light pipes having different inner diameters inside of light pipe assembly 8. Further detail on the light pipe assembly is presented in discussions related to FIG. 8 and FIG. 9.

A cone of laser light rays 29 is shown emerging from the end of a selected light pipe in assembly 8 and re-directed into the projector's condensing lenses by flat mirror 19, illuminating a portion of projector coding surface 999. The illumination rays not blocked by opaque portions of the bar pattern continue into and through example projector imaging lens group 4508 and finally onto reference plane 4570. It should be noted that the projector imaging lens group includes the thickness of silica code drum 4507 which may vary for regions of the drum carrying optical transmission reference features, illustrated in FIG. 4. It should also be noted that the optical rays 29 shown in FIG. 2 are illumination rays and not image focusing rays, i.e., in this drawing they originate at the end of light pipe assembly 8 instead of at the projector's coding surface 999 on code drum 4507. Detailed drawings and discussion of the projector's image focusing rays are presented later, e.g., in FIG. 3 and others. Also shown in FIG. 2 are example embodiments of optical sensor 4509 and optional optical sensor 4511, with respective focal plane arrays (FPA's) 55 and 54, and example sensor focusing lens groups 350 and 352, all of which will be described in detail later.

It should be noted that FIG. 2 and other drawings in the present disclosure may make use of a 3D layout type of view such as used in optical design software instead of a single plane cross-section view. It has the advantage that all desired lines including optical rays may be visualized as projections onto a given plane regardless of their perpendicular distance from it. Lines parallel to the given plane appear at full length in this type of view, whereas lines not parallel to it will appear as shortened. Objects not essential to the purpose of a drawing may be intentionally omitted for clarity.

The air bearing spindle motor 150 of FIG. 2 can provide sub-micron positional accuracy for the code drum carrying the patterns to be projected, and in addition provide low friction and long operating life. One non-limiting example of an acceptable spindle motor/bearing assembly is the commercially available CANON®, Inc. model SP-3611AB2, which has a diameter of 54 mm and a length of 142 mm. It may need a source of clean and dry compressed air. Air cleaner 571 shown in the block diagram of FIG. 1 filters out small particles and removes any moisture from an available compressed air supply. The example motor-air bearing assembly contains a direct current servo motor and a CANON® Air Bearing Model AB36RV.

In the present disclosure the structured light measurement direction is parallel to the Y axis, which in turn is parallel to the spindle rotation axis. Therefore, any axial runout or displacement error in the positioning of the spindle would normally be of concern. However, according to the manufacturer's data sheets, the assembly should exhibit axial displacement of less than 0.2 μm (200 nm) for an axial load of 0.3 Kg, which is representative of the estimated mass of cylindrical shell 4507 plus supporting flange 115. The entire system would have to be tilted by 90° from its pose in FIG. 2 to cause even this small error. Therefore, although axial error could be a serious concern with ball and roller bearings, it is not expected to be a concern with an air bearing such as in the above example.

FIG. 3 is a cross-section view in the YZ plane of structured light projector code drum 4507, seen in position for projection of a slide pattern on projector coding surface 999, and also projector imaging lens group 4508 and optical sensor 4509 (A simple cross-section view is used in FIG. 3 because it is not necessary to show any features out of the XY plane). Optical sensor 4509 contains FPA 55 and imaging lens group 350 with lens elements 56, 57, 58 and 59. Optional optical sensor 4511 is not shown in FIG. 3 as its FPA and optics are identical to those of optical sensor 4509, and its tilted position is a mirror image of that of optical sensor 4509. Accordingly, the discussion of the elements of optical sensor 4509 should be considered to apply equally to optical sensor 4511. That being said, the optical elements of optical sensor 4509 are described in detail in the optical prescription of Table 5.

The projector imaging lens group 4508 in FIG. 3 includes projector code drum substrate 4507, environmental window 34, and individual lenses 35, 36, and 38 that are described in detail in the optical prescriptions of Tables 3 and 4. The cross-section profile shown for projector coding surface 999 and timing track 998 shows elevated rims 120 and 121 on either side. These may provide the function of dams for the purpose of containing liquid photoresist at a desired thickness on the inner surface of spinning of code drum 4507 during an example photolithographic process for creating precise HCBC patterns on projector coding surface 999.

Figure 15:
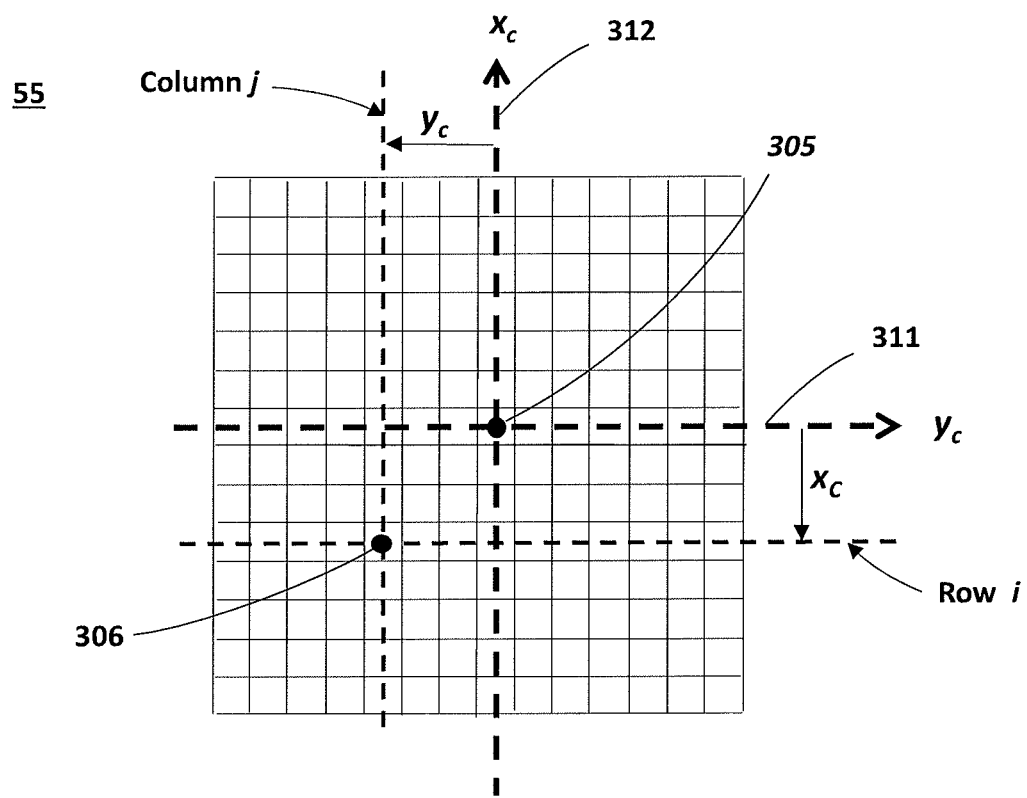
FIG. 15 shows row and column geometry in an example optical sensor/camera focal plane array of individual optical sensor elements, e.g., pixels, consistent with the prior art.

Pursuant to a 3D triangulation process to be performed with the optical elements shown in FIG. 3, it should first be noted that the camera FPA has a finite number of physical pixels whose centers define an array of physical points with accurately identifiable coordinates specified by row and column addresses i and j respectively, as can be seen in the simplified FPA model of FIG. 15. On the other hand, while projector slide points such as 106, 105 and 104 on projector coding surface 999 may be located on all projector slides, they may not correspond to any unique identifiable physical point on any one slide until the entire slide sequence is first decoded into stripels and then interpolated to obtain an estimated sub-stripel y coordinate. In effect there may be an infinite number of possible projector slide surface points. For this reason and others, pixel centers on the FPA rather than points on the projector slide plane are chosen in the present disclosure as the starting points for measurement rays in the 3D triangulation process. This choice is made possible because, for un-polarized incoherent light such as that produced by laser diode emission and multiple reflections in the optical fiber and light pipe, the path of any light ray downfield of the light pipe, through the projection lens to a reflecting surface and including reflected rays into the optical sensors is the same independent of the direction of physical energy flow.

Again in respect to FIG. 3, the combination of a pixel center point such as point 305 on FPA 55 and a point at the optical sensor 4509 aperture stop center 60 completely defines the two-dimensional direction of a chief ray. It should also be noted that the chief ray direction may also be defined by the same pixel center point and the position of the lens group's first principal point 301. By definition, any ray that departs principal point 302 has the same direction as a ray incoming to point 301. The ray may be laterally displaced, but this is taken into account in computer ray tracing. For a central chief ray such as ray 3050 in FIG. 3, lateral displacement is zero. Using either means of defining the outgoing chief ray direction, it continues in the same direction until it intersects either SBM 4570 or a calibration reference surface, thereby defining the 3D coordinates of a measurement point. Although the projector's structured light coding is not required to define which points on the surface will be measured, the coding provides a readout of the angle from the projector's optical axis to each point.

Figure 18:
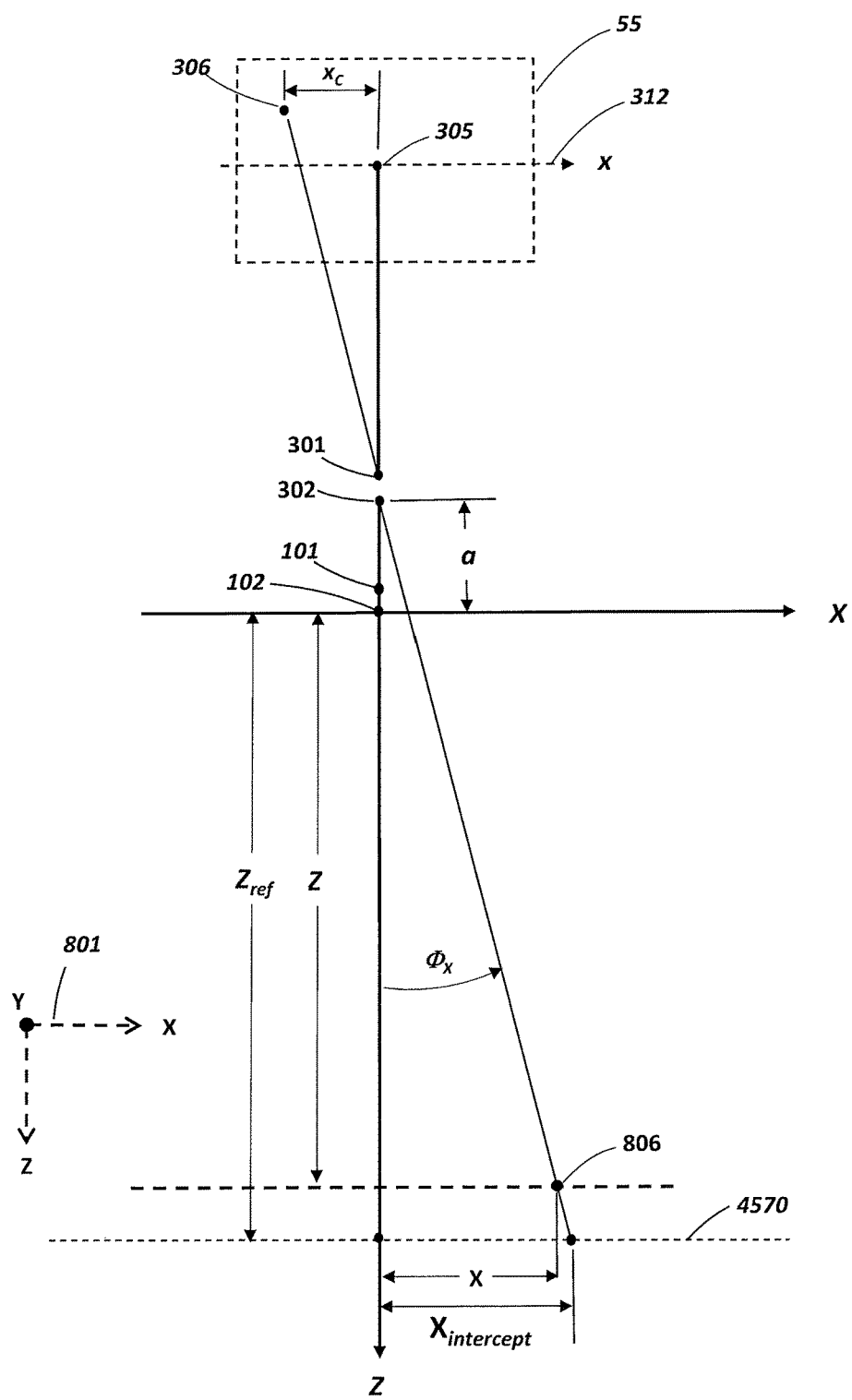
FIG. 18 is 3D layout drawing of triangulation measurement geometry as seen in an X Z view.

To summarize, chief ray 3050 of example optical sensor 4509 as shown in FIG. 3 may be back-projected from field point 305 at the center of FPA 55, to pass through both principal point 301 and the center 60 of the lens group aperture stop and continue to possible points of intersection 7046, 7050, and 7054 at each of three reference planes 695, 4570, and 705, which are located at different depths Z from projector lens second principal point 102. It can be seen that the Y coordinates of surface intersection points 7046, 7050, and 7054 are a related to the Z coordinate of each reference plane. These intersection points on the three example reference planes may now serve as back-projection light sources that produce new chief rays passing through principle points 102 and 101 of projector imaging lens group 4508 and continue to intersect the inner surface of code drum 4507 at image points 106, 105, and 104, each having a unique y coordinate on projector coding surface 999. When the triangulation equations in equations (6), (7) and (8) of the present disclosure are used, the y coordinates of these back-projected image points become calibrated functions of the Z coordinates of the SBM intersection points. The geometry for deriving triangulation equations (6), (7) and (8) for this calculation is shown in FIGS. 17 and 18. With respect to best understanding of the process of triangulation in the present disclosure it should be kept in mind throughout that projector illumination has no effect at all in determining the location of any of the measurement points on the SBM. Projector illumination is used solely as a readout mechanism, providing each pixel with a reflected light signal sequence which when decoded allows the system to determine the one-dimensional projector ray angle θ as seen in FIG. 17.

In another aspect of the example optical system embodiment of FIG. 3, FPA 55 of optical sensor 4509 is tilted about the X axis (which points into the plane of the drawing). While it may not be obvious from the drawing, in a ray trace model the lens optical axis in each camera may be decentered from the FPA centers. Both the decenter distance and tilt angle may be optimized in a ray tracing computer model to achieve the Scheimpflug imaging condition for improving focus of a bundle of rays about the chief ray on a tilted reference image plane. Various methods of achieving the Scheimpflug condition are known, but when there are several lens elements and a desire for enhanced performance, the computer ray trace method as discussed in the system modeling and calibration method of FIG. 31 of this disclosure may provide superior accuracy. A combination of computer optimization and manual tilt and decenter optimization using ZEMAX® OPTICSTUDIO™ 15.5 for example may be used to minimize the image blur spot radius on a horizontal image plane.

One benefit of two optical sensors in a mirrored arrangement such as when optical sensor 4511 is tilted in the opposite direction with respect to optical sensor 4509 is the closeness of resultant SBM measurement points from the two optical sensors, especially near the Z axis. In this case if the ray from one camera pixel is occluded because of a steep surface protrusion or hole, a ray from a pixel in the opposite camera may be able to create a nearby non-occluded measurement point.

Attention is now directed to FIG. 4, which presents an XZ layout view of the chief components of an example structured light and non-structured light HCBC projector. Shown in cross-section are air bearing spindle motor 150 and rotating code drum 4507 carrying example structured light patterns 1001, 1002, 1003, and 1004 (with example pattern index values of p=23, p=22 p=21, and p=20, respectively) on projector coding surface 999. It should be noted that in FIG. 4 the rotation of code drum 4507 is shown in the counter-clockwise direction in order to be consistent with the pattern projection sequence shown in FIGS. 5-7 in which, for drawing clarity, simple knife-edge pattern 1001 is shown to be projected first. Code drum 4507 also may carry various optical transmission reference features such as ref1, ref 2, ref 3 and ref4, illustrated in this example embodiment as various cylindrical absorbing glass lens elements inserted in various slots in drum substrate 4507 to provide the function of optical transmission reference retention features. In the example embodiment of FIG. 4, ref1 is a section of clear substrate 4507 with no reference retention feature required. It should be noted that ref4 may be configured to provide a lower transmission than ref2 and yet have more or less thickness by use of a different absorbing glass. An example projector imaging lens group 4508 is also shown in FIG. 4, comprising the appropriate thickness of the transparent substrate of code drum shell 4507, clear environmental window 34, and lens elements 35, 36, and 38 described in detail in Table 3 and elsewhere. Example rays from points on projector coding surface 999 are shown to focus on reference plane 4570. It can be seen from orientation indicator 801 that the y measurement axis is pointed into the plane of the drawing and is parallel to the spin axis of both air bearing motor 150 and code drum 4507.

In accordance with an example code sequence referenced throughout this disclosure, there may be a total of 27 pattern sectors spaced at angles of β radians, with the structured light patterns and reference features covering 90% of the total inner shell circumference more or less. Therefore the arc length L of each pattern in this example design is 90% of the arc length ρβ of a single sector more or less. However, higher or lower ratios of L to ρβ may be chosen.

HCBC binary bar patterns 1001, 1002, 1003 and 1004 are schematically shown edge-on as bolded arcs on the inner circumference of code drum 4507, with a projector illumination window of width W. Bar pattern 1001 is shown centered on window W. An example angular separation β between patterns is 360°/27=13.33° with an example inner shell radius ρ of 76 mm. The arc length ρβ is then (76) (13.33)(π)(180)=17.68 mm, whereas the associated straight line chord length is (2)(ρ) (sin(β/2)=17.64 mm. Tangential velocity $V_{TANGENTIAL}$ may be calculated by the formula $V_{TANGENTIAL}=2\pi\rho f\_rot$, which is 2.10 mm/s as listed in Table 1, which is located after the discussions of FIGS. 5 through 6.

Figure 5:
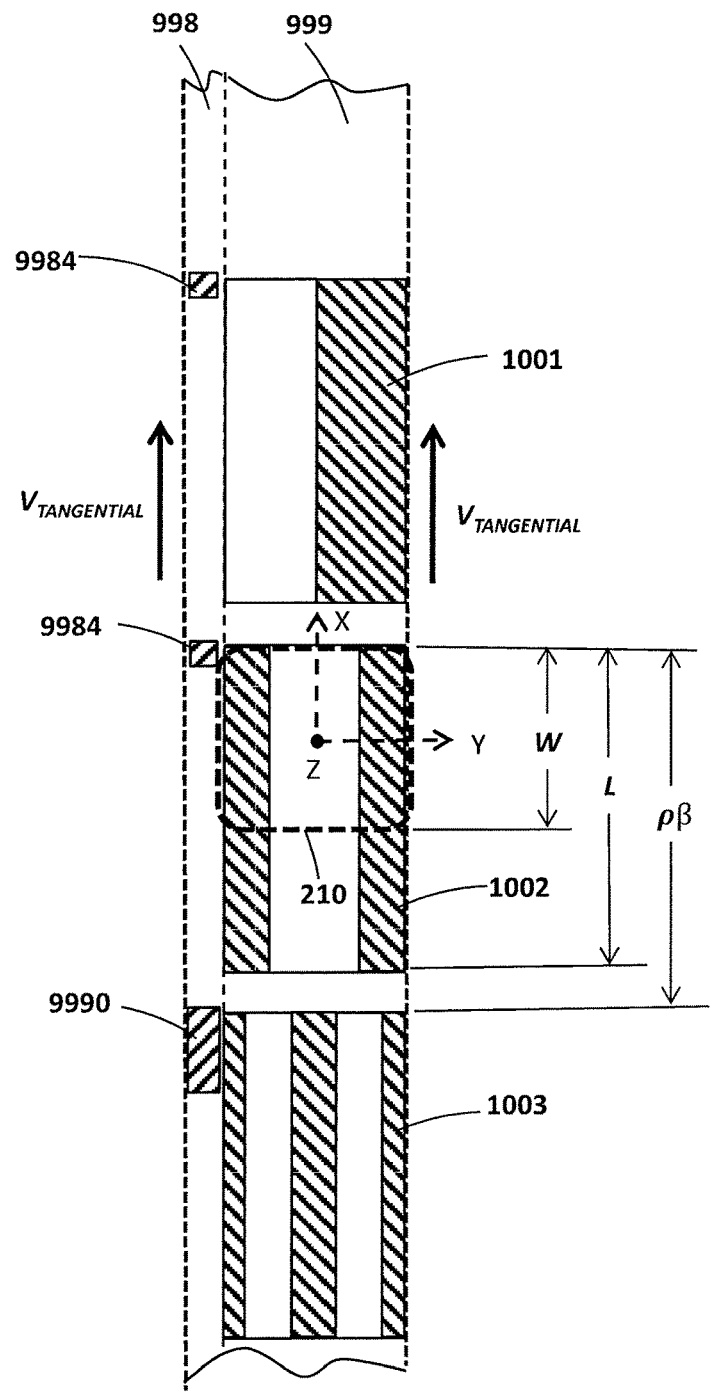
FIG. 5 is a diagram of a rolled-out imprint on a flat surface of a portion of an inner surface of a code drum in accordance with the present disclosure, showing an imprint of three example Gray code slide patterns on a projector's coding surface and three example timing marks on a timing track region.

FIG. 5 depicts a flat imprint of projector coding surface 999 and adjacent timing track 998 made by a virtual procedure of rolling a portion of the inside surface of cylindrical shell 4507 onto a horizontal surface. This procedure is done for the sake of clarity and ease of understanding, i.e., arc lengths in FIG. 4 such as L may then be represented in a flat drawing. Timing track 998 may have a series of identical marks 9984 and a single identifiable mark 9990 written by direct photolithography or other means. These marks may be read out by light source 9980 and detector 9982 and converted to electronic signals used for both incremental and absolute cylinder rotation angle references and for speed and phase control feedback. Speed and phase control may include a phase-lock loop using a selected digital electronic waveform as a reference and forcing the frequency and phase of, for example, the leading edge of the timing marks on the drum as they pass a mechanical readout position to be the same as that of the electronic reference waveform, with the exception of any desired fixed value of phase lead or lag. Any of several known methods for the timing marks, readout and phase locked loop control may be used.

Projector coding surface 999 in FIG. 5 is depicted with example Gray code slides 1001, 1002 and 1003 moving in the X direction through illumination window 210. The imprint of each slide has a length that is the same as arc length L and illumination width W as shown in FIG. 4. The patterns may be considered as moving at velocity $V_{TANGENTIAL}$, which may be any suitable velocity and is listed in Table 1 as 2.204 mm/ms for the sake of example.

Figure 6:
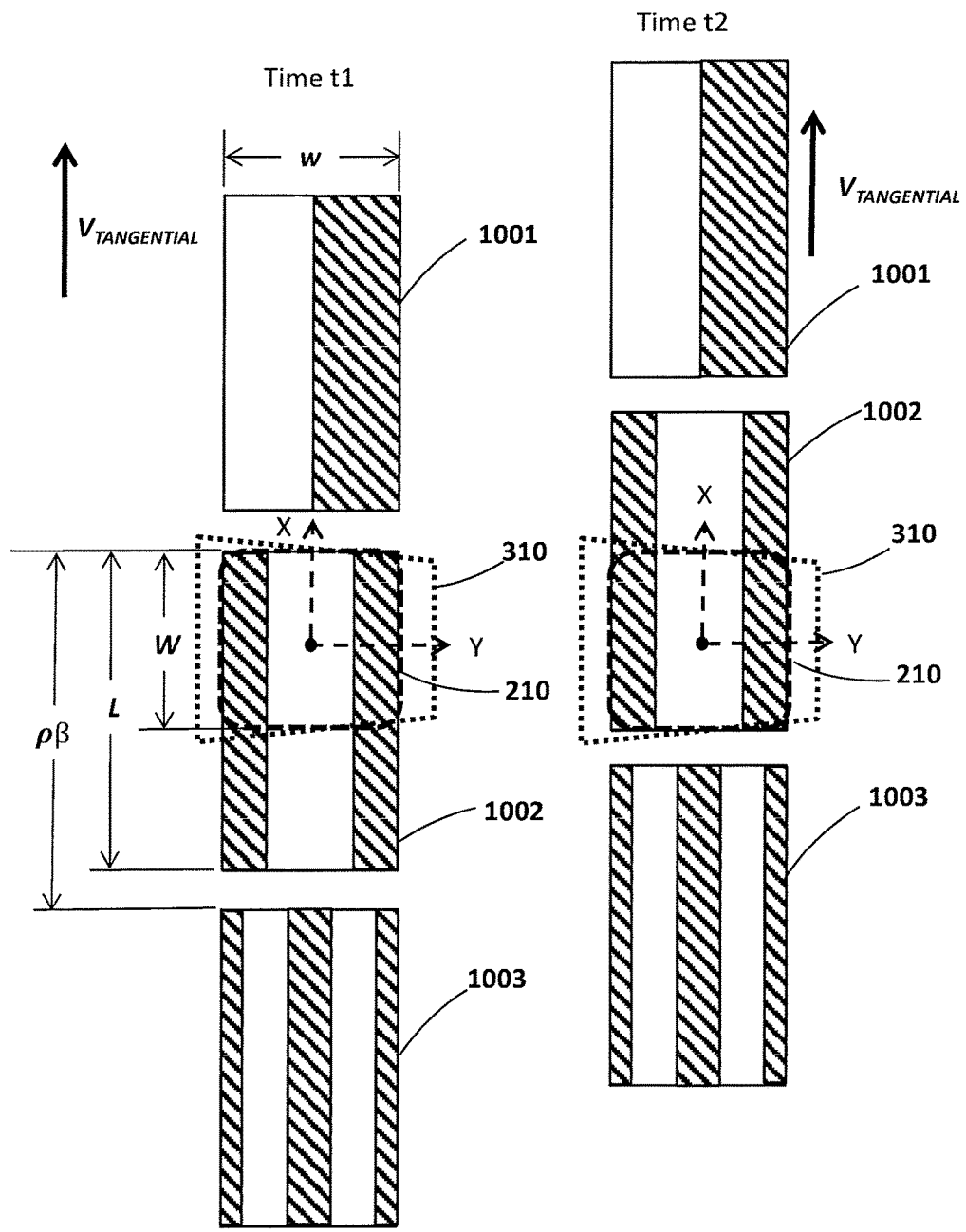
FIG. 6 is a diagram of a rolled-out imprint of moving slide patterns on a projector's coding surface entering and leaving the projector's illumination window, in which there is an equal pattern exposure time for all camera pixels, in accordance with embodiments of the present disclosure.

In FIG. 6, a parameter of importance for measuring either very low reflectance diffuse surfaces or tilted specular surfaces is addressed, namely the full-field camera pixel dwell time, i.e. the time for a single projector pattern to illuminate all of the camera pixels whose back-projected images on the SBM are inside the region illuminated by the projector. Larger dwell times allow longer camera pixel exposures and therefore larger electrical signal outputs for a given reflected light intensity. There is no increase of optical blurring as exposure is increased (within limits discussed in the following paragraphs) because during exposure from a given slide pattern the position of projected pattern edges remains constant on the SBM even though the slide drum is rotating.

In FIG. 6, time t1 represents the time at which the leading edge of slide 1002 reaches the upper edge of the projector's illumination window 210 and also reaches the upper edge of back-projected image 310 of the camera's FPA. It should be noted that image 310 is keystone shaped because of the tilted FPA used to achieve the Scheimpflug focusing condition. The "full field dwell time" FFDT is achieved when the camera's global shutter opens at time t1 and closes at time t2, at which time the trailing edge of slide 1002 reaches the lower edge of the projector's illumination window 210 and back-projected FPA image 310. FFDT therefore determines the maximum available exposure time for most of the camera pixels. The actual exposure time for a given projection sequence may be controlled at a smaller value, such as when pixel nonlinearity or near saturation is indicated. It may be seen in FIG. 6 that the distance moved by slide 1002 between its initial position at time t1 and its final position at time t2 is (L−W). During that motion each point at a constant Y coordinate inside window 210 and FPA image 310 sees the same pattern transmission value because of pure X direction motion. The time FFDT is therefore given by the expression $$FFDT=(L-W)/V_{TANGENTIAL} \qquad (1)$$

Using the parameter values from Table 1 below, Equation (1) predicts a maximum uniform exposure time of 3.26 milliseconds (ms). However, the capability for even more exposure time for certain conditions is desirable even though it may not always be required.

By reducing the size of the data-producing region on the camera FPA in the X direction only, longer exposures than specified in Equation (1) may be allowed. This situation is modeled in FIG. 7, which shows the same projector patterns, illumination window and back-projected camera FPA as in FIG. 6 but considers only camera pixel data that is collected from a narrow rectangular strip of FPA rows corresponding to the small rectangle 312. Specifically, the pixel rows in FPA 55 are parallel to the projector Y axis as shown in the FPA drawing in FIG. 15 and the projector slide plane drawing in FIG. 16. The X width w in FIG. 7 thus corresponds to a group of FPA rows. Which group of rows it corresponds to is determined by the distance xo of strip 312 from film gate center as seen in FIG. 7. I.e., xo in the projector slide plane is proportional to an equivalent offset of the corresponding group of rows in the camera FPA, with the proportionality constant being determined by the overall triangulation geometry shown in FIG. 17 and FIG. 18. It can be seen in FIG. 7 that a much longer maximum dwell time for any single slide may be allowed for a specified narrow strip w corresponding to a group of rows on the FPA rather than assuming full film gate width W corresponding to near full field on the FPA. This relation is represented in Equation (2), where RFDT means "reduced field dwell time".

$$RFDT=(L-w)/V_{TANGENTIAL} \qquad (2)$$

For example, if w=W/10, RFDT=7.06 ms instead of 3.26 ms.

In the extreme for a single camera pixel row, w may be considered as essentially zero, so that the Single Row Dwell Time SRDT is given by Equation (3)

$$SRDT=L/V_{TANGENTIAL} \qquad (3)$$

In the example design with gaps between slides being 10% of the arc length between slide centers, SRDT is 7.5 ms, which would more than double the maximum pixel exposure allowed for FFDT.

A summary of the above and other parameters for the example system is presented in Table 1.

TABLE 1

SUMMARY OF PARAMETERS FOR EXAMPLE PROJECTOR CODE DRUM

| Parameter | Value |
| --- | --- |
| Number of HCBC coded patterns ($p_{MAX}$) | 23 |
| Number of total slide positions $N_s$ ($p_{MAX}$ + 4) | 27 |
| Angular spacing of slide patterns (β_deg = 360/$N_s$) | 13.33 degrees |
| Angular spacing of slide patterns (β = 2π/$N_s$) | 0.2327 radians |
| Drum/cylinder rotation frequency (f_rot) | 4.44 Hertz (RPS) (Normal Operation) |
| Drum/cylinder rotation frequency (f_rot_lith) | 50 Hertz (RPS) (Photolithography) |
| Time for projection of one HCBC sequence (1/f_rot) | 0.225 seconds (Normal Operation) |
| Time for writing one HCBC sequence (1/f_rot_lith) | 0.0200 seconds (Photolithography) |
| Drum/cylinder rotation frequency (RPM = 60 × f_rot) | 266 RPM (Normal Operation) |
| Drum/cylinder rotation frequency (RPM = 60 × f_rot_lith) | 3,000 RPM (Photolithography) |
| Angular velocity (ω = 2π × f_rot) | 27.89 Rad/sec (Normal Operation) |
| Angular velocity (ω = 2π × f_rot_lith) | 314 Rad/sec (Photolithography) |
| Inner radius ρ of cylindrical shell | 76.0 mm |
| Full wall thickness of cylindrical shell | 6.00 mm |
| Tangential velocity of patterns ($V_{TANGENTIAL}$ = ρω) | 2.12 mm/ms (Normal Operation) |
| Illumination window width and length (W=) | 10.0 mm |

TABLE 1-continued

SUMMARY OF PARAMETERS FOR
EXAMPLE PROJECTOR CODE DRUM

| Parameter | Value |
|---|---|
| Arc length between patterns (ρβ) | 17.68 mm |
| Ratio of slide arc length to ρβ ((L/ρβ)* 100%) | 90% |
| Slide pattern arc length (L=) | 15.92 mm |
| Slide projection rate (f_rot × ($p_{MAX}$ + 4)) | 120 Hertz |
| Time between slide projections (1/(f_rot × ($p_{MAX}$ + 4))) | 8.333 ms |
| Pattern dwell time, near full field ((L − W)/$V_{TANGENTIAL}$) | 2.79 ms |

FIG. 8 is an XZ view of structured and non-structured light projector 4503 in which projector timing track detector 9982 and illumination source 9980 may be located on the drum perimeter some distance away from the projector illumination and imaging lenses if desired. Experience has shown that there is little or no operational penalty for locating these items at other convenient places around the cylinder shell perimeter provided that the electronic timing circuitry can be adjusted to compensate. In addition, FIG. 8 shows that example light pipe 5 may be quickly replaced by one of several other light pipes of different inside diameters, for example light pipes 6, and 7 and others by controlled motion of electrically driven linear or rotary position selector assembly 8. The distal end of flexible optical fiber 18 is held in place by mechanical clamp and strain relief block 10 such that a small portion of the fiber core and inner cladding protrude by a small distance such as 100 to 500 μm. Clamp/block 10 preferably may be attached to position selector assembly 8 or may be separately mounted.

FIG. 8 also shows optical ray 12 and fold mirror 19 in position such that both incident ray 12 and reflected ray 14 are in the XZ plane. Moderate but acceptable bending in the X direction is required in order to pass the fiber over the open edge of slide drum 4507. In an alternative to this configuration, mirror 19, position selector 8 and block 10 may be permanently rotated out of the XZ plane together as a group, using ray 14 as an axis of rotation, in order to reduce or eliminate the need for fiber bending in the X direction. However, all drawings and data in this disclosure represent the condition of FIG. 8 where ray 12 is in the XZ plane.

The fiber core end is preferably polished flat, anti-reflection coated and perpendicular to the fiber axis. Since the NA of example optical fiber 18 is 0.22, its cone of laser light emission will maintain a constant maximum angular radius of 12.7°. Therefore for every 100 μm of distance from the fiber exit surface there is an additional amount of beam cone radius equal to (100) μm×(tan 12.7°)=22.5 μm. As a result the minimum radius of the light pipes available in the selection assembly may need to be only slightly larger, such as 22.5 μm larger than the radius of the fiber core in order to maintain near 100% optical transmission efficiency. Given the 200 μm radius of example fiber 18, the smallest light pipe radius compatible with a 100 μm air gap between fiber end and light pipe would therefore be 223 μm. The light pipes 5, 6, 7, etc. may be hollow tubes with reflective inside coating or solid cores of transparent silica with a fluorine-doped silica cladding similar to that of the optical fiber. The diameter of the light pipe defines the diameter of its image inside the projector imaging lens group 4508, where it is imaged by projector condensing lens group 200. This is a form of Köhler illumination in which an image of the light pipe end provides a virtual circular aperture stop diameter in the imaging lens group, thereby determining the imaging lens group's numerical aperture NA, in general a different value from that of optical fiber 18. The imaging lens group NA determines the Airy radius of the diffraction-limited PSF at the SBM, an important parameter that limits the entire system's measurement accuracy.

In the example optical design of the present disclosure the inner radius of light pipe 5 is 0.79 mm (790 μm) as opposed to the above-estimated minimum acceptable radius of 223 μm. Light pipes with smaller inner radius than the 0.79 mm value used in the optical design calculations will increase the projector's depth of focus on the SBM at the expense of a larger Airy radius. On the other hand, larger values may be chosen to increase the NA of the imaging lens group and thereby improve measurement accuracy over a smaller region of the SBM. In that case, precise focus may be desired and may be achieved by adjustment of the Z (depth) coordinate of either optical assembly 4501 or the XYZ/tilt stage 520.

FIG. 9 is an enlarged and more detailed view of the projector optics shown in the same X-Z view as in FIG. 8, including two pairs of optical rays that are traced from two diametrically opposite points 202 and 203 at the exit of example light pipe 5 to two images inside projector imaging lens 36. Lens 20 may be a standard circularly symmetric lens, with the second surface having a conic constant of −0.6 as specified in Table 3. Lens 21 may be a biconic lens with separately optimized X and Y radii of curvature, with the X curvature being shown in FIG. 9 and the Y curvature shown in FIG. 10. Its first surface may have a Y conic constant of −1.0 and an X conic constant of 0 as specified in Table 3. The ability of condenser lenses 20 and 21 to form an image of the end of light pipe 5 at the proper plane inside projector lens 36 is verified by the ray traces in the XZ plane of FIG. 9 and the ray traces in the YZ plane of FIG. 10.

In FIG. 9 it can be seen that the two rays originating at point 202 and 203 converge to images at points 202*i* and 203*i* respectively inside lens 36. These two points in the XZ view and two other image points in the YZ view (FIG. 10) are on the outer diameter of a circular disk of laser illumination inside projector lens 36. This four-point ray tracing is sufficient to define the outer diameter of a circular disk of illumination inside the imaging lens group and serves as the imaging lens group aperture stop in place of a physical aperture.

In addition to the illumination disk diameter, the optical coherence of the laser light inside lens 36 can impact the determination of the illumination distribution in the final projected edge images. In general, coherence may cause irradiance ripples or speckle in the projected images which interfere with accurate decoding and interpolation/extrapolation of the structured light. This problem is not expected to arise in the example system of the present disclosure as a result of several factors. The first is that the laser source 16 may be composed of several individual emitters, the second is that a large number of laser modes may be supported in multimode optical fiber 18, and finally that there may be a number of additional reflections inside light pipe 5. As a result, the diffraction-limited image PSF at reference surface 4570 is expected to be the well-known Airy pattern with a radius to the first dark ring inversely proportional to the output diameter of the light pipe. An example of this is the Huygens PSF calculated by ZEMAX® OPTICSTUDIO™ 15.5 computer software and illustrated in FIG. 12A for the projector imaging lens group design specification defined in Table 3.

Returning to FIG. 9, protective shroud 253 with flat window 34 may be part of an environmental and safety enclosure for rotating cylindrical shell 3. The optical effect of window 34 is included in all imaging ray trace analyses of projector imaging lens group 4508.

Figure 10:
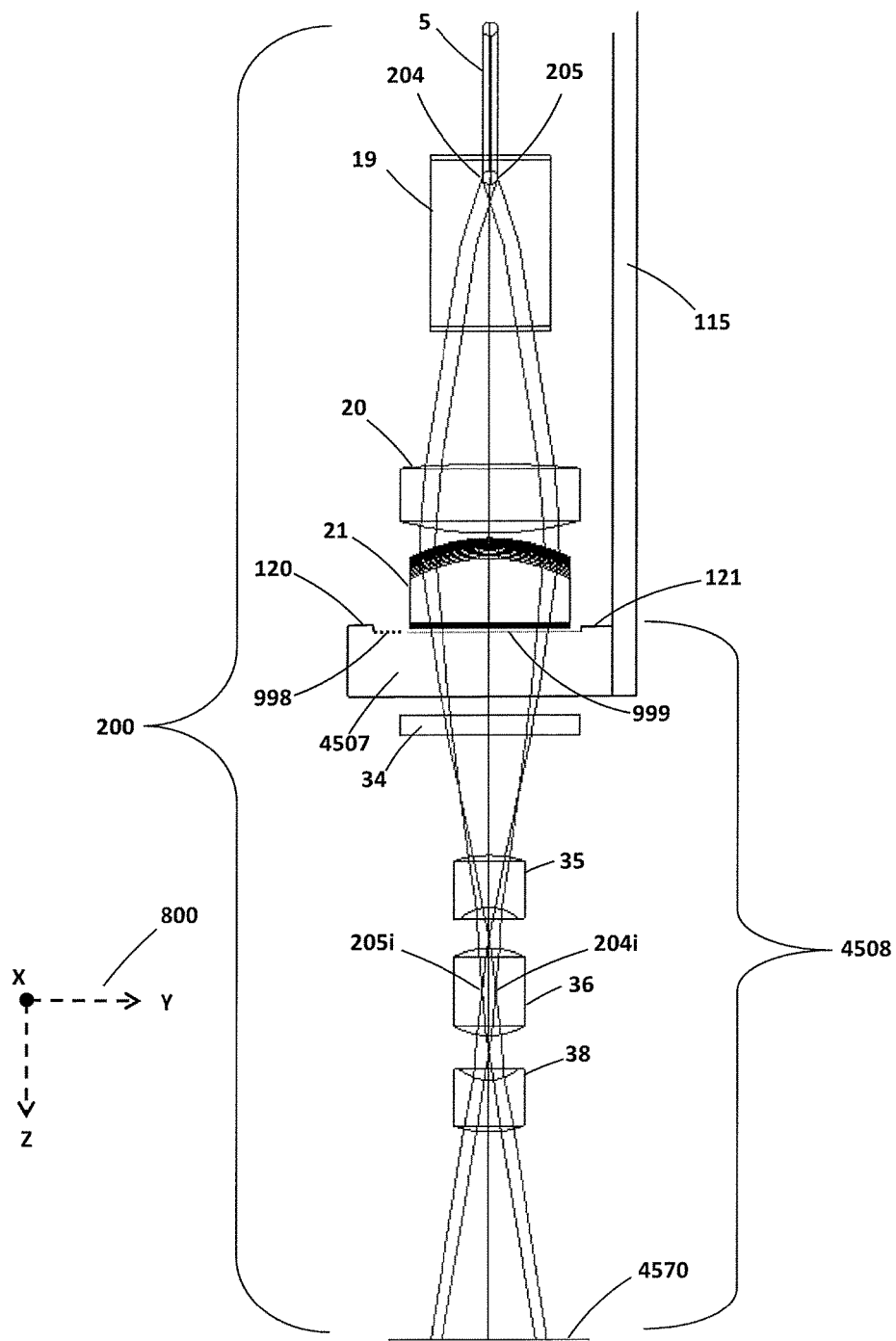
FIG. 10 is a 3D optical layout and ray trace cross-section in a Y Z view, showing an example projector illumination lens group and optical imaging lens group, in accordance with embodiments of the present disclosure.

FIG. 10 shows a YZ view of the same projector condensing lens group and imaging lens group elements that are shown in the XZ view of FIG. 9. Two pairs of rays originating at diametrically opposite points 204 and 205 on the output end of light pipe 5 converge to point images 204i and 205i inside projector lens 36. Illumination rays and not imaging rays are shown in FIG. 9 and FIG. 10.

Figure 10A:
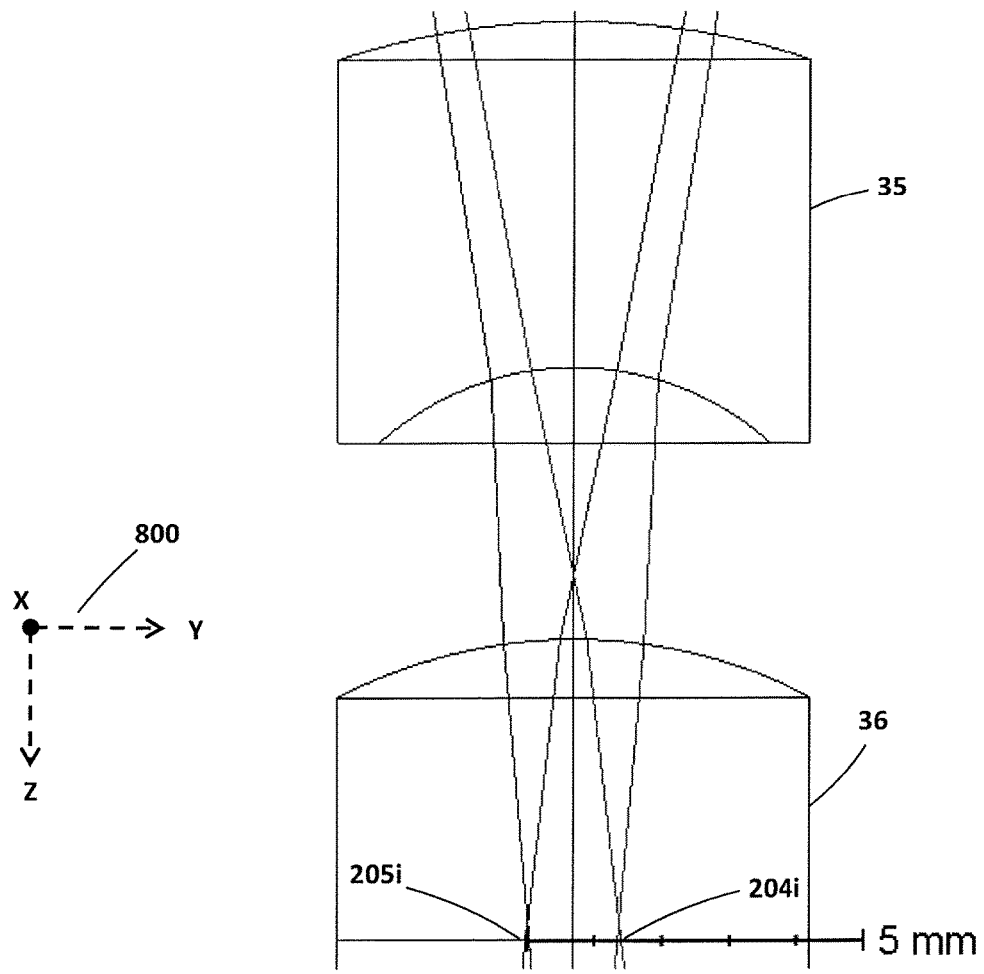
FIG. 10A is an enlarged view of a portion of FIG. 10, showing how illumination rays from two points at the light pipe end converge to two point images inside the projector's optical imaging lens group, in accordance with embodiments of the present disclosure.

FIG. 10A is an enlarged view of FIG. 10 with a Y coordinate millimeter scale that shows a distance of 1.4 mm between illumination image points 204i and 205i.

Discussion of Optical Transmission Reference Features

The optical transmission reference features mentioned above provide for projection of a sequence of patterns of light on surface 4570, each containing the exact same percent of spatial intensity variations as produced by light source 4505 and the optics of structured light and non-structured reference light projector 4503, but excepting light transmission variations in HCBC structured light patterns. I.,e, the optical transmission reference features should be designed to provide for electronic signal magnitudes to be stored in system controller 4513 in order to later provide signal normalization to substantially nullify the effects of received signal intensity variations other than those produced by projected structured light patterns.

Figure 12A:
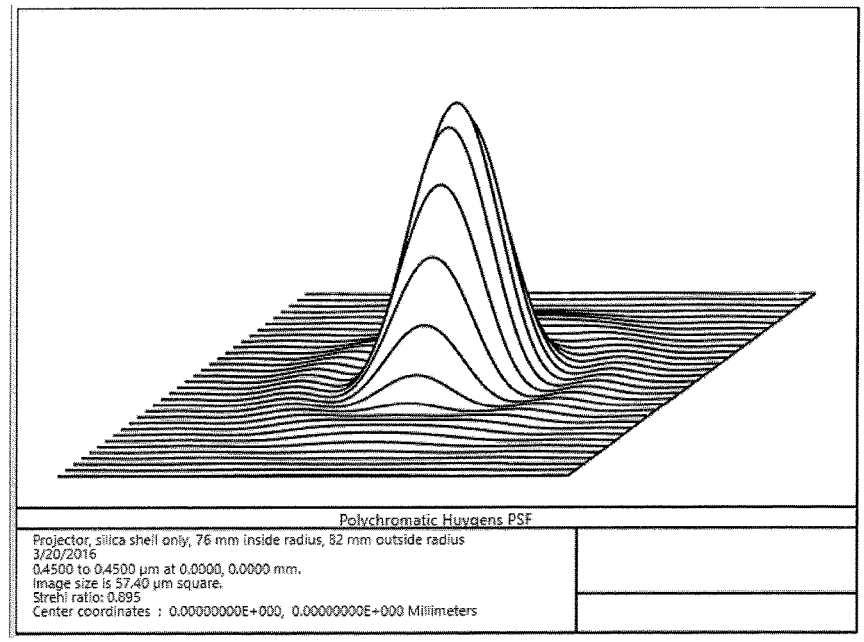
FIG. 12A is a 3D plot of a computer-calculated point spread function for an example projector imaging lens group at best focus without an absorbing lens, in accordance with embodiments of the present disclosure.
Figure 12B:
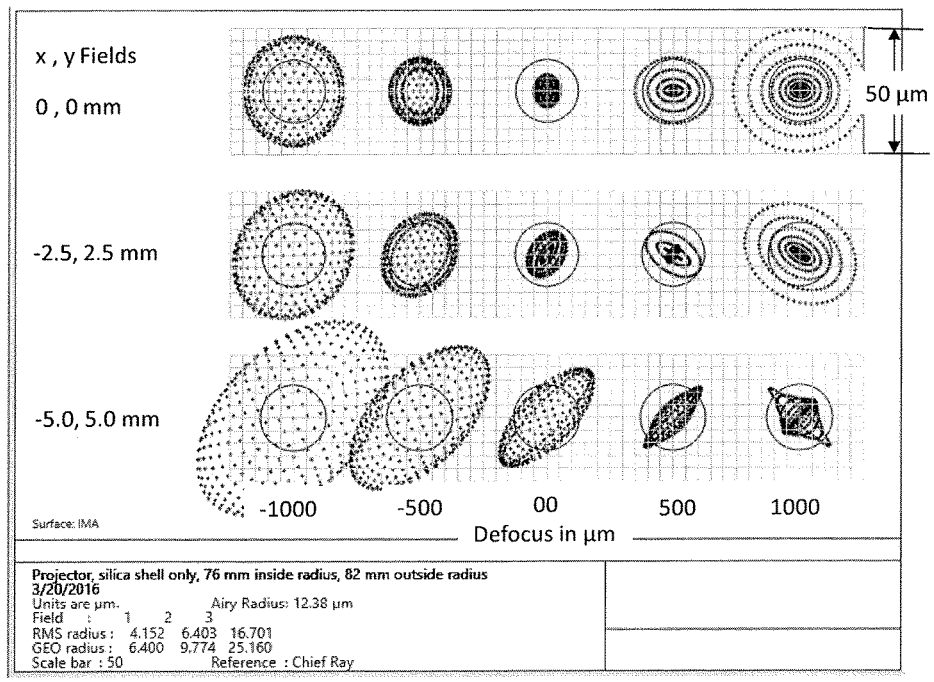
FIG. 12B is a computer-calculated through focus spot diagram for an example projector imaging lens group without an absorbing lens, in accordance with embodiments of the present disclosure.

When the slide patterns are carried on a rotating transparent cylindrical drum or shell such as in the present disclosure, the shell wall can be made thick enough, e.g. 6 mm as in the example system of the present disclosure, to contain a sufficiently thick piece of absorbing glass. In addition, the results of optical modeling as shown in FIG. 12A and FIG. 12B indicate that a cylindrical wall thickness of 6 mm wall can still allow diffraction-limited projector lens performance for the projected HCBC patterns with the relatively simple three element projector imaging lens design specified in Table 3. The absorbing glass lenses for the ref2, ref3 and ref4, optical transmission references are preferably inserted and bonded into slots in the outer surface of the shell as shown in FIG. 4. Alternatively, they may be inserted and bonded into the inner surface. The outer surface approach is preferable because it simplifies the use of precision photolithography in creating physical HCBC patterns on the inner surface. For example, in the interest of precision a thin and very uniform layer of photoresist may be applied to the surface which carries the slide patterns. The inner surface may first have been coated with a thin optically opaque layer as discussed previously. With the inner surface machined to have side dams 120 and 121 as shown in FIG. 3 and FIG. 10, the shell may be used as a centrifuge for spreading a uniform layer of liquid photoresist. Since this approach is not available for the outer surface, the preferred location for the slide patterns themselves is on the inner surface. It may be possible to also bond the absorbing lenses into slots in the inner surface, but it is likely that side dams 120 and 121, projector coding surface 999 and timing track 998 would have to be precision machined for photolithography after the lens bonding process.

At least two different levels of absorption coefficient are available in the glass products of Schott AG, i.e., glasses NG5 and NG11. In general, the high precision in attaining the desired transmission will be achieved with the thickest practical layer and lowest practical absorption coefficient. This may be achieved with low absorption glass NG11. According to Schott data sheets, a 1 mm thickness of this glass has a bulk transmission of 0.756 (75.571%) at a wavelength of 0.45 µm. The associated absorption coefficient can be calculated using the formula $$alpha_{abs} = \frac{-\ln(\text{Transmission})}{\text{thickness}},$$

where ln is the natural logarithm. This calculation results in $alpha_{abs}=0.2797$ mm$^{-1}$ for NG11. For an example desired transmission of 0.500 (ref2), the thickness of NG11 absorber is $$t_{abs} = -\frac{\ln(0.500)}{alpha_{abs}} = 2.478 \text{ mm},$$

which is the value used in the example design of the present disclosure. This thickness is compatible with an example 6 mm wall thickness for cylindrical shell 4507. When a lower optical transmission (i.e., higher absorption) is needed such as for reference feature 1024 (ref1), the higher absorption glass NG5 may be considered.

FIG. 11A shows an X-Z view of three example rays passing through 50% absorbing lens ref2, starting at field points 105, 103 and 107 on the projector coding surface 999 of a thinned region of the projector's cylindrical shell 4507. The rays pass through NG11 lens interface surface 4, NG11 lens ref2 with vertex thickness of 2.478 mm as calculated above, then through NG11 lens outer surface 2, and from there through projector window 34, projector imaging lens elements 35, 36 and 38 and finally to reference surface 4570. Arrow 110 indicates the rotation direction of elements 4507 and ref2, during which insignificant change in light path of any of the selected rays will occur. It should be noted that the ray trace layouts in FIG. 11A and FIG. 11B were created in ZEMAX® Sequential mode, which models a physical aperture stop in spite of the fact that the example projector imaging lens group design of the present disclosure uses a virtual aperture stop created by Köhler illumination. Use of the Sequential mode entails splitting lens 36 into two lenses with a shared planar interface as shown in FIG. 11A and FIG. 11B. In general some optical layouts in the present disclosure may show lens 36 as a single element and others may show it as two joined elements, depending upon which mode was used to generate the layout drawing. The total lens thickness and the two outside surface curvatures are the same in either case.

An X radius of −99.0 mm for interface surface 4 was found by optimization during single ray trace modeling in ZEMAX® Sequential mode. The calculated path lengths inside absorbing lens ref2 for the three field points and rays seen in FIG. 11A are listed in Table 2 below. For comparison, FIG. 11B presents a YZ view of the same objects and rays as in FIG. 11A. As can be seen, the three chief rays seen separately in FIG. 11A are seen overlapped together in FIG. 11B.

TABLE 2

Calculated path lengths for −99 mm X radius of curvature on surface 4

| X Field Point | X Coordinate (mm) | Path (mm) | Path Delta (mm) | % Delta |
|---|---|---|---|---|
| 105 | 0.0 | 2.4780 (Vertex) | 0.0000 | 0.000% |
| 103 | −2.5 | 2.4781 | 0.0001 | 0.004% |
| 107 | −5.0 | 2.4778 | −0.0002 | −0.008% |

The ray trace data in Table 2 indicates an expected ray path length difference in absorbing lens ref2 of less than 0.008% of the vertex thickness after surface curvature optimization. The corresponding variation in the magnitude of the 50% reference signal measured by a camera pixel signal value should be expected to be less than 0.01% and therefore insignificant. Any small remaining variations in optical path length caused by glass non-uniformity may need to be compensated for in system calibration. The detailed optical prescription for the absorbing lens is provided in Table 4. Modifications to cylindrical shell or projection lens parameters may result in different curvatures of surface 4.

Stress Analysis: Estimating the Safety Margin for an Absorbing Lens Bonded into the Outer Surface of a Spinning Shell Code Drum It is desirable that the bonding agent holding an absorbing lens into shell 4507 be strong enough to hold the lens during a photoresist writing operation, where shell 4507 may be spun at speeds up to 3,000 RPM (50 RPS) and create a centripetal acceleration up to 764 g's. This requirement could be removed if resist writing were accomplished prior to bonding in the absorbing lens, but the following stress analysis will show that that resist writing may be done either before or after lens bonding. The overall process may be simpler and less expensive if the resist writing can be done after lens insertion and bonding.

Assuming that the cylindrical shell thickness is the same as the NG11 glass insert thickness and the shell rotation rate is 50 RPS, the hoop stress is given by $$\sigma = \omega^2 (\text{density})(r_1^2 + r_1 r_2 + r_2^2)/3 \quad (4),$$

Where NG11 density=2.2×105 kg/m³
$r_1$=outer radius of ring=0.0820 m
$r_2$=inner radius of thinned portion of ring=0.0795 m
$\omega$=angular velocity omega_write=314 rad/s
$\sigma$=hoop stress=1.55×10⁶ N/m²=1.55×10⁶ Pa (pascal)

Since the tensile strength of example bonding agent MASTERBOND® UV15 is approximately 4×10⁷ Pa, this calculation shows a bonding safety margin during the pattern writing process of about 26:1 at 3,000 RPM. This occurs only during photolithography and not during normal operation. Note that the above calculation is for hoop stress only, and is applicable when a 2.5 mm thick absorbing lens of NG11 is bonded to silica cylindrical shell only at the lens edges. When the additional strength of the bonding agent on the inner face of the lens is considered, the safety margin will be roughly doubled. During 3D measurement operation at a lower speed of 266 RPM, chosen to accommodate the maximum frame rate of currently available optical sensors/cameras 4509 and 4511, the rotation hoop and radial stresses will each be lower by a factor of more than 100 as indicated by Equation (4), and therefore should be negligible.

Alternative Methods for Creating a Second 50% Transmission Reference Feature

In U.S. Pat. No. 3,799,675, a 100% optical transmission reference slide in a Gray code structured light sequence was disclosed. In that approach a detector and associated electronics at the optical sensor/receiving assembly measured the analog signal resulting from projection of the 100% reference slide and then divided that signal by two in a two-resistor voltage divider to create a 50% reference. It was found to be effective except at high signal levels where receiver nonlinearity (partial or full saturation of the 100% reference signal) created errors in decoding the Gray code sequence. Because the reflected irradiance at a camera pixel in the non-contact CMM system of the present disclosure is expected to vary over a dynamic range of 10,000:1 or more, it was felt that a more robust approach was needed in the non-contact CMM system of the present disclosure.

A second method is described in U.S. Pat. No. 5,410,399. In that method, the Gray code patterns are projected in complementary pairs such that the decoding process for a given Gray code bit would assign a "one" or a "zero" depending upon which of the signals was higher than the other. However, this approach may not be compatible with a high-precision HCBC system because it entails the use of twice the number of slides to be projected for a large number of coded stripels, e.g. 4,096 stripels of width 2.44 μm as in the example system of the present disclosure.

One other candidate alternative to the absorbing lens of the present disclosure is to create a 50% or other reference by the use of a thin metallic or refractive film attenuator. Although cost, size and weight could be reduced in comparison to an absorbing lens, any attenuation provided by the film may have to be primarily the result of reflection rather than absorption. This approach may present a problem of thermal damage and also involves the difficulty of producing a thin coating that has a reliable and large (50%) absorption combined with very low reflection loss. Since reflection loss varies strongly with illumination angle of incidence, and the angle of incidence varies with lateral position across the slide area, a thin film solution may not be sufficiently accurate for the present purpose.

Prescription Data for an Example Projector Lens Group Design

FIG. 10 illustrates an example lens design layout of a projector lens group including a condenser lens group 200 and an imaging lens group 4508. It may be noted that in FIG. 10 these groups overlap because the condenser group creates an image of the light pipe opening inside the imaging group. Detailed prescription data is given in Table 3, with the lens element or object identification numbers corresponding to Object numbers in a ZEMAX® NSC (Non Sequential Components mode) lens data editor. These are also used as lens element identification numbers in the Y-Z view of FIG. 10 and the X Z view of FIG. 9. The condenser group includes "biconic" lens 21 with one surface conforming to the inside curvature of cylindrical shell 4507 and the other surface providing different lens power in the two orthogonal axes in order to compensate for the different powers of cylindrical shell 4507 in orthogonal directions.

One example of a suitable projector imaging lens group is a relatively symmetrical and wide field triplet using high index glasses, essentially an air-spaced Steinheil triplet. In this example there are two thick negative outer elements using high index (n=1.723 at 0.45 μm) barium dense flint glass or equivalent with spherical surfaces, and a single or cemented plano-convex doublet inner element that may be modeled as a thick double-convex positive lens with spherical outer surfaces, using lanthanum crown glass (n=1.652 at 0.45 μm) or equivalent. As previously discussed, the function of an aperture stop for the projector imaging lens group is provided by Köhler illumination from condenser lens group 200, which images the output end of rigid light pipe 5. Modeled light pipe 5 has input and output radii of 1.58 mm diameter (0.79 mm radius), which according to the ray trace in FIG. 10A creates a virtual stop diameter at the interface of lens elements 36 and 37 of 1.4 mm (0.7 mm radius). The diameter of the virtual aperture stop may be varied by replacing one light pipe with another as illustrated in FIG. 8 and FIG. 9.

The projector lens imaging lens group was optimized for minimum RMS spot radius in the modeled through-focus and three-field spot diagram shown in FIG. 12B at a paraxial magnification of 1.034. For this analysis, ZEMAX® was used in the sequential mode and projector coding surface 999 was used as the object plane. Sequential mode allows a circular aperture stop inside lens 36 to be modeled, and also automatically prevents rays originating at specified object field points to pass outside the aperture stop. Because the laser illumination for the HCBC projector of the present disclosure has a relatively narrow spectral band, such as 0.440 to 0.465 μm for the example system described, chromatic aberration in the imaging lens group is not a concern. As seen from the notes box in the spot diagram of FIG. 12B, the diffraction-limited Airy disk radius on the image plane is 12.4 μm for the choice of a stop radius of 0.70 mm as a result of a 0.79 mm inside radius of light pipe 5.

It should be noted that the lens prescription data in Table 3 below is taken from a system model in ZEMAX® Non Sequential Components (NSC) mode, which is consistent with the sequential mode model used for image quality analysis. As discussed above, lens 36 is modeled as a single lens in NSC mode and split into two plano-convex lenses in the Sequential mode. Also note that the parameters Kx1, Ky1, Kx2, Ky2 in Table 3 are conic constants of individual lens surfaces and should not be confused with Kx and Ky used elsewhere as system calibration constants, or with $K_{m,p}$ used as a stripel edge slope direction coefficient in sub-stripel extrapolation. When absorbing lens ref2 (object 2 in the ZEMAX® non-sequential model) is in the illumination field of the lens imaging group, precision image formation is not required. The prescription for an example thinned silica cylinder wall section and example absorbing lens ref2 is presented separately in Table 4.

The data in Table 3 below is a prescription for one example of a projector illumination and imaging lens group consistent with the present disclosure.

TABLE 3

PRESCRIPTION DATA FOR PROJECTOR ILLUMINATION AND IMAGING LENS GROUPS

| | |
|---|---|
| Object 5 | Light pipe 5 |
| Object Type | Cylinder Volume (NSC_CBLK) |
| Reference Object | 0 |
| Inside Of | 0 |
| XYZ Position | −572.7, 0, −45.85 |
| Tilt About XYZ | 0, −120, 10 |
| Front R | 0.79 |
| Length | 30 |
| Back R | 0.79 |
| Object 19 | Fold Mirror |
| Object Type | Biconic Lens (NSC_BLEN) |
| Reference Object | 0 |
| Inside Of | 0 |
| XYZ Position | 0, 0, −39 |
| Tilt About XYZ | 0, 120, 0 |
| Object 20 | Condensing Lens 20 |
| Object Type | Standard Lens (NSC_SLEN) |
| Reference Object | 0 |
| Inside Of | 0 |

TABLE 3-continued

PRESCRIPTION DATA FOR PROJECTOR ILLUMINATION AND IMAGING LENS GROUPS

| | |
|---|---|
| XYZ Position | 0, 0, −17 |
| Tilt About XYZ | 0, 0, 0 |
| Material | N-BK7 |
| Index at | 0.45 μm = 1.52531950 |
| Radius 1 | 90 |
| Conic 1 | 0 |
| Clear 1 | 9 |
| Edge 1 | 9 |
| Thickness | 7 |
| Radius 2 | −33 |
| Conic 2 | −0.6 |
| Clear 2 | 9 |
| Edge 2 | 9 |
| Object 21 | Condensing Lens 21 |
| Object Type | Biconic Lens (NSC_BLEN) |
| Reference Object | 0 |
| Inside Of | 0 |
| XYZ Position | 0, 0, −9.500 |
| Tilt About XYZ | 0, 0, 0 |
| Material | N-BK7 |
| Index at | 0.45 μm = 1.52531950 |
| Radial Height | 8 |
| X Half-Width | 8 |
| Thickness | 9 |
| Rx1 | 16.8 |
| Ry1 | 16.4 |
| Kx1 (Conic x1) | 0 |
| Ky1 (Conic y1) | −1 |
| Rx2 | −76 |
| Ry2 | 0 |
| Kx2 | 0 |
| Ky2 | 0 |
| Object 4507-1 | Cylindrical Shell Substrate 4507-1 |
| Object Type | Annular Volume (NSC_AVOL) |
| XYZ Position of Shell Center | 0. 10, −76 |
| Tilt About XYZ | 90, 0, 0 |
| Material | SILICA |
| Index at | 0.45 μm = 1.46556566 |
| Front X Min | 76 |
| Front Y Min | 76 |
| Rear X Min | 76 |
| Rear Y Min | 76 |
| Front X Max | 82 |
| Front Y Max | 82 |
| Rear X Max | 82 |
| Rear Y Max | 82 |
| Length | 20 |
| Object 34 | Environmental Window 34 |
| Object Type | Standard Lens (NSC_SLEN) |
| Reference Object | 0 |
| Inside Of | 0 |
| XYZ Position | 0, 0, 8.2 |
| Tilt About XYZ | 0, 0, 0 |
| Material | N-BK7 |
| Index at | 0.45 μm = 1.52531950 |
| Radius 1 | 0 |
| Conic 1 | 0 |
| Clear 1 | 8 |
| Edge 1 | 9 |
| Thickness | 2 |
| Radius 2 | 0 |
| Conic 2 | 0 |
| Clear 2 | 9 |
| Edge 2 | 9 |
| Object 35 | Negative Lens 35 |
| Object Type | Standard Lens (NSC_SLEN) |
| Reference Object | 0 |
| Inside Of | 0 |
| XYZ Position | 0, 0, 22.3043 |
| Tilt About XYZ | 0, 0, 0 |
| Material | N-BASF64 |
| Index at | 0.450 μm = 1.72358154 |
| Radius 1 | 11.042204 |
| Conic 1 | 0 |
| Clear 1 | 3.5 |
| Edge 1 | 3.5 |

TABLE 3-continued

PRESCRIPTION DATA FOR PROJECTOR ILLUMINATION AND IMAGING LENS GROUPS

| | |
|---|---|
| Thickness | 5.1937309 |
| Radius 2 | 4.2946032 |
| Conic 2 | 0 |
| Clear 2 | 2.9 |
| Edge 2 | 3.5 |
| Object 36 | Positive Lens 36 |
| Object Type | Standard Lens (NSC_SLEN) |
| Reference Object | 0 |
| Inside Of | 0 |
| XYZ Position | 0, 0, 31.566 |
| Tilt About XYZ | 0, 0, 0 |
| Material | N-LAK21 |
| Index at | 0.45 µm = 1.65183451 |
| Radius 1 | 7.5625583 |
| Conic 1 | 0 |
| Clear 1 | 3.5 |
| Edge 1 | 3.5 |
| Thickness | 8.7752 |
| Radius 2 | −7.0039 |
| Conic 2 | 0 |
| Clear 2 | 3.5 |
| Edge 2 | 3.5 |
| Object 38 | Negative lens 38 |
| Object Type | Standard Lens (NSC_SLEN) |
| Reference Object | 0 |
| Inside Of | 0 |
| XYZ Position | 0, 0, 44.7842 |
| Tilt About XYZ | 0, 0, 0 |
| Material | N-BASF64 |
| Index at | 0.45 µm = 1.72358154 |
| Radius 1 | −4.4628585 |
| Conic 1 | 0 |
| Clear 1 | 2.9 |
| Edge 1 | 3.5 |
| Thickness | 5.1937309 |
| Radius 2 | −10.516984 |
| Conic 2 | 0 |
| Clear 2 | 3.5 |
| Edge 2 | 3.5 |

The data in Table 4 is a prescription for example thinned silica wall section and 50% absorbing lens insert.

TABLE 4

PRESCRIPTION DATA FOR EXAMPLE THINNED SILICA WALL SECTION AND ABSORBING LENS INSERT FOR 50% TRANSMISSION

| | |
|---|---|
| Object 4507-2 | Thinned section of Cyl shell 4507 |
| Object Type | Biconic Lens (NSC_BLEN) |
| Reference Object | 0 |
| Inside Of | 0 |
| XYZ Position | 0, 0, 0 |
| Tilt About XYZ | 0, 0, 0 |
| Material | SILICA |
| Index at | 0.45 µm = 1.46556566 |
| Radial Height | 8 |
| X Half-Width | 0 |
| Thickness | 3.522 |
| Rx1 | −76 |
| Ry1 | 0 |
| Kx1 | 0 |
| Ky1 | 0 |
| Rx2 | −99 |
| Ry2 | 0 |
| Kx2 | 0 |
| Ky2 | 0 |
| Object 2 | (Absorbing Lens Insert ref2) |
| Object Type | Biconic Lens (NSC_BLEN) |
| Reference Object | 0 |
| Inside Of | 0 |
| XYZ Position | 0, 0, 3.522 |
| Tilt About XYZ | 0, 0, 0 |
| Material | NG-11 Model Glass, n = 1.5100 |
| Index at | 0.45 µm = 1.51 |
| Radial Height | 8 |
| X Half-Width | 8 |
| Thickness | 2.478 |
| Rx1 | −99 |
| Ry1 | 0 |
| Kx1 | 0 |
| Ky1 | 0 |
| Rx2 | −82 |
| Ry2 | 0 |
| Kx2 | 0 |
| Ky2 | 0 |

Figure 13:
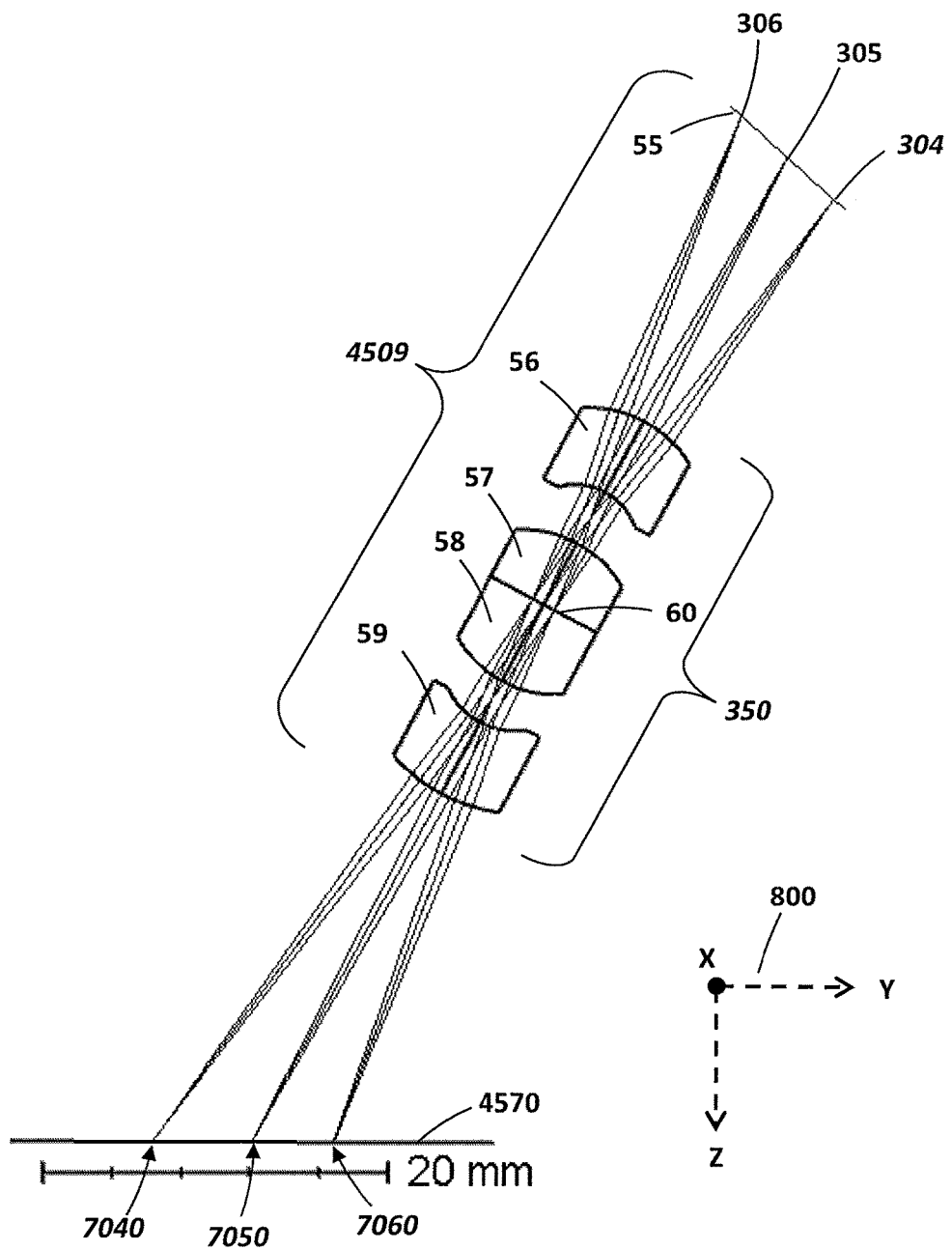
FIG. 13 is a Y Z view 3D layout of an example tilted optical sensor/camera lens design in accordance with embodiments of the present disclosure.

The prescription data in Table 5 below represents the imaging lens group 350 of optical sensor 4509, whose lens elements are illustrated in the ZEMAX® Sequential mode layout drawing of FIG. 13. The prescription for the imaging lens of optional optical sensor 4511 is easily obtained by change of sign on any Y position coordinate or any X tilt coordinate when Reference Object=0. As an example, the Y coordinate for Object 55 (FPA in Sensor 4509) is listed as 29.4 mm, so that the corresponding coordinate for the FPA in Sensor 4511 would be −29.4 mm. Likewise, the X tilt coordinate for Object 55 is listed as 510° and should be changed to −510° for the imaging lens of Sensor 4511. No changes are needed for any X or Z linear coordinates. It should be noted that the central positive lens element for the camera lenses is similar to that of the projector but separated into two plano-convex elements. This is done to allow a thin metallic aperture stop at a cemented joint between the two plane faces. A design modification may allow for a larger separation to accommodate an adjustable iris diaphragm.

TABLE 5

Prescription for an Example Optical Sensor Imaging Lens Group Optical Design

| | |
|---|---|
| Object 55 | FPA 55 (outline model only) |
| Object Type | Rectangular Volume (NSC_RBLK) |
| Reference Object | 0 |
| Inside Of | 0 |
| XYZ Position | 0, 29.4, 12 |
| Tilt About XYZ | 40, 0, 055 |
| Material | |
| Index at | 0.45 µm = 1.00000000 |
| X1 Half Width | 2.8 |
| Y1 Half Width | 3.6 |
| Z Length | 0.2 |
| X2 Half Width | 2.8 |
| Y2 Half Width | 3.6 |
| Front X Angle | 0 |
| Front Y Angle | 0 |
| Rear X Angle | 0 |
| Rear Y Angle | 0 |
| Object 56 | Negative lens 56 in Sensor 4509 lens group 350 |
| Object Type | Standard Lens (NSC_SLEN) |
| Reference Object | 55 |
| Inside Of | 0 |
| XYZ Position | 0, 3.9, 16.95 |
| Tilt About XYZ | −14, 0, 0 |
| Material | N-BASF64 |
| Index at | 0.45 µm = 1.72358154 |
| Radius 1 | 6.7302304 |
| Conic 1 | 0 |
| Clear 1 | 3.5 |
| Edge 1 | 3.5 |
| Thickness | 4.6745861 |
| Radius 2 | 3.5843864 |
| Conic 2 | 0 |

TABLE 5-continued

Prescription for an Example Optical Sensor
Imaging Lens Group Optical Design

| | |
|---|---|
| Clear 2 | 2.6 |
| Edge 2 | 3.5 |
| Object 57 | Positive Lens 57 in Sensor 4509 lens group 350 |
| Object Type | Standard Lens (NSC_SLEN) |
| Reference Object | 56 |
| Inside Of | 0 |
| XYZ Position | 0, 0, 8.0645861 |
| Tilt About XYZ | 0, 0, 0 |
| Material | N-LAK21 |
| Index at | 0.45 μm = 1.65183451 |
| Radius 1 | 6.6720704 |
| Conic 1 | 0 |
| Clear 1 | 3.5 |
| Edge 1 | 3.5 |
| Thickness | 4.055436 |
| Radius 2 | −0 |
| Conic 2 | 0 |
| Clear 2 (Reference 61 Camera 1 aperture stop) | 0.7 |
| Edge 2 | 3.5 |
| Object 58 | Positive lens 58 in Sensor 4509 lens group 350 |
| Object Type | Standard Lens (NSC_SLEN) |
| Reference Object | 56 |
| Inside Of | 0 |
| XYZ Position | 0, 0, 12.120022 |
| Tilt About XYZ | 0, 0, 0 |
| Material | N-LAK21 |
| Index at | 0.45 μm = 1.65183451 |
| Radius 1 | −0 |
| Conic 1 | 0 |
| Clear 1 | 3.5 |
| Edge 1 | 3.5 |
| Thickness | 5.0907697 |
| Radius 2 | −6.6109073 |
| Conic 2 | 0 |
| Clear 2 | 3.5 |
| Edge 2 | 3.5 |
| Object 59 | Negative Lens 59 in Sensor 4509 lens group 350 |
| Object Type | Standard Lens (NSC_SLEN) |
| Reference Object | 56 |
| Inside Of | 0 |
| XYZ Position | 0, 0, 19.922792 |
| Tilt About XYZ | 0, 0, 0 |
| Material | N-BASF64 |
| Index at | 0.45 μm = 1.72358154 |
| Radius 1 | −4.263252 |
| Conic 1 | 0 |
| Clear 1 | 2.6 |
| Edge 1 | 3.5 |
| Thickness | 4.7003005 |
| Radius 2 | −9.9034664 |
| Conic 2 | 0 |
| Clear 2 | 3.5 |
| Edge 2 | 3.5 |
| Object 71 | Reference image plane: (callout reference 4570) |
| Object Type | Detector Rectangle (NSC_DETE) |
| Reference Object | 0 |
| Inside Of | 0 |
| XYZ Position | 0, 0, 70.8 |
| Tilt About XYZ | 0, 0, 0 |
| Material | ABSORB |

Discussion of Triangulation Geometry and Equations

Prior to discussing the triangulation geometry of FIG. 17 and FIG. 18, it is useful to review the two dimensional (2D) geometry of an optical sensor/camera FPA pixel grid in FIG. 15 and the 2D array of virtualized projector stripels as shown in the diagram of FIG. 16. In FIG. 15, a reduced size square grid FPA with an even number of rows and columns represents optical sensor FPA 55. It is desirable for 3D measurement accuracy to locate an x, y coordinate origin at the center of the active area of a pixel near the geometrical center of the array such as point 305 in FIG. 15, and also to associate row and column pixel coordinates i, j with the center of each pixel. Therefore for an array with an even number of rows and columns, x, y coordinate origin point 305 may be at the center of any one of four pixels nearest to the geometrical array center. The $x_c$ axis is represented by line 312, and the $y_c$ axis is represented by line 311. Point 306 is an arbitrary example pixel center point, also seen in FIG. 16, FIG. 17 and FIG. 18.

Now considering the decoded projector stripel geometry shown in FIG. 16, point 105 is designated as the origin of a 1-D coordinate system in the direction of line 111, which is the y stripel distance measurement axis. It should be noted that the x axis for a stripel array falls on a boundary line between two stripels, in contrast to the situation for a camera pixel array in which the y and x axes are lines through pixel centers instead of their boundaries. Also shown in FIG. 16 are slide width W, slide length L and stationary illumination window 210, consistent with FIG. 6. Point 106 in FIG. 16 represents the intersection of an arbitrary ray that is, e.g., back-projected first from a point 306 on the sensor (camera) FPA to the SBM, and then back-projected from the SBM to the projector slide plane. S is its stripel distance and $y_p$ is its distance from the central y axis. Distance $y_p$ is related to stripel distance S by Equation (5):

$$y_p = Q_s[S - (m_{MAX}+1)/2] \qquad (5)$$

For the example design of the present disclosure, $m_{MAX}=4{,}096$ stripels, so that $y_p = Q_s(S-2{,}048)$.

It should be kept in mind that the stripel array shown in FIG. 15 is a geometrical and mathematical construct to depict the result of projection and decoding of a sequence of real 2-D HCBC patterns. It is also important to bear in mind that stripel width does not affect physical or optical parameters such as PSF and LSF, but instead only acts as a measuring rule. In the example design of the present disclosure, 23 HCBC patterns of width W=10.0 mm and length L=10.0 mm are projected per sequence, resulting in a virtual array of 4,096 digital stripels, each of width $Q_s=2.44141$ μm in the y direction at projector coding surface 999.

FIG. 17 is a YZ view of the triangulation measurement geometry for an HCBC projector and a single optical sensor/camera. It is shown here with the lens groups represented by the two principal points 101 and 102 representing the structured light projector imaging lens group and the two points 301 and 302 representing the optical sensor/camera lens group. The drawing view is in a 3D layout format, seen in a direction from the outside of the drawing and parallel to the X axis in accordance with YZ orientation indicator 800. There may be points or lines in front or behind the YZ plane that are shown in FIG. 17, such as points 806, 206, 306 and 706, and lines $u_c$ and $v_c$. There are two right triangles in FIG. 17 which can be solved for parameters Y and Z, given pre-calibrated optical sensor/camera principle point 302 vertical offset distance a and horizontal offset (i.e., triangulation baseline) b between projector and optical sensor/camera principal points 102 and 302 respectively. Angle α is either chosen or solved for as the inverse tangent of the ratio of baseline b to reference surface 4570 at calibrated depth Zref. Cardinal point distances $u_p$ and $v_p$ as well as $u_c$ and $v_c$ from the principal points are modeled by computer ray tracing. The first right triangle of importance in FIG. 17 has a vertex at projector principal point 102, a vertex angle θ, and a base distance of Z. This leads to a simple relation between Y and Z as in Equation (6).

$$Y = Z \tan \theta \qquad (6)$$

There is a second right triangle with vertex at point 302, vertex angle of $(\alpha - \Phi_Y)$, and base of $(Z+a)$. This leads to $$Y = b - (Z+a)\tan(\alpha + \Phi_Y) \tag{7}$$

Z may be solved for using Equations (6) and (7):

$$Z = \frac{a\tan(\alpha + \Phi_Y) - b}{[\tan\theta + \tan(\alpha + \Phi_Y)]} \tag{8}$$

Note that after coordinate Z has been calculated by Equation (8), coordinate Y may be calculated using Equation (7).

In the present disclosure a measurement made using either optical sensor/camera is independent of that made with the other. In general the back-projected rays from pixel centers in different optical sensors/cameras do not intersect the SBM at exactly the same points, a desirable situation in that it increases the density of measured points on the SBM. There can be exceptions to this rule when some pixels in the central row in the FPA of the two different optical sensors/cameras may back project to very nearly the same SBM points, but this correspondence cannot be relied upon.

FIG. 18 in the XZ view may be used to solve for coordinate X from the calculated value of Z in Equation (8).in Note that in FIG. 18 there is another right triangle with vertex at camera principal point 302, vertex angle $\Phi_X$, and triangle base $(Z+a)$. This leads to Equation (9):

$$X = (Z+a)\tan\Phi_X \tag{9}$$

Figure 31:
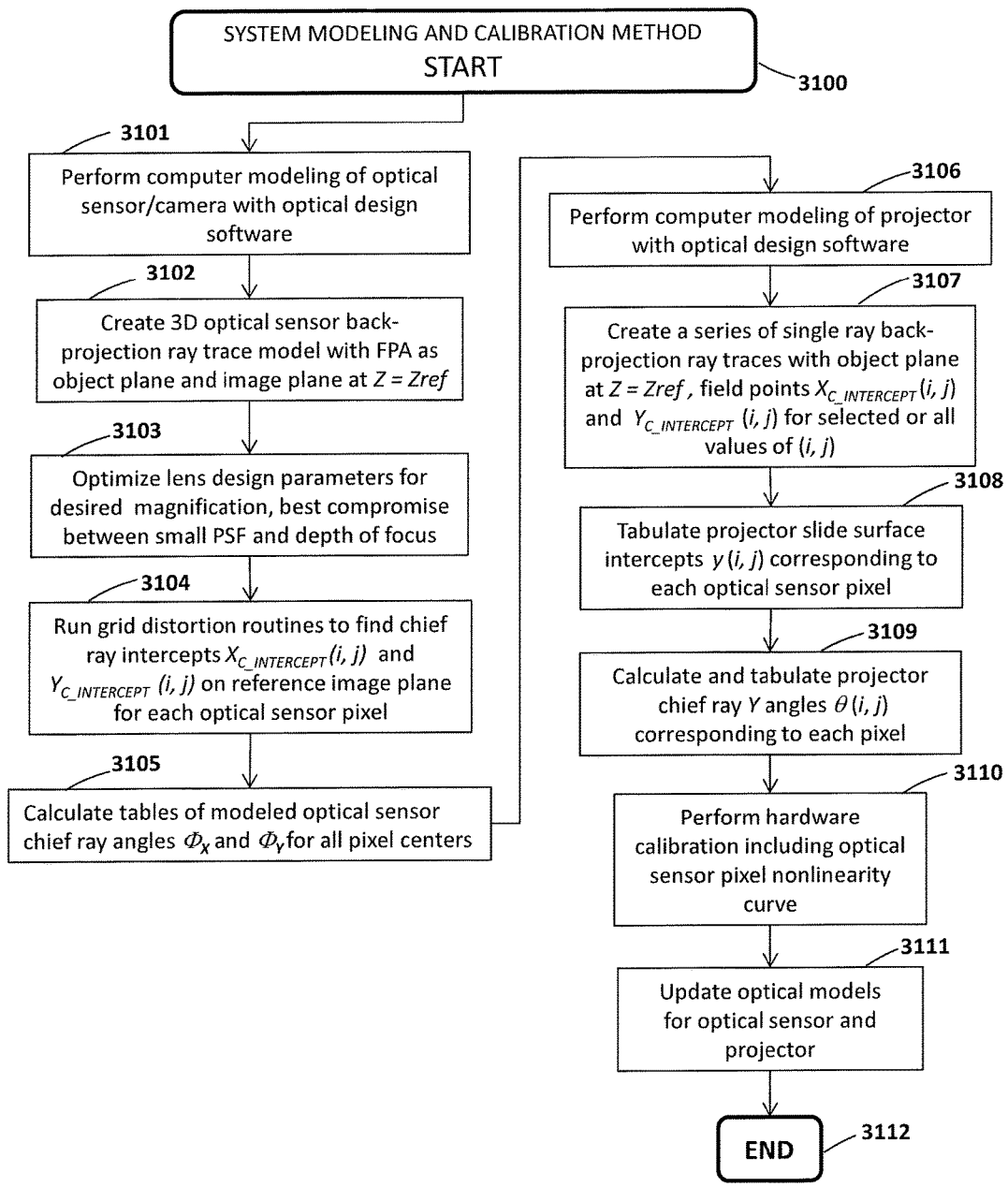
FIG. 31 is a flow chart of example operations of a system modeling and calibration method in accordance with embodiments of the present disclosure.

Note that in Equations (8) and (9), the projector angle $\theta$ for a given pixel $(i, j)$ and the angles $\Phi_Y$ and $\Phi_X$ for the same pixel may be determined by the steps defined in the System Calibration flow chart in FIG. 31. Details of the process for the angles $\Phi_Y$ and $\Phi_X$ can be seen in FIG. 31 block 3105. Also see FIG. 31 block 3107, in which X and Y coordinates of chief ray intercepts with the reference surface 4570 may be found, for example, by a ZEMAX® Sequential mode Grid Distortion calculation for a rectangular grid of field points. Since the optical sensor/camera lens design model for this process assumes back-projection of pixel centers as field points, each field grid point may ideally be made to correspond to the center of a single FPA pixel. The pixel intercept angles for triangulation are then calculated from the X and Y ray intercept coordinates using the equations $$\Phi_X(i, j) = \tan^{-1}\left[\frac{X_{intercept}(i, j)}{uc \cos\alpha}\right] \tag{10}$$

$$\Phi_Y(i, j) = \tan^{-1}\left[\tan\alpha - \frac{Y_{intercept}(i, j)}{uc \cos\alpha}\right] \tag{11}$$

Also note in FIGS. 17 and 18 that even though example SBM point 806 is not at an ideal projector focus plane at depth $Z_{ref}$, the decoded linear distance $y_p$ on the slide plane and calibrated angular position $\theta$ can still be measured although with degraded accuracy. Even with degraded Z measurement accuracy the focus error may be reduced in subsequent projection sequences by an autofocus process involving corrective Z axis position changes in gantry 510 and/or XYZ/tilt stage 520 or by use of automatically controlled zoom lenses on both projector and optical sensor/camera.

Transitioning from the Gray Code to the HCBC

The prior art Gray code makes use of a weighted binary numbering system, whereas the HCBC of the present disclosure uses a hybrid mixture of both weighted and non-weighted binary numbering systems. The weighted part of the HCBC is provided by a truncated Gray code and the non-weighted part is provided by appending a series of constant period but waveform-shifted (offset) bar patterns, each non-weighted numbering system pattern identifiable by a unique waveform offset distance with respect to a known position reference. Detailed analysis of the fundamental blurring effects of optical diffraction presented below in the present disclosure indicates that the HCBC may be useful for achieving non-contact measurement accuracy of one micron or less.

Referring now to FIG. 19A, a simple prior art example of a set of five two-dimensional (i.e., having an x and a y axis) Gray code patterns to be projected in sequence at a projector's slide coding surface is illustrated. This sequence uses a weighted numbering system and can encode a total of $2^5 = 32$ stripels in the y dimension. Point 105 on each pattern represents the image of an SBM point that is on the projector's optical axis. Point 106 on each pattern represents the image of an arbitrary measurement point on the SBM surface, having X, Y, Z coordinates determined by the intersection of a back-projected camera ray originating at the center of specific camera pixel $(i, j)$ as illustrated in FIG. 3. Note that both x and y coordinates of measurement point 106 are different from those of the on-axis point 105 because the Gray code patterns are all two-dimensional. However only the decoded y coordinate is needed for triangulation calculation of the three dimensions of a SBM point. Line 405 through points 106 on each pattern is an aid to the eye for determining an example Gray code binary value sequence of the code for the y coordinate of point 106, which can be seen as 00101. In addition, the intersection of line 405 with the bottom scale of stripel distance S in stripels allows a simple visual means to perform Gray to decimal decoding. The decimal value of S can be seen to be 6 or slightly more. Since the stripel index m is the lowest integral (rounded down) value of S, the decimal value of m for line 405 and point 106 in FIG. 19A is 6.

FIG. 19B utilizes the prior art (references U.S. Pat. Nos. 3,799,675 and 5,410,399) concept of characteristic waveforms as one-dimensional square waves which, when only y or S (i.e., one dimensional) encoding is needed. These waveforms can be seen to provide mathematically precise alternatives to the two-dimensional patterns in FIG. 19A when only a measurement of the y coordinate is required. As can be seen, the decoded Gray code number 00101 for line 405 again decodes to m=6 in decimal.

FIG. 20 is an enlarged view of the Gray code waveforms in FIG. 19B. There are three alternative bottom scales, each in units of stripels: Scale 411 indicates integers representing stripel index m. Scale 412 indicates stripel distance S from zero reference $S_0$ at S=0, the same as in FIG. 19A and FIG. 19B. Scale 413 indicates stripel distance from scale center $y_p/Q_s$. It should be emphasized that stripel index m may be found as the rounded-down integer value of stripel distance S. It may be seen in FIG. 20 that the distance in a Gray code waveform to the first waveform transition in stripel units as measured from a position reference point $S_0$ at S=0 is one fourth of each waveform period $\Lambda_p$.

In developing the HCBC it was found to be desirable to define a general waveform offset $O_p$ such that its value for weighted numbering system (Gray code) waveforms would always be zero, but its value for each of a set of unweighted numbering system waveforms would be variable, generally plus and minus values about zero. It was found to be possible to achieve that goal by first assigning a universal offset reference position $S_0$ to the stripel distance zero as on scale 412 of FIG. 20, and then by defining $O_p$ by equation (12) below. This equation may also be seen in block 2911 of HCBC pattern definition flow chart FIG. 29A $$O_p = p - \Lambda_p/4 \ (\Lambda_p < \Lambda_{MIN}/2) \qquad (12)$$
$$= 0 \ (\Lambda_p \geq \Lambda_{MIN}/2)$$

Figure 21:
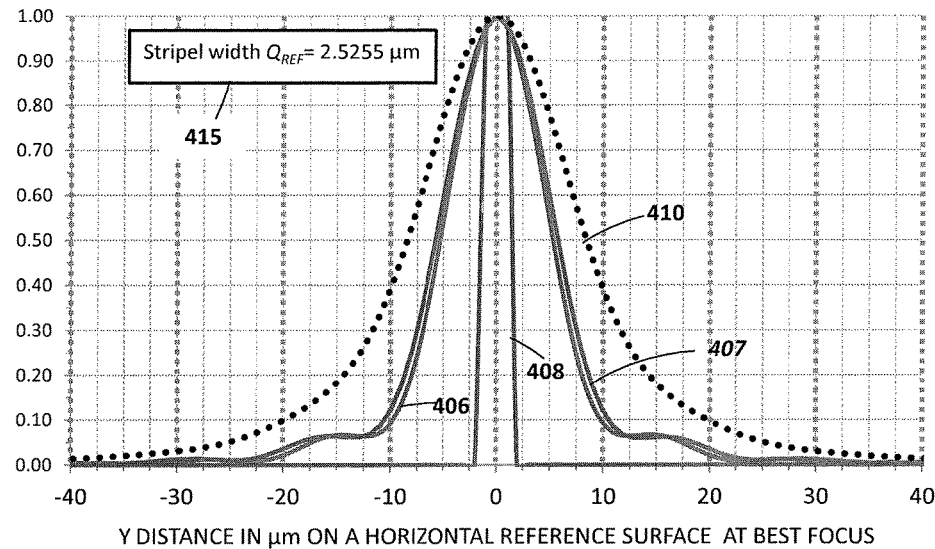
FIG. 21 shows computer-generated plots of example projector and optical sensor/camera line spread functions at best focus on an example reference surface, calculated from the point spread functions in FIG. 12A and FIG. 14A, in accordance with embodiments of the present disclosure.
Figure 22:
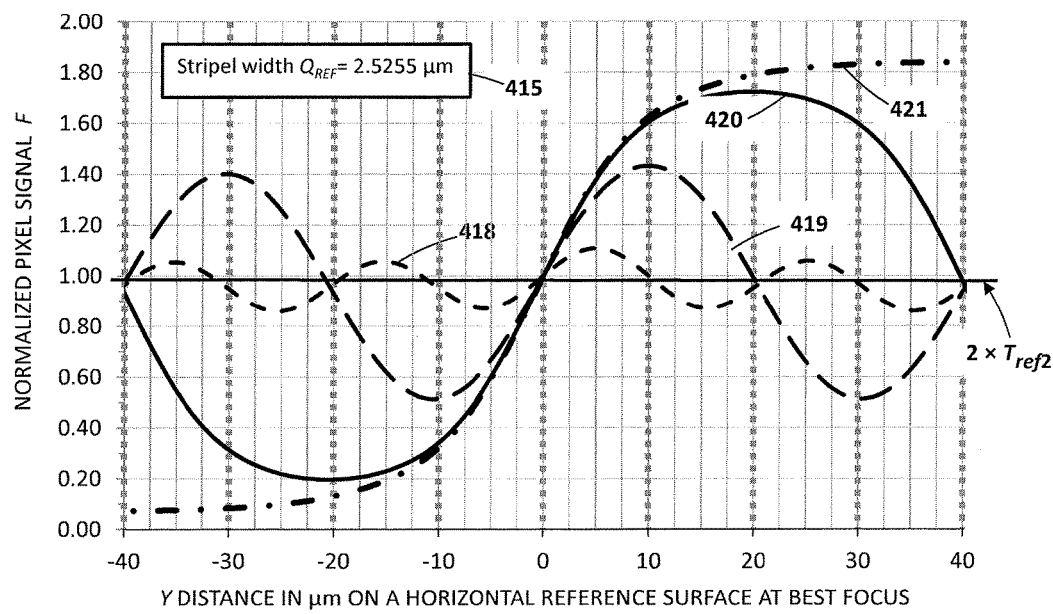
FIG. 22 shows the computer-calculated single pixel responses to four different periods of optical irradiance square waves when they are blurred by projector and optical sensor/camera line spread functions, in accordance with embodiments of the present disclosure.
Figure 23:
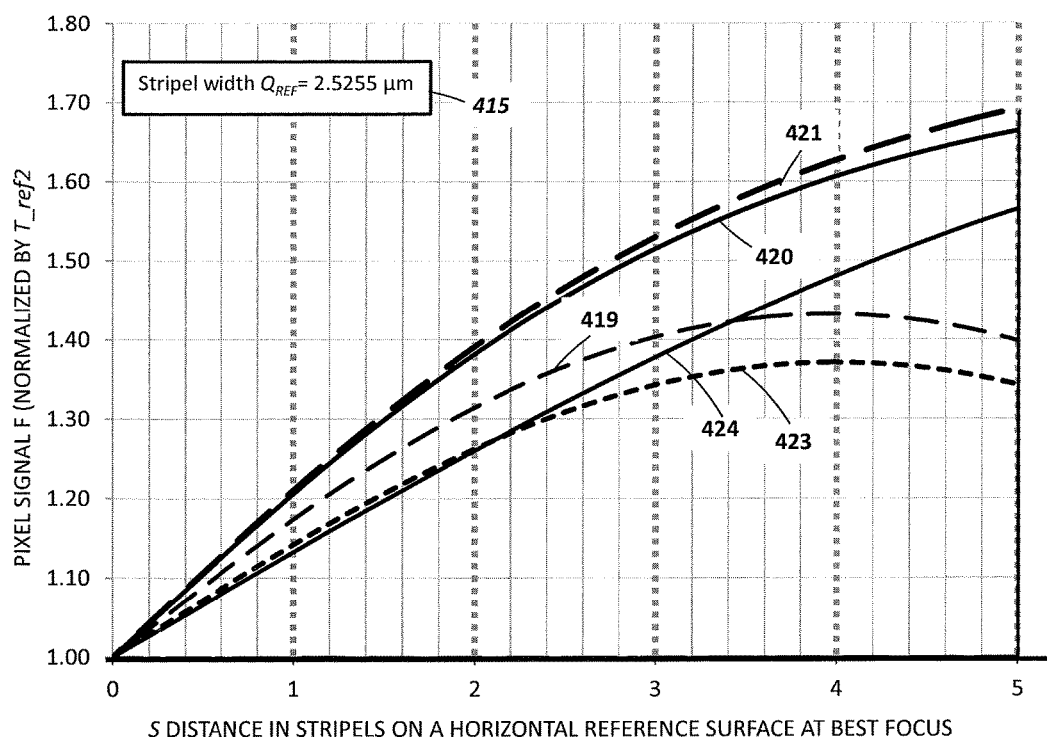
FIG. 23 is an enlarged view of computer-calculated single pixel responses to three different periods of optical irradiance square waves and two different periods of optical irradiance sine waves when they are blurred by projector and optical sensor/camera line spread functions, in accordance with embodiments of the present disclosure.

FIGS. 21-23 present the results of computer simulations performed for an example optical and mechanical design of the present disclosure, prepared by the use of commercially available optical design software (e.g., ZEMAX OPTIC STUDIO® and general computation software MICROSOFT® EXCEL®). Optical system parameters that were used are as defined by the optical prescriptions in Table 3 and Table 5. In this design, a total projector slide width W of 10.0 mm as in Table 1 is encoded into 4,096 stripels, each of physical width 2.441 μm. The slides to be projected are modeled simply as a series of square wave bar patterns with periods starting at four stripels as in the Gray code and increasing by factors of two up to 64 stripels. It should be emphasized that this series of modeled slides does not represent any specific coding sequence such as Gray code or HCBC, but simply serves to model the effect of optical blurring on bar pattern slides with different square wave periods. However, a projected stripel width of 2.5255 μm, and optical blurring at best focus, corresponding to the optical prescription in Table 3 for the example projector lens and Table 5 for the example optical sensor/camera lens are assumed. For this modeling, waveform offsets were adjusted so that square waves having various periods would all have a rising edge at a single given position, e.g., Y=0. Although this condition may not exist in an operational non-contact CMM HCBC code consistent with the example design of the present disclosure, it was a helpful analytical simplification aimed at comparing the effects of optical aberrations and diffraction on square waves of differing periods.

Figure 14A:
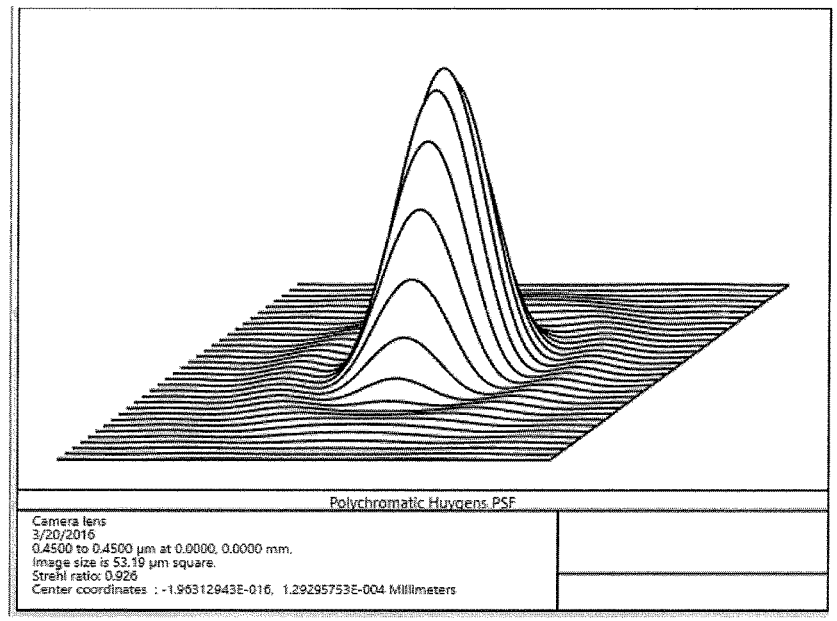
FIG. 14A is a 3D plot of a computer-calculated point spread function for an example tilted camera lens design at best focus, in accordance with embodiments of the present disclosure.
Figure 14B:
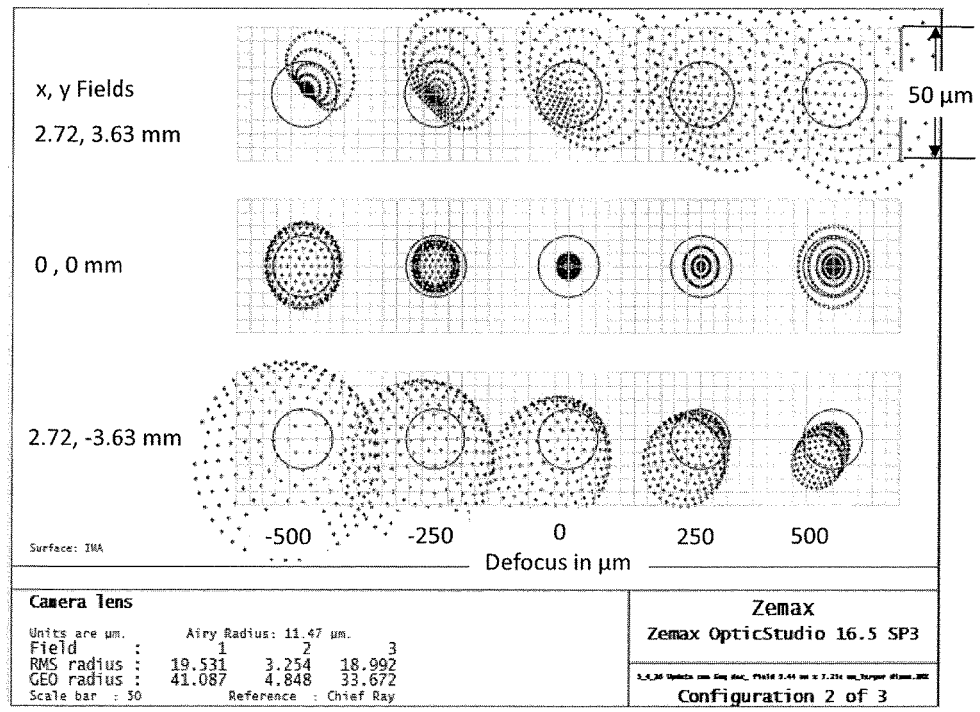
FIG. 14B is a through-focus spot diagram resulting from a computer ray trace of a camera lens design in accordance with embodiments of the present disclosure.

A camera magnification of −1.4:1 was chosen to account for small FPA dimensions and longer camera working distance in viewing the same reference area as the projector, as can be seen in FIG. 3. Computer models of projector and camera optics PSF's at best focus were created by ZEMAX OPTIC STUDIO® 15.5 in the Sequential mode using the Huygens method for physical optics (diffraction) calculations. The results of these calculations are shown in the 2-D plots of FIG. 12A for the projector imaging optics and FIG. 14A for the camera optics. They include diffraction and lens aberrations but not defocus. Both modeled PSF's are close to perfect diffraction-limited Airy patterns, with the Airy radius to the first dark ring being 12.4 μm for the projector and 11.5 μm for the camera. The differences are caused by independent optimization of lens aperture stop radius for each lens to find optimized subjective spot diameters. As seen in the spot diagrams of FIG. 12B and FIG. 14B, the rays at best focus are well inside the Airy radius rings. Modifications to the example HCBC system of the present disclosure may be envisioned, with a different virtual aperture stop radius in the projector created by choice of a different diameter light pipe in selector assembly 8, and a different physical aperture stop radius in the cameras. Smaller aperture stop radii will provide greater depth of focus and larger Airy radii on the SBM and vice versa.

FIG. 21 shows several calculated LSF plots for the Y dimension, where curve 406 is the projector LSF and curve 407 is the camera LSF. In order to create these 1D plots, the 2D PSF data was first calculated in ZEMAX OPTIC STUDIO® sequential mode, followed by downloading the data into an EXCEL® spreadsheet and integrating it in the X dimension. It should be noted that the calculated irradiance for the LSF does not go to zero at the Airy radius as it does in the PSF—this is because of the X dimension integration. In addition flat-top curve 408 models an example pixel active width of 2.8 μm on the FPA, which when magnified results in a 4.0 μm width on the reference image plane. Curve 410 is an overall composite LSF calculated by Fourier transform convolution of the three other curves. By reference to the horizontal scale in units of μm on the surface, the full width half max (FWHM) of composite LSF 410 can be seen to be about 17 μm, corresponding to 6.7 stripels in width.

FIG. 22 shows the result of convolving the composite LSF profile 410 in FIG. 21 with square waves having periods of 8, 16, 32 and 64 stripels using the Fast Fourier Transform method. It should be noted that a curve for a 4 stripel period is not included because the calculated results indicate a nearly flat straight line, i.e., not a viable candidate. Also it should be noted that the horizontal scale of both FIG. 21 and FIG. 22 represents Y distance in μm on example horizontal reference surface 4570. Major vertical gridlines are spaced at 10 μm intervals, while the minor gridlines are spaced at 2.5 μm intervals, very nearly the same as the single stripel width of 2.5255 μm indicated in text box 415 and consistent with the example design of the present disclosure. The vertical axis scale of 0 to 2.0 represents pixel signal magnitude normalized by dividing raw measured magnitude by the measured magnitude of the 50% reference signal. When sub-stripel extrapolation is used as illustrated in FIG. 35, FIG. 36, FIG. 37, FIG. 38 and FIG. 39, the same division by 0.50 is presumed.

Waveform 418 in FIG. 22 is the convolution of LSF 410 with an 8 stripel period square wave. It can be seen to have very small modulation amplitude, only about 8% peak to peak. With this small amplitude and low slope at Y=0, the 8 stripel period waveform is not expected to be usable for extrapolation, and it also may be unsuitable for stripel decoding. Waveform 419 is the convolution of LSF 410 with a 16 stripel period square wave, and can be seen to have a somewhat better 45% peak to peak modulation. Waveform 420 is the convolution of LSF 410 with a 32 stripel period square wave, and can be seen to have a much improved 75% peak to peak modulation. Waveform 421 is the convolution of LSF 410 with a 64 stripel period square wave, and can be seen to have a further improved 85% peak to peak modulation.

Given that an overall goal is to design a 3-D surface profiling system with less than 1 μm of depth (Z coordinate) error, and recognizing that the horizontal scale in FIG. 22 represents the Y coordinate, it may be desirable to use Equation (7) to solve for the maximum allowable Y error that will allow reaching that goal. Recall that Equation (7) is $$Y = b - (Z+a)\tan(\alpha+\varphi) \qquad (7)$$

The angle α is a constant equaling −28 degrees in the example design. It is also reasonable to assume that the most accurate measurement should be made at the center of the measurement field where the angle φ is zero. Therefore, $$Y = b - (Z+a)\tan(\alpha) \qquad (13)$$

Taking derivatives, $$dY = -dZ\tan(-28°) \quad (14)$$
$$= dZ \times 0.532$$

The result of the above logic is that the maximum horizontal error dY should be less than +/−0.53 µm at the center of the measurement field. For a stripel width of 2.5255 µm as in FIG. 22 this means that the maximum Y error should be +/−0.21 stripels in order to achieve +/−1.0 micron Z accuracy. Since the distance between minor vertical gridlines in FIG. 22 is approximately one stripel, it may be expected that sub-stripel extrapolation such as described with respect to FIGS. 35-41 of the present disclosure can be used to achieve this accuracy.

FIG. 23 shows an enlarged view of curves 419, 420, and 421 for 16, 32 and 64 stripel periods respectively. It has a scale in stripels with vertical gridlines at 0.20 stripel intervals representing the approximate maximum allowable Y error for 1 µm accuracy in the Z dimension. It should be noted that only positive values of Y are needed in FIG. 23 because the curves all have odd symmetry. It can be seen in FIG. 23 that curve 421 for a 64 stripel period has the longest and steepest linear slope region, and therefore may be capable of achieving a desired level of accuracy (e.g. 1 micron accuracy) in the Z measurement. Curve 420 for a 32 stripel period, which has been selected for the example design of the present disclosure, is another example with nearly the same slope and linear region, also appearing capable of achieving 1 micron accuracy. However, curve 419 for a 16 stripel period squared wave shows a marked loss of slope and linearity with comparison to the other square wave curves.

In summary, FIG. 22 and FIG. 23 show that in order to make 1 µm Z resolution possible 1) the stripel width on the SBM should be no longer than 2.5255 µm, and 2) it may be desirable to set the shortest minimum square wave period to at least 16 and preferably at least 32 stripels. It is clear that under the rules for forming a projection sequence made up only of Gray code patterns that the two above conditions are contradictory. A minimum period of at least 16×2.5255=40.041 µm and preferably 32×2.5255=80.816 µm would be used. Under Gray code rules, the stripel width is one fourth of the minimum period, making it at least 10.1 µm and preferably 20.2 µm. This violates the condition 1) for maximum stripel width by factors of four and eight respectively.

Figure 28A:
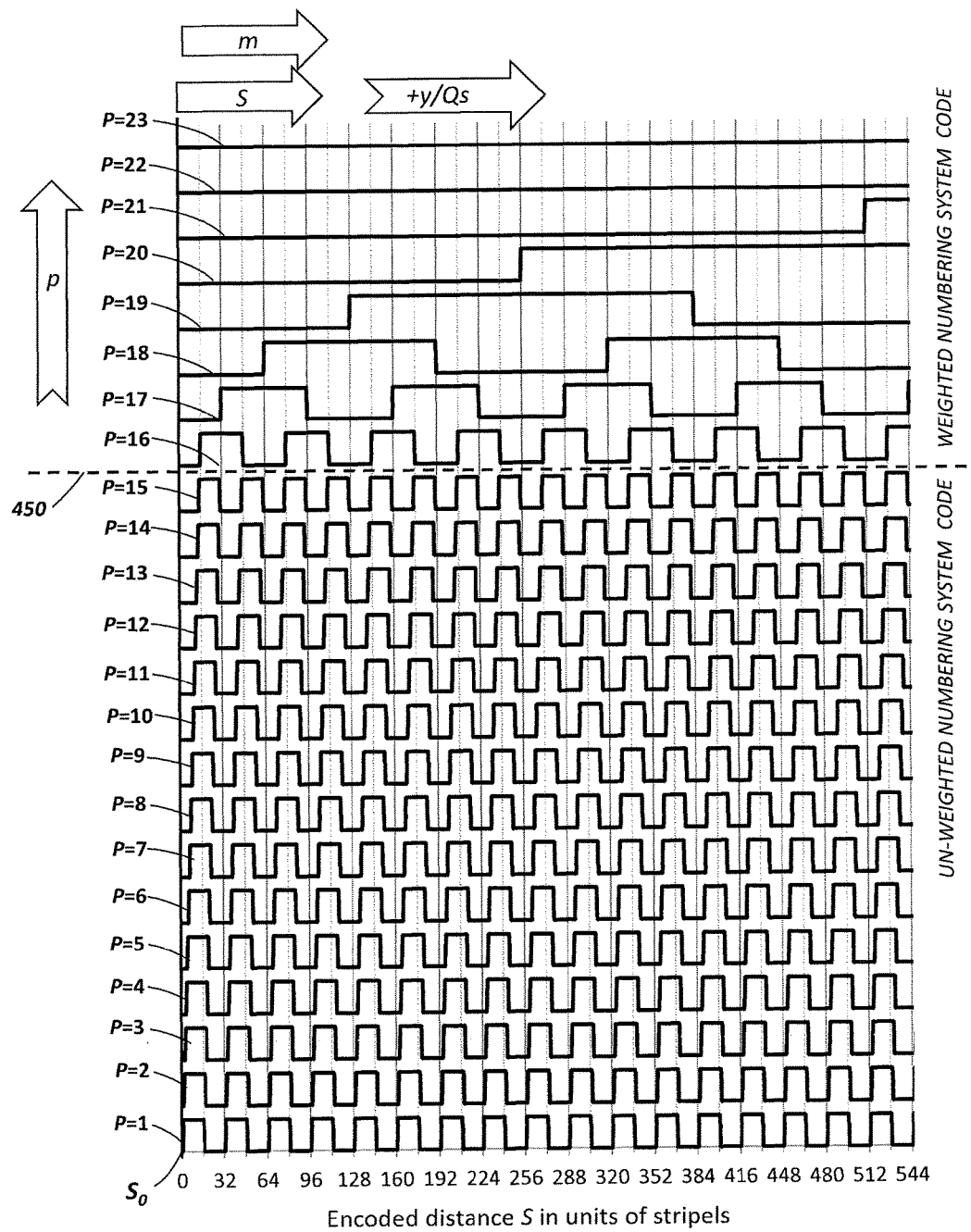
FIG. 28A is a computer-calculated illustration of HCBC characteristic waveforms representing a 32 stripel minimum period HCBC, where stripel distance S varies from zero to 544, showing the difference between weighted and non-weighted numbering system codes, in accordance with embodiments of the present disclosure.
Figure 28B:
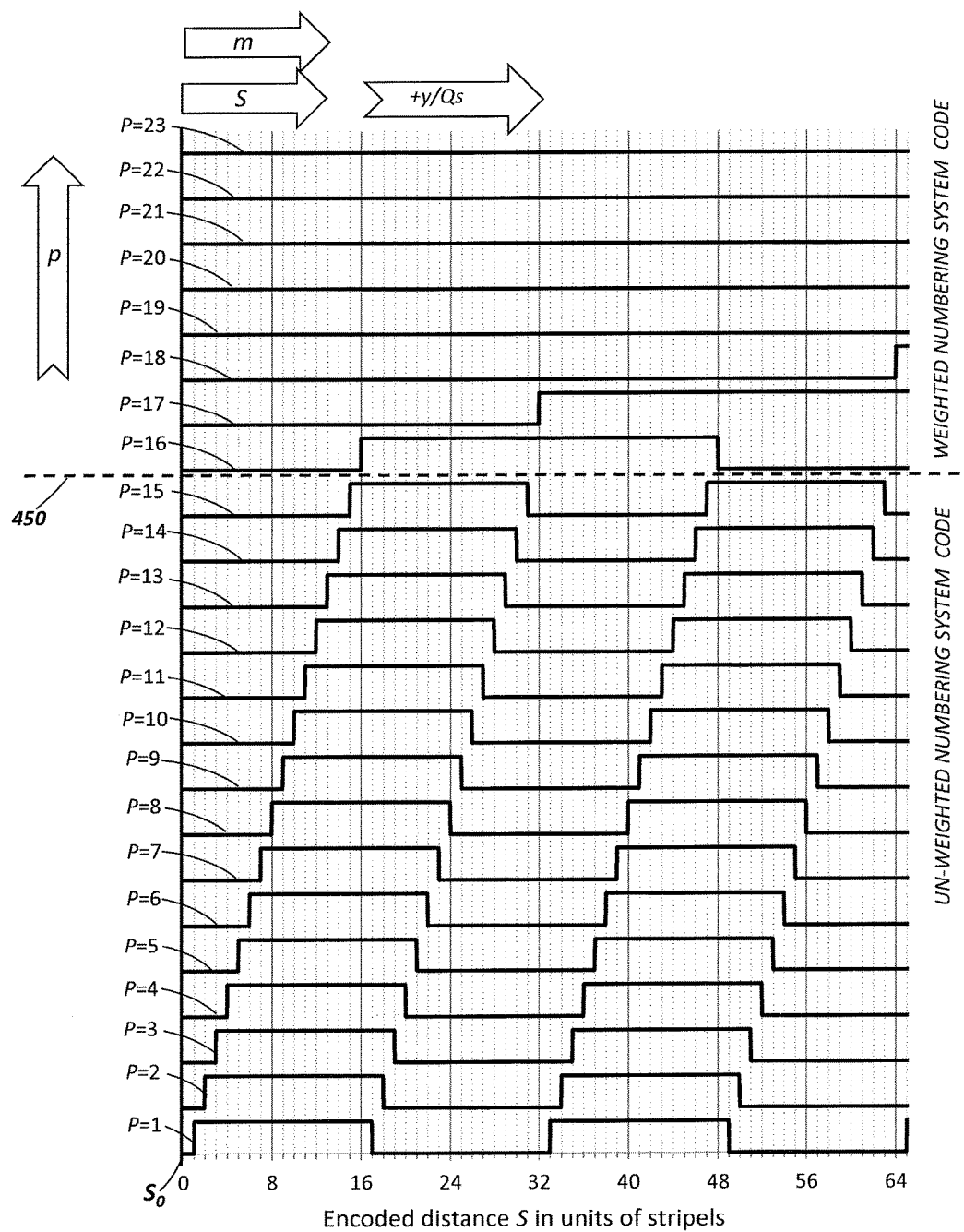
FIG. 28B is a more detailed view of the HCBC waveforms in FIG. 28A over a reduced stripel distance of zero to 64, in accordance with embodiments of the present disclosure.

The characteristic of Gray code that make it difficult or even impossible to meet the above accuracy specification is primarily that it adheres to a specific weighted numbering system. The HCBC is offered in the present disclosure as an alternative that provides a means to escape the rigidity of the Gray code. It does this by defining a large number of hybrid weighted/non-weighted combinations, with the non-weighted portion of the code being accomplished by incrementally increasing waveform offset $O_p$ as seen in FIG. 28A and FIG. 28B. Although additional code patterns are projected to attain this benefit, the increased accuracy may in some cases outweigh any growth in system size or weight associated with the use of the additional patterns.

Also in FIG. 23, curves 423 and 424 for 16 stripel period and 32 stripel period sinusoidal waves are shown in order to provide a means to compare the fundamental limits of measurement accuracy for an alternative 3D measurement approach that makes use of appended sinusoidal wave patterns instead of appended HCBC square wave patterns. The stripel width for these calculations was maintained at 2.5255 µm. Experimental 3D measurement systems with sinusoidal wave patterns appended to a sequence of Gray code patterns are known. However, the maximum slope of pixel signal response to a sine wave is less than that for a square wave of the same period and same peak amplitude. It can be seen from the Figure that at a Y distance of one stripel, the average response slope of square wave curve 420 for a 32 stripel period is approximately 50% greater than that of the sine wave curve 424 having the same period. The slope of square wave curve 419 for a 16 stripel period is greater than that for sine wave curve 423 but with less advantage than for the 32 stripel period. The slope advantage clearly remains with the square waves.

Because ultimate system measurement error is inversely proportional to the product of signal slope and RMS random noise magnitude, it appeared during preliminary system design that better accuracy in the presence of random camera pixel noise could be achieved by projecting 32 stripel period or longer square wave irradiance patterns rather than projecting sinusoidal wave patterns of any period. Accordingly an effort was made to seamlessly attach a group of patterns containing waveform-shifted square waves to a group of Gray code patterns. The result is the HCBC code of the present disclosure.

Figure 24:
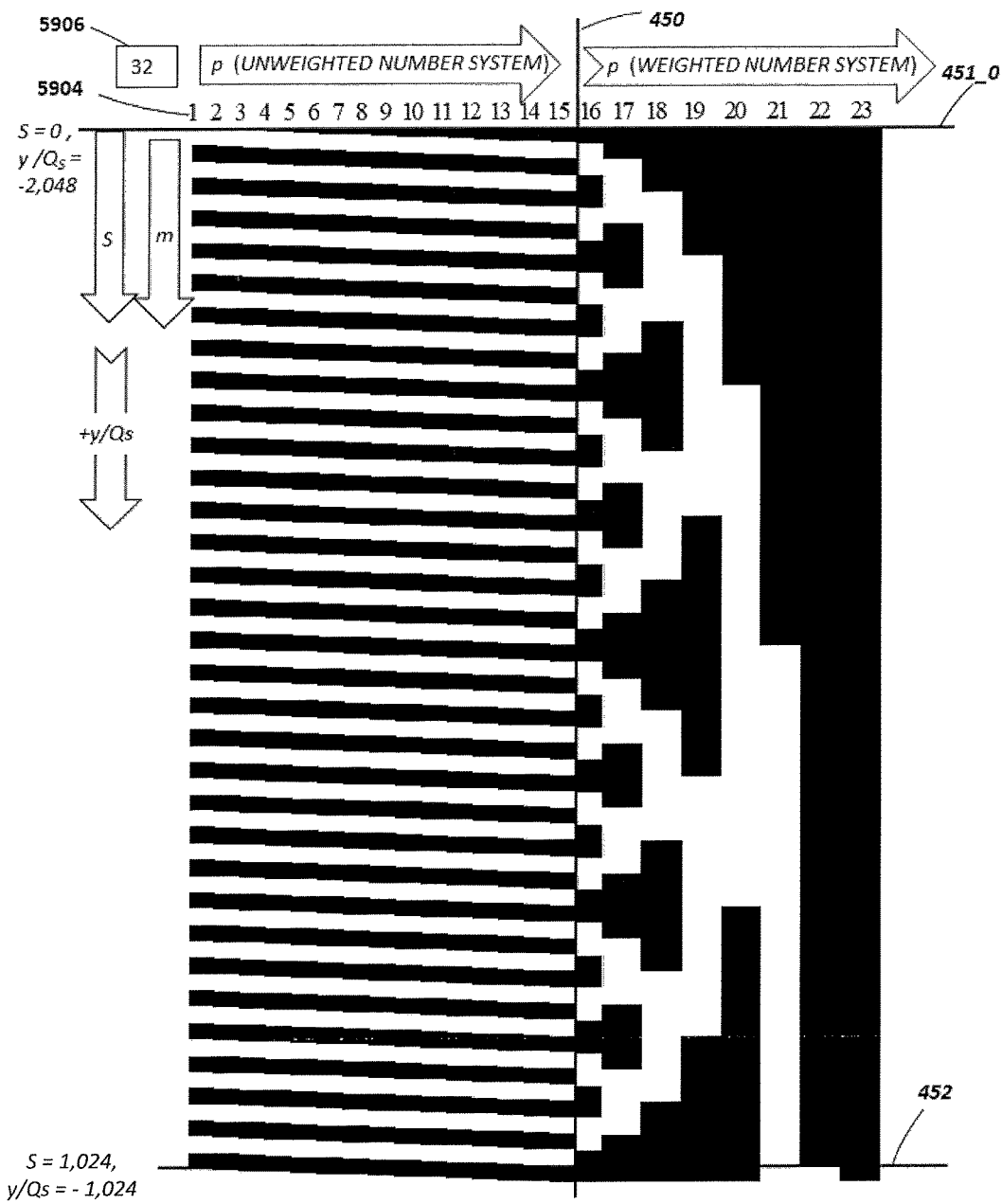
FIG. 24 is a high level black and white visual depiction of a 32 stripel minimum period HCBC over an encoding region of stripel distance from zero to greater than 1,024, in accordance with embodiments of the present disclosure.

FIG. 24 is a high level black and white graphic depiction of the overall structure of the resulting HCBC, where regions in white represent the binary number 1 and regions in black represent the binary number 0. The Figure was created by extreme (more than 20:1) de-magnification of a portion of an EXCEL® numerical spreadsheet having 25 columns and 4,096 rows, with each cell containing values either 1 or 0. There is a pure Gray code (weighted numbering system) region on the right side of line 450 and a variable offset square wave (unweighted numbering system) region to the left. The silhouetted "towers of Hanoi" structure of the Gray code can clearly be seen on the right side of line 450 and the effect of constant pattern period with linearly increasing waveform offset can be seen on the unweighted numbering system side.

Horizontal scale 5904 of FIG. 24 is located at the top of the Figure, and defines 23 spreadsheet columns identified by pattern index numbers p from 1 to 23. There are three vertical broad arrows located at the left side of the Figure, the first vertical arrow representing stripel distance S measured downward from a zero reference at line 451, the second representing stripel index m in integers from the same reference line 451, and the third representing plus/minus stripel distance $y/Q_S$. All scales are measured with respect to line 451 and are consistent with the scale definitions of FIG. 20. Line 452 is at a one-quarter way distance (S=1,024) with respect to the entire coded distance of 4,096 stripels in the example system design of the present disclosure. This is represented in FIG. 24 by a black-to-white transition seen in the p=22 column at stripel distance S=1,024 and $y/Q_S=0$.

The individual spreadsheet cells are not visible in FIG. 24, but were conditionally formatted in the Excel® numerical spreadsheet so that those cells with value 0 would be made black and those with value 1 would remain white. This effect may be seen clearly in the detailed Excel® spreadsheet copies in FIG. 25 and FIG. 26. Returning to FIG. 24, It can be seen that the coding to the left hand side of line 450 exhibits a uniform region of slanted bars produced by fifteen characteristic square waves with the same period of $\Lambda_{MIN}$=32 stripels but incrementally shifted by one stripel per pattern index p. Line 450 thus separates the unweighted numbering system code on the left (where index p varies from 1 to 15) from the weighted numbering system Gray code on the right (where index p varies from 16 to 23). The individual shifts of one stripel in the unweighted region are too small to be seen in FIG. 24 but will be visible in other figures to be presented such as FIG. 26 and FIG. 27.

Figure 25:
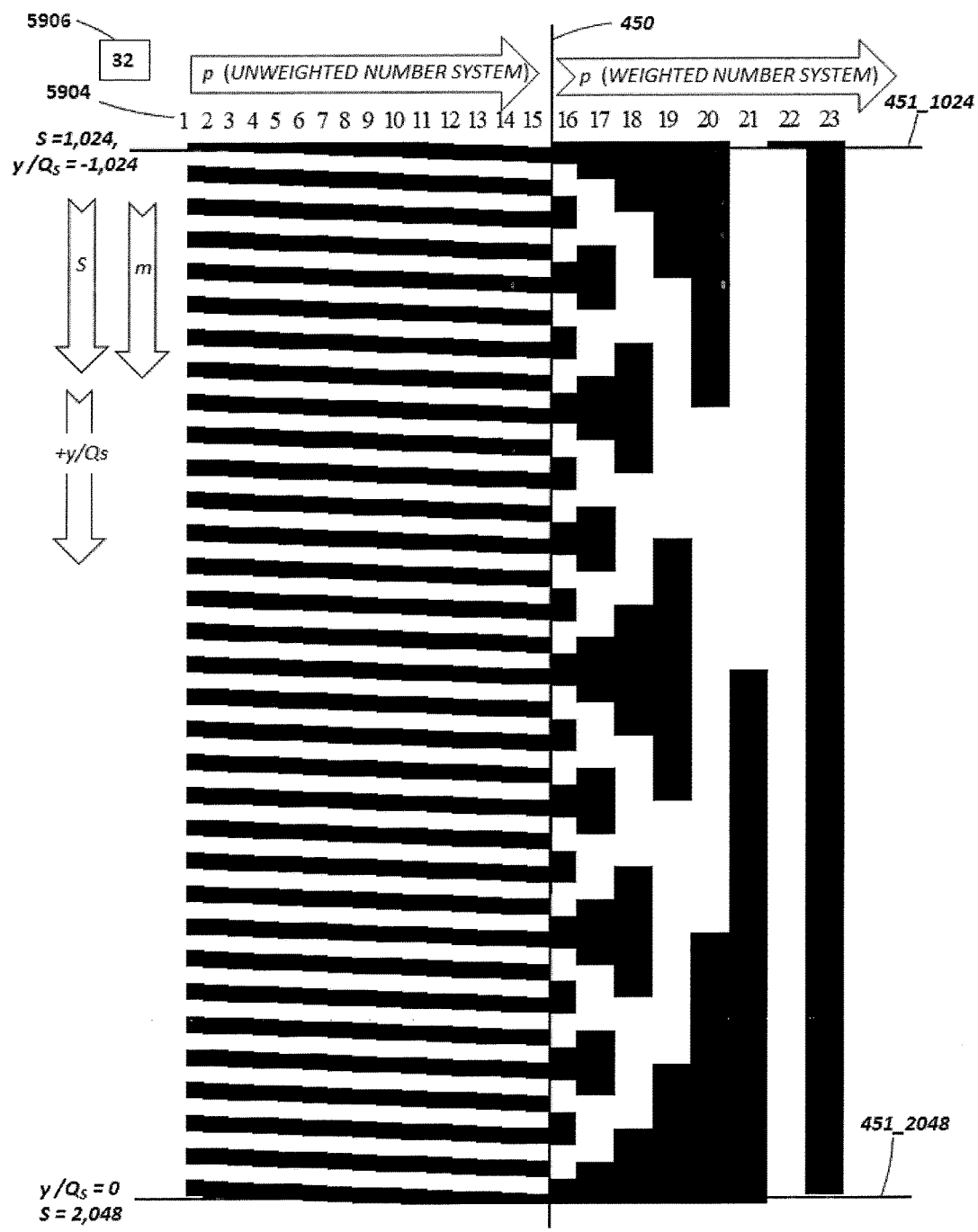
FIG. 25 is a high level black and white visual depiction of a 32 stripel minimum period HCBC over an encoding region of stripel distance from 1,024 to 2,048, in accordance with embodiments of the present disclosure.

FIG. 25 is a copy of a different region of the same spreadsheet referenced in FIG. 24, showing rows representing stripel index m from 1,024 at line 452 to 2,048 at line 453. Line 453 therefore represents the midpoint of the entire 4,096 stripel code 4508.

Figure 26:
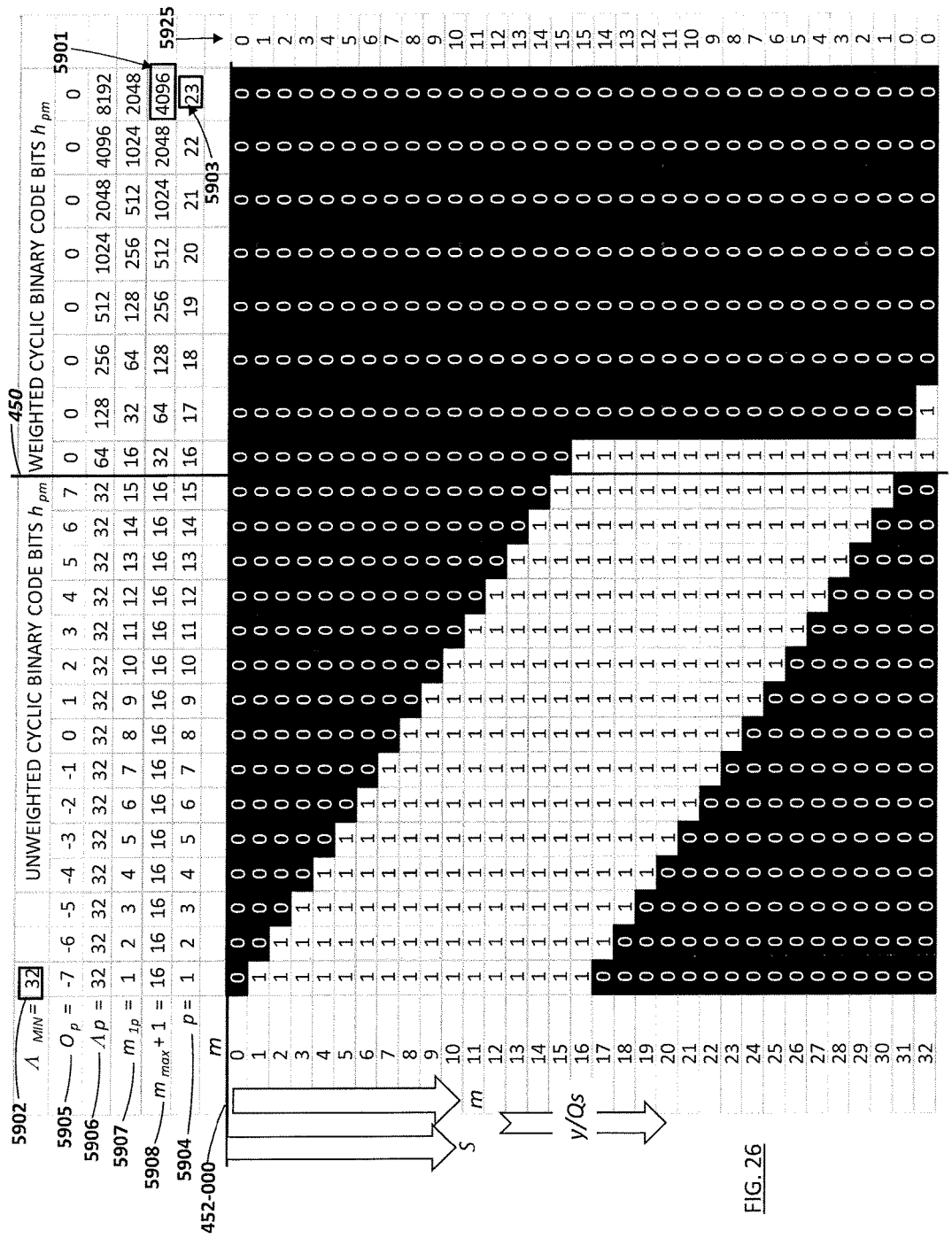
FIG. 26 is a copy of a Microsoft® Excel® computer-calculated table of individual bit values in a 32 stripel minimum period HCBC, showing bit values versus pattern index p and stripel index m, where index m varies from 0 to 32, in accordance with embodiments of the present disclosure.

FIG. 26 is a less de-magnified and therefore more detailed copy of the same EXCEL® spreadsheet shown in FIG. 24, and now showing a five-row heading containing parameters pre-calculated by the method and formulas of blocks 2901, 2902, 2904, 2909, 2910, 2911, 2912 and 2913 in the flow chart of FIG. 29A.

Spreadsheet cell 5901 in FIG. 26 contains the number 4,096, representing the desired total number of stripels ($m_{MAX}+1$) to be encoded in the example system of the present disclosure, indicated by block 2901 of code creation flow chart FIG. 29A. It is noted that 4,096 is one half of the maximum weighted numbering system period of 8,192 in row 5906. Spreadsheet cell 5902 in FIG. 26 contains the number 32, representing the desired minimum HCBC square wave period $\Lambda_{MIN}$ in stripels in the example system of the present disclosure, and also indicated by block 2902 of flow chart FIG. 29A. Spreadsheet cell 5903 contains the in-cell calculated number 23, representing the total number $p_{MAX}$ of HCBC patterns and also representing the number of cells in the five spreadsheet rows 5905, 5906, 5907, 5908, and 5904 to the left of line 451. The formula in spreadsheet cell 5903 is Equation (15) below, which is also the same as the formula in block 2904 of flow chart FIG. 29A:

$$p_{max}=\Lambda_{min}/2+\log_2[(m_{MAX}+1)/\Lambda_{min}] \quad (15)$$

As can be seen in Equation (15), the number $p_{max}$ is defined by previous choices of total number of stripels ($m_{MAX}+1$) in spreadsheet cell 5901 and minimum square wave period $\Lambda_{MIN}$ in spreadsheet cell 5902.

Spreadsheet row 5905 contains 23 cells of waveform offset $O_p$ in stripels that varies with pattern index p in row 5904, according to the result of a test question in block 2909 of flow chart FIG. 29A. It can be seen from blocks 2905, 2911 and 2913 of FIG. 29A that if $p<\Lambda_{MIN}/2$, which is 16 in the example system, then $O_p=p-\Lambda_{MIN}/4$. But if not, $O_p=0$. Because $\Lambda_{MIN}/4=8$ stripels in the example system, and the value of p in row 5904 increases in steps of one stripel from 1 to 23, it may be seen that the first value of $O_p$ in row 5905 is −7 and each succeeding number increases by one stripel up to p=15. For p=16 through 23 there are eight waveforms having zero shifts.

Spreadsheet row 5906 contains 23 cells of waveform period $\Lambda_p$ in stripels, which is defined by the result of test question $p<\Lambda_{MIN}/2$ in block 2905 of flow chart FIG. 29A. It can be seen from blocks 2905, 2911 and 2913 of FIG. 29A that if $p<\Lambda_{MIN}/2$, which is 16 in the example system, then $\Lambda_p=\Lambda_{MIN}$, but if not, $\Lambda_p=\Lambda_{min}(2^{(p-(\Lambda min/2+1))})$. It can be seen in spreadsheet row 5906 that the cell representing $\Lambda_p$ for p=23 contains the number 8,192, which is twice the total number of encoded stripels in spreadsheet cell 5901. This is a characteristic of the Gray code and can also be seen in the waveform for p=5 in FIG. 19B and FIG. 20.

Figure 29B:
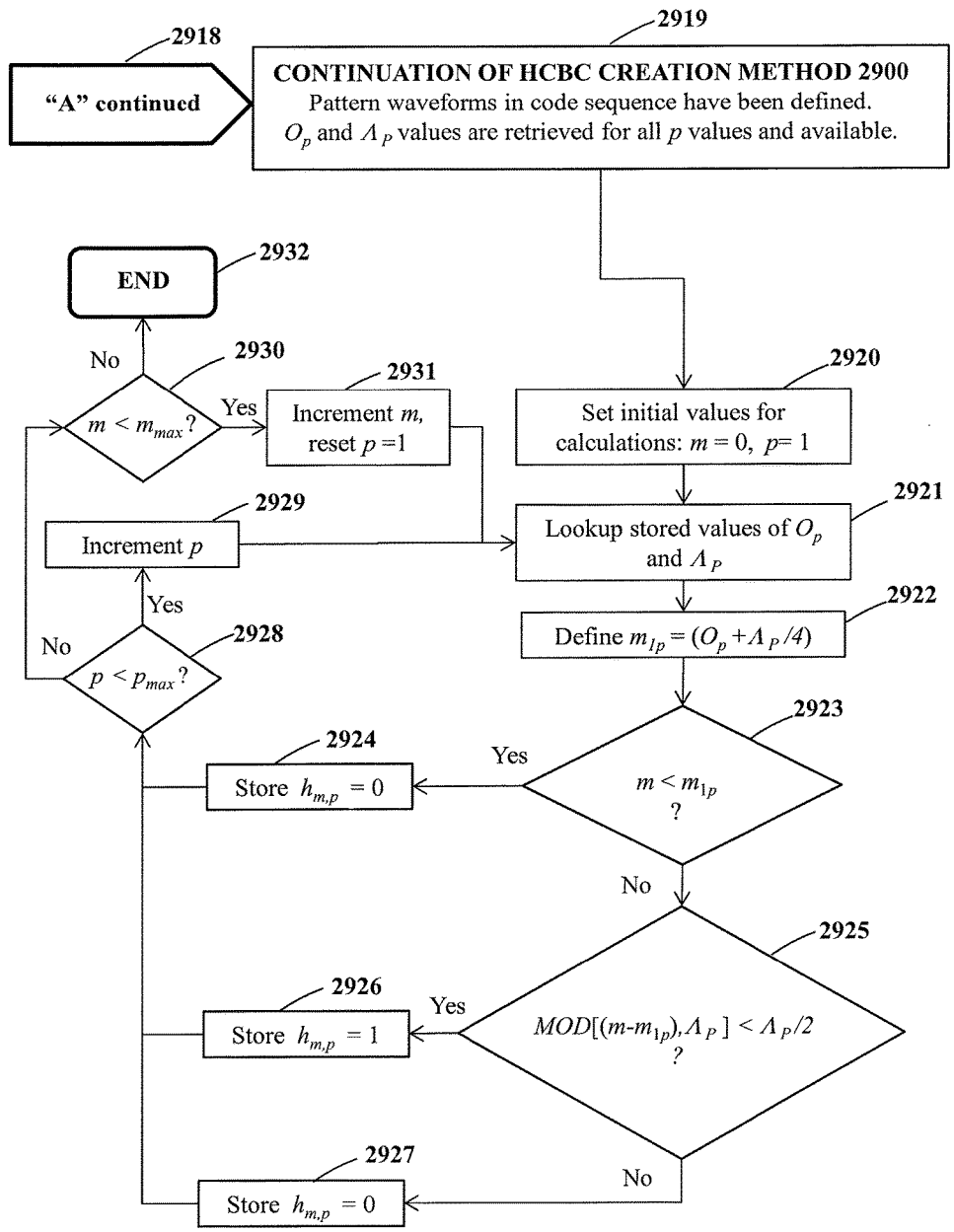
FIG. 29B is a continuation of a flow chart of example operations of a logical method for creating an HCBC structured light code, in accordance with embodiments of the present disclosure.
Figure 29C:
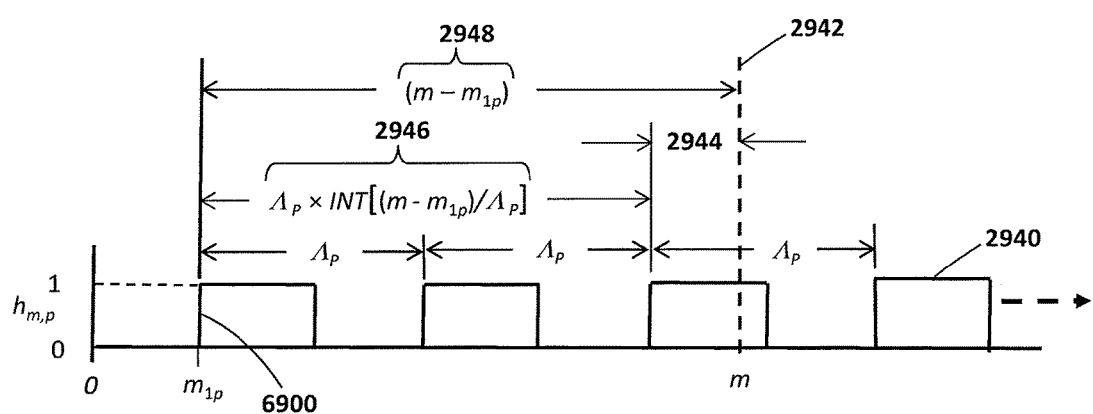
FIG. 29C is a waveform diagram illustrating a use of characteristic waveforms and a Microsoft® Excel® mathematical "MOD" function, in accordance with embodiments of the present disclosure.

Spreadsheet row 5907 contains 23 cells of stripel index $m_{1p}$, which indicates the stripel whose numerically lowest boundary is created by a transition in pattern p and represents the first waveform transition from zero to one (also illustrated by stripel distance 6900 in waveform diagram FIG. 29C.). The values of index $m_{1p}$ in spreadsheet row 5907 are calculated by equation (16) using the pre-calculated values of $O_p$ and $\Lambda_p$ in rows 5905 and 5906:

$$m_{1p}=O_p+\Lambda_p/4 \quad (16)$$

In the entire spreadsheet from which FIG. 26 was copied, there are 4,096 rows below line 452-000 representing 4,096 unique stripels, each row being identified by a unique stripel index number m from zero to 4,095. Individual cells in each row contain a binary bit value $h_{pm}$ except for column 5925 to the right containing decimal numbers representing the sum of unweighted bits in each row.

It should be noted that the sum of unweighted bits in column 5925 is not used in the method of HCBC creation but is used in the decoding process. It may assist the reader in understanding the basic code structure, pursuant to which the sum of unweighted bits in column 5925 can be seen to repeat the value 15 or the value of zero at intervals of 16 stripels or one half of the chosen minimum period $\Lambda_{MIN}$ in stripels. This represents a key characteristic of the HCBC, i.e., an apparent unweighted code ambiguity that is resolved by a transition in one of the weighted code patterns, i.e. patterns with index p from 16 to 23. The sum in column 5925 is useful in the HCBC decoding method shown in flow chart FIG. 32 block 3207. The foregoing is the basis for melding non-weighted and weighted elements in the HCBC, and provides for generating and decoding any HCBC variant.

Below line 452-000 in FIG. 26 each spreadsheet row represents an individual stripel m, with a range of 0 to 64 displayed. The fine structure of the slanted bars in FIG. 24 is now visible. In any spreadsheet column designated by pattern index p, one may start at the cell designated by stripel m=0 and continue with increasing m, S and $y/Q_S$. For any index p this process will trace out its characteristic waveform.

Figure 27:
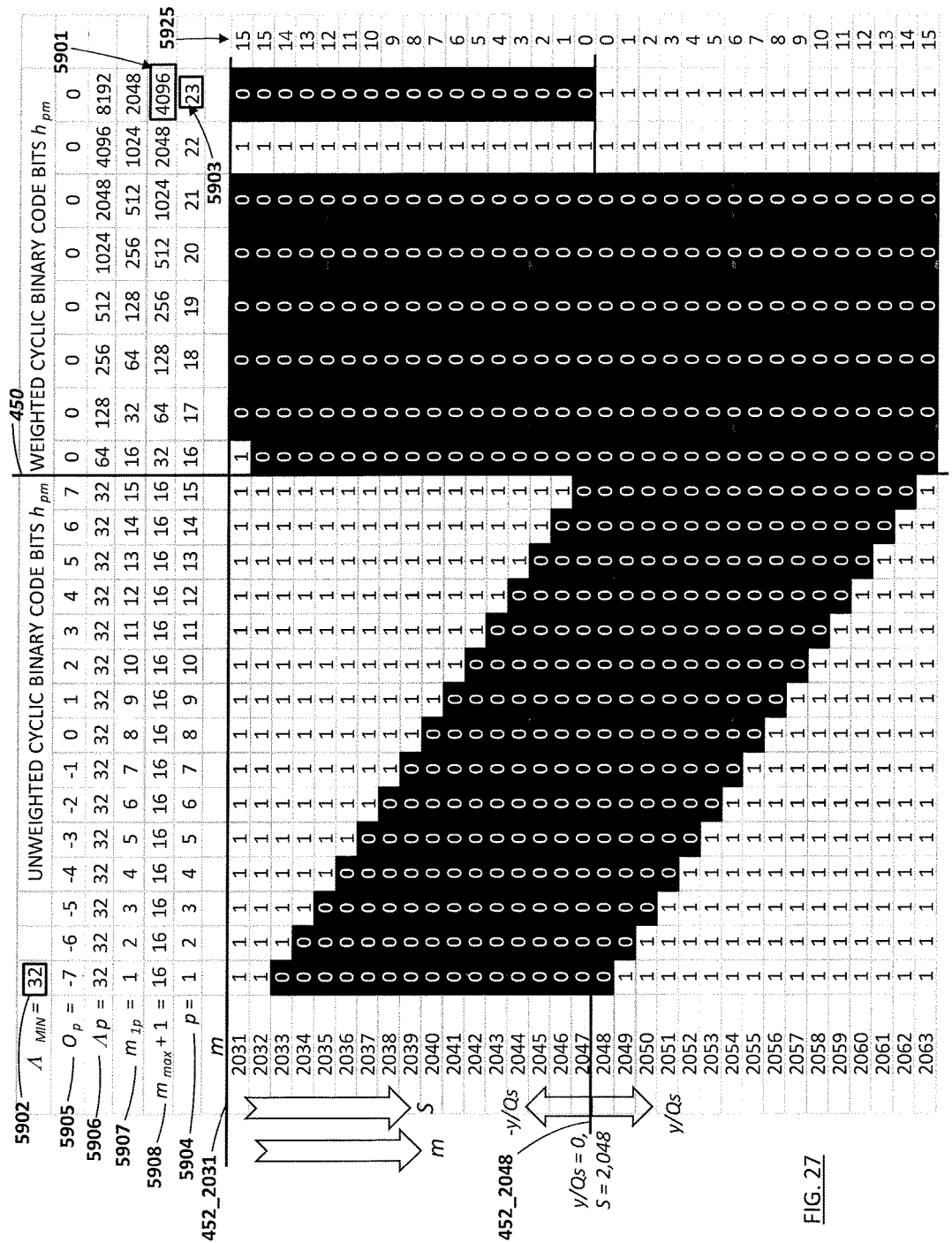
FIG. 27 is a copy of a Microsoft® Excel® computer-calculated table of individual bit values in a 32 stripel minimum period HCBC, showing bit values versus pattern index p and stripel index m, where index m varies from 2,031 to 2,063, in accordance with embodiments of the present disclosure.

FIG. 27 shows a scrolled-down view of the same spreadsheet used to generate. FIG. 26. It shows approximately the same number of stripels as FIG. 26, except that FIG. 27 starts at line 452-2031 and covers the central stripel range from 2,031 to 2,063, including the $y/Q_S=0$ line 452-2048 between stripels 2,047 and 2,048. Since line 452-2048 also represents the intersection of the projector lens group optical axis with the slide plane at point 105 shown in FIG. 3 and FIG. 15, stripels in the immediate vicinity of line 452-2048 may be of special interest.

FIG. 28A shows the HCBC represented as a series of characteristic waveforms instead of a numerical spreadsheet matrix as in previous drawings. It should be noted that the un-weighted waveforms below dividing line 450 all have a 32 stripel period. Above line 450, all waveforms obey the weighted waveform rules as previously discussed with respect to FIG. 20.

FIG. 28B shows an enlarged view of the same waveforms as in FIG. 28B, covering a reduced stripel distance range of zero to 64 instead of zero to 544. In this view the single stripel offset steps are clearly shown inside the un-weighted numbering system minimum period waveforms, below line 450 (i.e., waveforms for pattern indices p=1 through 15), plus an additional single stripel offset between waveforms p=15 and p=16. This feature of the HCBC allows it to combine a weighted numbering system code such as Gray code with a non-weighted numbering system code.

FIG. 28C is a table describing a plurality (e.g., 121) of possible code variants of the HCBC, and eleven more which represent the Gray code itself. It should be understood that FIG. 28C covers only a sample of the entire range of code variants that are available. The table was developed by use of the method documented in the coding flow charts of FIG. 29A and FIG. 29B. To use the table, one starts by choosing the desired total number of encoded stripels ($m_{MAX}+1$) and the desired minimum waveform period $\Lambda_{MIN}$ in stripel units, with the understanding that $\Lambda_{MIN}=4$ in the first row of the table represents Gray code. For each set of the two above chosen numbers, the corresponding table entry will provide the total number or patterns (bits) that are used to create a full HCBC sequence. The last column in the table will provide the number of un-weighted slides that are included in the total. For example, the HCBC variant for 4,096 total stripels and a minimum period of 32 stripels as in the model system of the present disclosure uses a total of 23 slides, 15 of which are unweighted.

The number of un-weighted bits is easily calculated from the equation in block 2903 of flow chart FIG. 29A:

No. unweighted bits/patterns=$\Lambda_{MIN}/2-1$    (17)

Since the pattern index p in any HCBC sequence (including a Gray code sequence) starts at one and ends at $p_{MAX}$, the total number of bits/patterns in a sequence is $p_{MAX}$, which is calculated using equation (14) previously shown.

The number of weighted bits/patterns may be found by subtracting the number of unweighted bits in Equation (17) from the total number of bits/patterns in Equation (15), resulting in No. weighted bits/patterns=$\log_2[(m_{MAX}+1)/\Lambda_{min}]+1$    (18)

Using only the total desired number of stripels ($m_{MAX}+1$) and the minimum period $\Lambda_{MIN}$, Equations (14) and (17) can be used to determine the total number of patterns and total number of unweighted patterns that are needed to construct an HCBC sequence. In one example system design of the present disclosure, the preferred minimum period $\Lambda_{MIN}$ is 32 stripels and the preferred total number of stripels is 4,096. The total number of code patterns (excluding uniform reference patterns) for the example system design is found at the intersection of the column for 4,096 total stripels and the row for a 32 stripel minimum period, which provides the result of 23 HCBC patterns. It should be kept in mind that the FIG. 28E table or Equations (16) and (17) by themselves cannot provide the width of one stripel in physical units because they do not include an entry for the desired physical length to be encoded. This is provided in the example design of the present disclosure by postulating a slide illumination window of 10.0 mm coded length, which when divided by 4,096 stripels results in a stripel width $Q_S$ of 2.441 μm on the projector slide surface.

FIG. 29A is a flow chart of example operations of a method for defining a measurement code in accordance with one example of a method for measuring the profile of a surface with structured light consistent with the present disclosure. As shown, method 2900 begins at block 2901, pursuant to which a trial number representing total code length ($m_{MAX}+1$) in units of stripels is chosen. The method then proceeds to block 2902, pursuant to which a second trial number representing the minimum repetition period $\Lambda_{MIN}$ is chosen for application to the entire group of characteristic square waves in units of stripels that comprise the unique HCBC to be defined, e.g., $\Lambda_{MIN}=32$ stripels for the entire group of characteristic waveforms illustrated in FIG. 28. The method then proceeds to block 2903, pursuant to which the trial number of unweighted binary bits in the code is calculated by Equation (15). Alternatively it can be looked up in a prepared numerical table such as FIG. 28E. The method then proceeds to block 2904, pursuant to which a trial number $p_{MAX}$ of total HCBC patterns is calculated by Equation (16). The method then proceeds to test block 2905, pursuant to which a decision is made as to whether both the code length ($m_{MAX}+1$) and the total number $p_{MAX}$ of patterns in the code are acceptable. If the decision in block 2905 is "No", the method proceeds to block 2906, pursuant to which second choices for $p_{MAX}$ and ($m_{MAX}+1$) are made and the method is returned to block 2901 and block 2902. The sequence of methods in blocks 2903, 2904 and 2905 is repeated until the result of test block 2905 is "Yes", in which case the method proceeds to block 2907, pursuant to which the number of weighted bits in the code is calculated by Equation (17), and also proceeds to block 2908, pursuant to which the initial value of pattern index p is set at 1 and the initial value of stripel index m is set at zero.

The method then proceeds to test block 2909, pursuant to which a decision is made as to whether or not the variable integer p as updated in block 2908 is less than the integer $\Lambda_{MIN}/2$. If the decision is "Yes", the method proceeds to block 2910, pursuant to which the period $\Lambda_p$ of the characteristic square wave corresponding to pattern/bit index p is assigned the value $\Lambda_{MIN}$. In addition, if the decision in block 2909 is "Yes", the method also proceeds to block 2911, pursuant to which the waveform offset $O_p$ of the waveform corresponding to pattern index p is assigned the value $p-\Lambda_{MIN}/4$. If the decision in block 2909 is "No", the method proceeds to block 2912, pursuant to which the period $\Lambda_p$ of the characteristic square wave corresponding to pattern index p is assigned the value $\Lambda_P=\Lambda_{min}(2^{(p-(\Lambda\ min/2+1))})$. In addition, if the decision in block 2909 is "No", the method also proceeds to block 2913, pursuant to which the waveform offset $O_p$ of the waveform corresponding to pattern index p is assigned the value $O_p=0$.

The method then proceeds to block 2914, pursuant to which all values of $\Lambda_p$ and $O_p$ for the current value of p are stored in electronic memory. After the values of $\Lambda_p$ and $O_p$ are stored, the method proceeds to test block 2915, pursuant to which "Yes" results if p is less than $p_{MAX}$, and the method proceeds to block 2916, pursuant to which the value of p in block 2908 is incremented by one and the method repeats the loop from decision block 2909 and then forward until it again reaches test block 2914. The method continues to increment p until it reaches $p_{MAX}$, e.g., 23 as seen in FIG. 26, which shows the calculated values of $\Lambda_p$ and $O_p$ for each value of p from 1 to 23 in the spreadsheet rows above line 451. When p reaches $p_{MAX}$ in block 2915 to cause a "No" output, the method progresses to connector block 2917.

FIG. 29B is a continuation flow chart of example operations for defining a measurement code in accordance with one example of a method for measuring the profile of a surface with structured light consistent with the present disclosure. Method 2900 continues from connector block 2917 in FIG. 29A to connector block 2918 in FIG. 29B, and from there to continuation block 2919 pursuant to which stored values $O_p$ and $\Lambda_p$ as defined by operations in block 2914 of FIG. 29A may be retrieved. The method then proceeds to block 2920, pursuant to which initial values of m=0 and p=1 may be set. The method then proceeds to block 2921, pursuant to which the stored values of $O_p$ and $\Lambda_p$ may be looked up for the value of p in block 2921. The method then proceeds to block 2922, pursuant to which the value of $m_{1p}$ may be calculated by the formula $m_{1p}=O_p+\Lambda_p/4$. The method then proceeds to test block 2923, pursuant to which if the current value of m is less than $m_{1p}$ (Yes) the method proceeds to block 2924, pursuant to which the bit value $h_{mp}$ is stored as zero and the method proceeds to test block 2928. But if the current value of m is greater than or equal to $m_{1p}$ (No), the method proceeds to test block 2925. Pursuant to block 2925, if the value of MOD [$(m-m_{1p})$, $\Lambda_p$] is less than $\Lambda_p/2$ (Yes), the method proceeds to block 2926, pursuant to which the bit value $h_{mp}$ is stored as a one. However, if the value of MOD [$(m-m_{1p})$, $\Lambda_p$] is not less than $\Lambda_p/2$ (No), then the method proceeds to block 2927, pursuant to which the bit value $h_{mp}$ is stored as a zero. With regard to modulo function MOD [$(m-m_{1p})$, $\Lambda_p$] in block 2925, reference is made to the graphical depiction in FIG. 29C and the mathematical definition in Equation (18).

Returning to FIG. 29B, the stored results of the two tests in blocks 2923 and 2925 and assigned to each $h_{mp}$ each may be a single binary bit (i.e., a number that is either one or zero). If p is less than $p_{MAX}$, (Yes), the method advances to block 2929, pursuant to which p is may be incremented (e.g., by one decimal digit). If p reaches (i.e., is equal to) $p_{MAX}$ to create a "No", however, the method advances from block 2928 to block 2930, pursuant to which a determination is made as to whether m is less than $m_{MAX}$. If "Yes", the method advances to block 2931, pursuant to which p is reset to 1 and stripel index m is incremented by one decimal digit and reset. If m is not less than $m_{MAX}$ (No), however, the method advances from block 2930 to block 2932 and ends.

FIG. 29C provides a graphical explanation of test block 2925 in flow chart FIG. 29B. As discussed above, test block 2925 represents a determination of whether [MOD [$(m-m_{1p})$, $\Lambda_p$] is less than one half of period $\Lambda_p$. If "Yes", the bit value $h_{mp}$ is recorded as one, and if "No" it is recorded as zero. In FIG. 29C the same result may be obtained by consideration of general HCBC characteristic square wave 2940, defined by waveform period $\Lambda_p$ and distance to first rising transition $m_{1p}$, where $m_{1p}=(O_p+\Lambda_p/4)$ and $O_p$ and $\Lambda_p/4$ are both integers dependent on pattern index p which ranges from 1 to $p_{MAX}$. Examples values of $\Lambda_P$, $O_p$ and $m_{1p}$ may be seen in FIGS. 26-27, associated with reference callout numbers 5906, 5905, and 5907 respectively, for $p_{MAX}=23$.

It can be seen in FIG. 29C that for the example selection of stripel m designated by vertical dashed line 2942 the distance 2944 is less than $\Lambda_p/2$, pursuant to which line 2942 intercepts characteristic square wave 2940 at $h_{mp}=1$.t $h_{m,p}=1$.). It may also be seen that if the distance 2944 were greater than $\Lambda_p/2$, dashed line 2942 would intercept waveform 2940 at $h_{mp}=0$. It may be seen that if any number of additional square wave periods $\Lambda_p$ were inserted between the first rising transition at $m=m_{1p}$ and line 2942 the waveform magnitude $h_{mp}$ at line 2942 would not change. It is also clear from the drawing that the distance 2944 is the difference between distance 2948, namely $(m-m_{1p})$, and distance 2946. Pursuant to distance 2946, it can be seen from the drawing that it must always equal an integral number of square wave periods $\Lambda_P$, such that it may be represented by the expression $\Lambda_P \times INT[(m-m_{1p})/\Lambda_P]$, where INT is the rounded down integral value of any number and therefore is equal to the integral number of characteristic square wave periods $\Lambda_P$ in any distance $(m-m_{1p})$. Summarizing the above observations concerning FIG. 29C, $$\text{Distance 2944} = \text{Distance 2948} - \text{Distance 2946} \quad (19)$$
$$= (m-m_{1p}) - \Lambda_p \times INT[(m-m_{1p})/\Lambda_p] \quad (20)$$

Also it should be noted that the general "MOD" function in Microsoft® Excel® is defined by $$\text{MOD(number,divisor)} = (\text{number}) - \text{divisor} \times INT(\text{number/divisor}) \quad (21)$$

Figure 30:
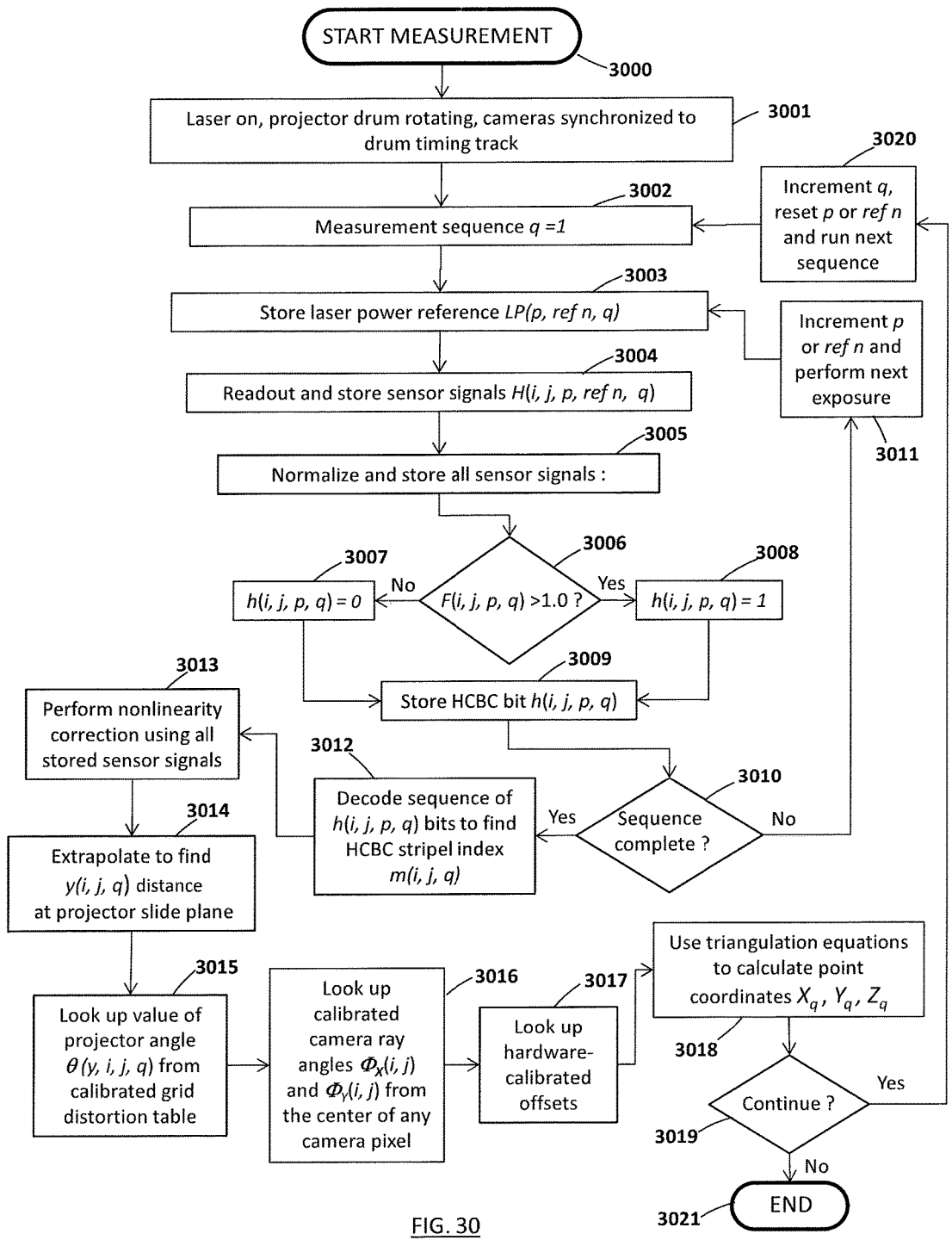
FIG. 30 is a flow chart of example operations of a 3D measurement method for a projector and a single optical sensor/camera, in one non-limiting example in accordance with embodiments of the present disclosure.

It can be seen that equations (20) and (21) are equivalent when (number)=$(m-m_{1p})$, and "divisor"=$\Lambda_P$, with the result that the distance 2944 in FIG. 29C is the same as would be calculated by the expression MOD [$(m-m_{1p})$, $\Lambda_p$] in test block 2925 of FIG. 29B. FIG. 30 is a flow chart of example operations of one example of a method of analyzing a surface with encoded light consistent with the present disclosure. As shown, method 3000 begins at block 3001, pursuant to which a repeating sequence of coded light patterns is directed onto the surface of an object by a rotating slide drum projector as illustrated in FIG. 45. FIG. 2, FIG. 4, FIG. 8, FIG. 9 and FIG. 10, and pursuant to which the exposure times of one or more arrays of camera light sensor pixels receiving light reflected from the surface are synchronized with pattern timing signals created by the rotation of the projector slide drum as illustrated in FIG. 5, FIG. 8, and FIG. 9. The method then proceeds to block 3002, pursuant to which a first camera exposure in a first pattern sequence q=1 occurs. The first camera exposure may correspond to any pattern in a full sequence, i.e., any time-ordering of pattern projection in a sequence may be used for both structured light patterns and non-structured light reference patterns. In equations the symbol p refers to a specific structured light pattern and ref n refers to a specific non-structured light reference pattern. Different values of n refer to different reference patterns, e.g., the 50% transmission reference being ref2 in example embodiments in the present disclosure. The method proceeds to block 3003, pursuant to which a laser source power reference LP(p, ref n, q) is measured during the exposure time for each of the projected patterns in each sequence. Each value of LP(p, ref n, q) is stored at the time of its measurement for future signal normalization. The method then proceeds to block 3004, pursuant to which a signal H(i, j, p, ref n, q) is created in each camera pixel (i, j) after exposure to pattern p or ref n in measurement sequence q, and then stored. The method then proceeds to block 3005, pursuant to which normalized pixel signals F(i, j, p, ref n, q) are created from the measured signals H(i, j, p, ref n, q), H(i, j, ref 2, q), LP(i, j, p, ref n, q), and LP(i, j, p, ref n, q) using Equation (22) below or equivalent and then stored.

$$F(i, j, p, refn, q) = \frac{H(i, j, p, refn, q)}{H(i, j, ref2, q)} \times \frac{LP(i, j, ref2, q)}{LP(i, j, p, refn, q)} \quad (22)$$

The method then proceeds to block 3006, pursuant to which each normalized signal F(i, j, p, q) corresponding to a HCBC structured light pattern is tested to determine if it is greater than 1.0. If so (Yes), the method proceeds to block 3008, pursuant to which the HCBC bit h(i, j, p, q) is assigned the binary value "1". If not (No), the method proceeds to block 3007, pursuant to which the HCBC bit h(i, j, p, q) is assigned the binary value "0". In either case the method then proceeds to block 3009, pursuant to which the result h(i, j, p, q) of test block 3006 is stored. The method then proceeds to block 3010, pursuant to which a determination is made as to whether or not an entire sequence of patterns has been projected. If not (No), the method proceeds to block 3011, pursuant to which the operational value of the index p or ref n is incremented byone, and the method loops back through to block 3003. That loop is repeated until the result of block 3010 is "Yes" in which case the method proceeds to block 3012, pursuant to which the set of binary numbers h(i, j, p, q) in sequence q=1 is decoded by the method in flow chart FIG. 32 to result in a decimal value of HCBC stripel index m for pixel (i, j) and sequence q.

The method then proceeds to block 3013, pursuant to which the stored values of all normalized sensor signals F(i, j, p, ref n, q) are used for sensor nonlinearity correction as depicted in FIGS. 48-49 and flow chart FIGS. 42-44. After completion of block 3013, the method proceeds to block 3014, pursuant to which sub-stripel extrapolation depicted in detailed diagrams FIGS. 35-41 may be performed to generate a more precise estimate of the stripel distance y on the projector slide surface corresponding to a back projected ray from the center of pixel (i, j) after reflection from a point on the object surface (SBM). Detailed methods of performing the extrapolation process can be found in the flow charts of FIGS. 42-44.

Returning to FIG. 30 the method proceeds from block 3014 to block 3015, pursuant to which the estimate of coordinate value y(i, j, q) determined in block 3013 is used to look up the stored value of corresponding projector angle θ (y, i, j, q), previously shown in FIG. 17, in a lookup table created by a method described in flow chart FIG. 31. The method then proceeds from block 3015 to block 3016, pursuant to which stored values of modeled and calibrated camera ray angles $\Phi_X(i, j)$ and $\Phi_Y(i, j)$ may be looked up for each specific value of i and j, again using the methods described in FIG. 31.

The method then proceeds from block 3017 to block 3018, pursuant to which triangulation equations (6), (7), and (8) or equivalent may be used to calculate point coordinates X(i, j, q), Y(i, j, q), and Z(i, j, q) for all pixels (i, j) in each camera for measurement sequence index q. Following the operations of block 3018, the method proceeds to test block 3019, pursuant to which it is determined whether or not to continue with an additional measurement sequence. If "Yes", the method proceeds to block 3020, pursuant to which the sequence index q is incremented and the pattern index (either HCBC index p or reference index ref n) is reset to its value at the start of the previous sequence. The method then repeats the operations of blocks 3002-3019. If or when the result in block 3019 becomes "No", the method may proceed to block 3021 and end.

FIG. 31 is a flow chart of system modeling and calibration operations in accordance with one example of a method of a analyzing a surface with encoded light consistent with the present disclosure. As shown, method 3100 begins at block 3101, pursuant to which computer modeling of the camera optics is performed by the use of optical design software. The method then proceeds to block 3102, pursuant to which a camera model is created that utilizes a back-projection method in which the object field for each lens is a rectangular grid of points representing FPA pixel centers, pursuant to which the images of the pixel center points are formed on a plane at global coordinate Z=Zref.

The method then proceeds to block 3103, pursuant to which optical analysis methods of the optical design software such are used to optimize a baseline design that is a compromise between small PSF, maximum depth of focus and maximum coverage on the SBM. The method then proceeds to block 3104, pursuant to which the optical design software runs grid distortion analyses for all or representative field point pixel locations and reports the X and Y intercept coordinates on the reference image plane for each. The method then proceeds to block 3105, pursuant to which the angles $\Phi_X$ and $\Phi_Y$ may be determined from the X and Y intercepts calculated in the grid distortion analyses of block 3104.

The method then proceeds to block 3106, pursuant to which computer modeling of the projector optics is performed, by the use of optical design software. The method then proceeds to block 3107, pursuant to which t a back-projection model is created, having field points on surface 4570 previously defined by X and Y intercept coordinates of back-projected camera rays in block 3104. The method then proceeds to block 3108, pursuant to which projector slide surface intercepts y(i, j) corresponding to the camera ray intercept points tabulated in block 3107 are tabulated and stored.

The method then proceeds to block 3109, pursuant to which the slide surface intercept coordinates calculated in block 3108 may be used with projector lens cardinal point coordinates calculated for the projector lens design in block 3107 to calculate the Y angle θ (i, j) for each camera pixel (e.g., one Y angle θ may be seen in FIG. 17). The method then proceeds to block 3110, pursuant to which each assembled system is calibrated to account for any deviation of actual hardware parameters from the model parameters. One method of accomplishing hardware calibration is by use of the optical sensor calibration method flow chart of FIG. 47, consistent with the example system design of the present disclosure.

Figure 32:
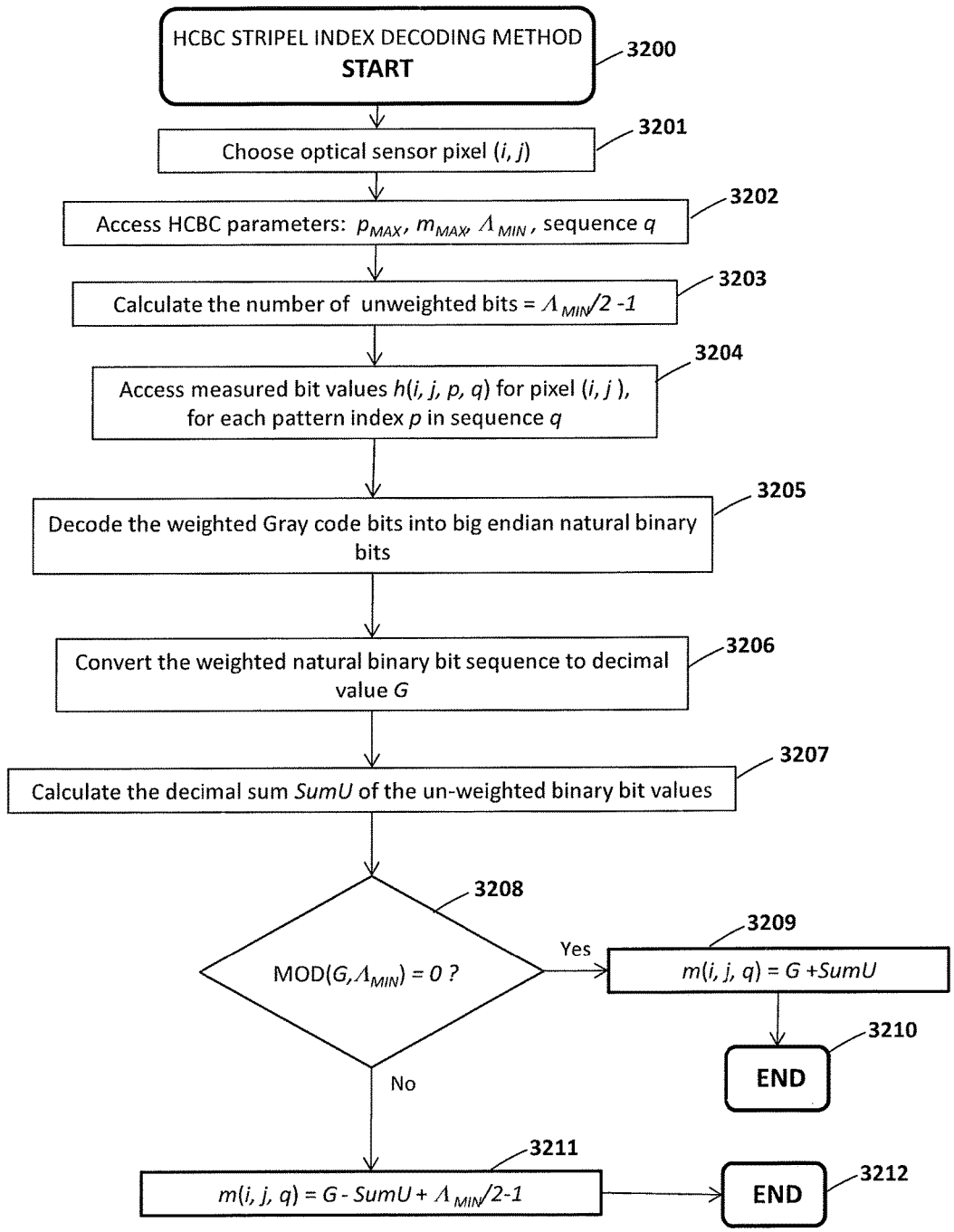
FIG. 32 is a flow chart of example operations of a method to decode a sequence of measured binary bits arranged in a HCBC code determined by the method of FIG. 29A and FIG. 29B, in accordance with embodiments of the present disclosure.

FIG. 32 is a flow chart of operations in accordance with one example of a method for decoding a sequence of HCBC binary bits, derived by the process described in connection with blocks 3006-3009 in the flow chart of FIG. 30, to determine a specific encoded light stripel index m associated with the specific camera pixel, in accordance with one example method of analyzing a surface with encoded light consistent with the present disclosure. As shown, method 3200 begins at block 3201, pursuant to which a single pixel with row and column indexes (i, j) is selected. The method proceeds to block 3202, pursuant to which the values of stored HCBC parameters $p_{MAX}$, $m_{MAX}$ and $\Lambda_{MIN}$ and identifying measurement sequence q are retrieved. The method then proceeds to block 3203, pursuant to which the number of un-weighted bits in the code $\Lambda_{MIN}/2-1$ is calculated, i.e., for the example system design of the present disclosure the result is 15 un-weighted code bits.

The method then proceeds to block 3204, pursuant to which the measured sequence of binary bit values h(i, j, p, q) for camera pixel (i, j), sequence identification index q and pattern index values p from 1 to $p_{MAX}$ are retrieved. The method then proceeds to block 3205, pursuant to which the weighted (Gray code) bits are ordered in big endian sequence from $p=p_{MAX}$ to $p=\Lambda_{MIN}/2$ and decoded into natural binary form. Any Gray to natural binary conversion method may be used. The method then proceeds to block 3206, pursuant to which the natural binary number with individual weighted bit values $b_{pq}$ formed in block 3205 is converted to a decimal number G by means of the weighted sum in Equation (23).

$$G = \Sigma_{p=\Lambda_{MIN}/2}^{PMAX} [b_{pq}(\Lambda_{MIN}/2)][2^{(p-\Lambda_{MIN}/2)}] \qquad (23),$$

The method then proceeds to block 3207, pursuant to which the decimal sum "SumU" of the unweighted code bits (e.g., as seen in column 5925 of FIGS. 26 and 27) and defined in blocks 3203 and 3204 is determined by Equation (22)

$$SumU = \Sigma_{p=1}^{\Lambda_{MIN}/2-1} h(i,j,p,q) \qquad (24)$$

The method then proceeds to test block 3208, pursuant to which the decoded decimal value G determined in block 3206 is divided by minimum period $\Lambda_{MIN}$ and the quotient is used to determine which of two methods should be used to calculate the stripel index m(i, j, q). The test in block 3208 may use a computer calculation of the MOD function as described in FIG. 29C or other equivalent calculations.

If the result of the test in block 3208 is "Yes", the method proceeds to block 3209, pursuant to which the method determines the value of decoded stripel index m(i, j, q) by the operation G+SumU and then proceeds to block 3210 and ends. If not, the method proceeds to block 3211, pursuant to which the value of the decoded stripel m(i, j, q) by the operation G−SumU+$\Lambda_{MIN}$/2−1 is determined, where $\Lambda_{MIN}$/2−1 is the number of un-weighted bits calculated in block 3203. The method may then proceed to block 3212 and end. Discussion of the Use of a Lookup Table to Determine which Projected Slide Pattern is Responsible for a Given Decoded Stripel Boundary As previously seen in FIG. 22 and FIG. 23, the physical regions of most interest for decoding HCBC sequences are at the rising or falling irradiance edges of the projected patterns, where normalized signal magnitude-based extrapolation techniques can be used to improve measurement accuracy. It should be noted that all square waves in FIG. 22 and FIG. 23 have been artificially shifted such that there is a rising signal for all at the single stripel boundary at Y=0, in order to more easily compare resultant signal amplitudes for a variety of waveform periods. However it should be kept in mind that such artificial shifting is only used in the present disclosure for comparison of signal responses and does not represent the desired waveform shifted offset values Op in HCBC system encoding and operations.

In the example system design of this disclosure, each of the two boundaries of any given stripel is produced by only one transmission transition in only one of the HCBC bar patterns projected in a given entire projection sequence (e.g., 23 patterns). It may be useful to be able to quickly determine which pattern is responsible for one or the other edge of a decoded stripel and also to determine whether the transition represents rising or falling signal for increasing stripel index m. For this purpose it is convenient to define a slope coefficient $K_{m,p}$ where $K_{m,p}$=−1 represents a falling slope, $K_{m,p}$=1 represents a rising slope, and $K_{m,p}$=0 represents no change.

The HCBC encoding method shown in the flow charts of FIG. 29A and FIG. 29B provides all of the information needed to determine which pattern is responsible for a given stripel transition and whether the slope coefficient $K_{m,p}$ is zero, 1 or −1. Specifically, the code itself defines the information needed, i.e., the numbering order of stripels is from lowest to highest m index and the slope at the higher index side of stripel m is the same as the slope at lower side of stripel m+1. Furthermore the slope sign for any stripel transition and the first pattern p that is responsible for it can be determined from the basic equations which define each HCBC characteristic waveform, therefore also defining the optical transmission (either high or low) of the pattern at the projector coding surface 999 for coordinate y. As a result these values may be calculated on a computer and tabulated, e.g., by a method later shown in flow chart FIG. 34.

Figure 33:
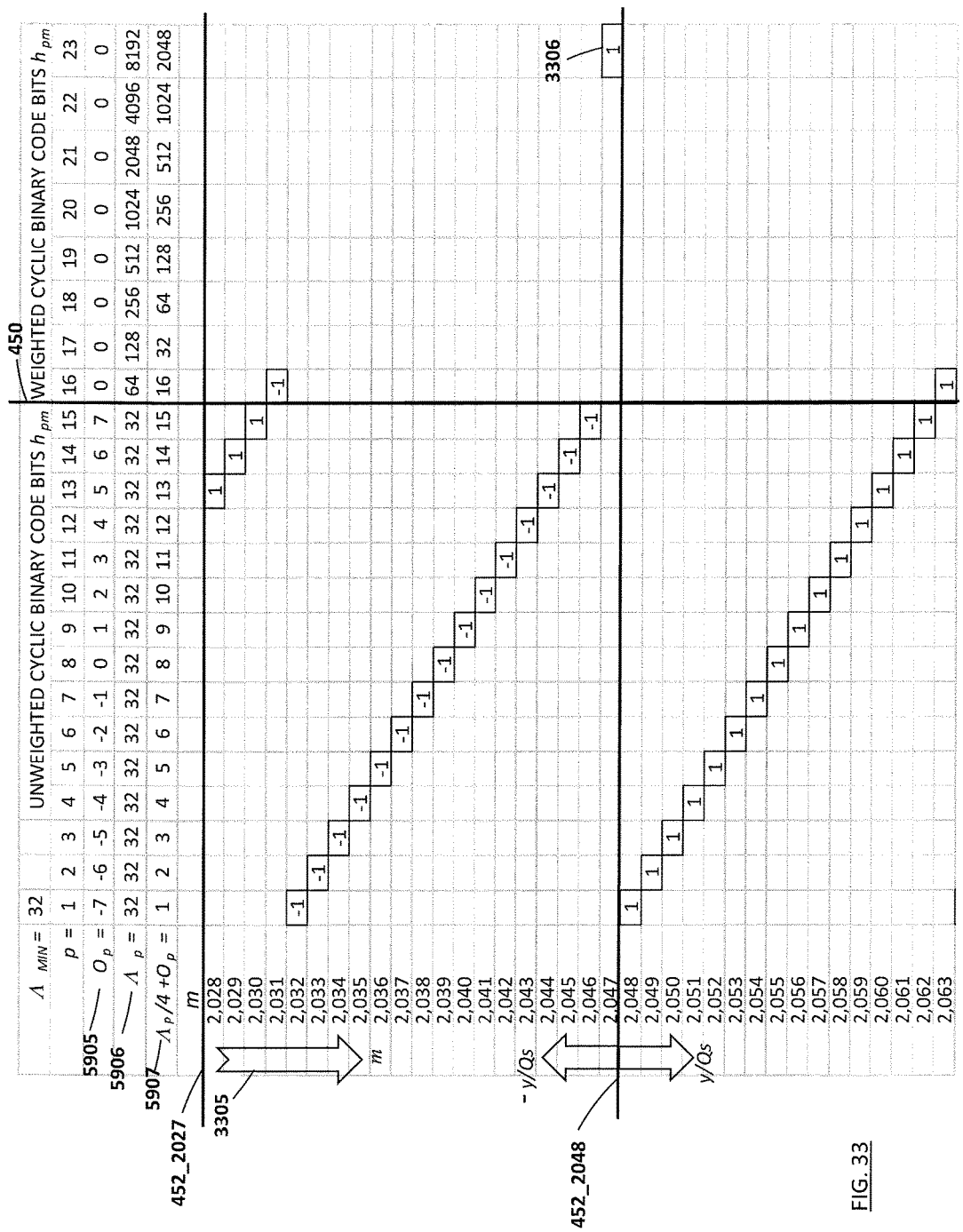
FIG. 33 is a view of a Microsoft® Excel® computer-calculated spreadsheet showing the locations of HCBC bit value transitions for pattern index p and stripel index m, with index p varying from 1 to 23 and index m varying from 2,028 to 2,063, in one non-limiting example consistent with various embodiments of the present disclosure.

FIG. 33 is a graphical representation of results of a computer calculation using the process of flow chart 34, showing the location and sign of non-zero values (1 or −1) of slope coefficient $K_{m,p}$ versus pattern index p and decoded stripel index m. Vertical line 450 is the same dividing line between unweighted and weighted binary code bits as seen in other drawings. This data was calculated in a MICROSOFT® EXCEL® worksheet table in which the cells were conditionally formatted to show no numbers for $K_{m,p}$=0 but showing values of 1 or 1 where there are falling or rising transitions. It can be seen that for the table row containing any stripel value m in column 3305 there is only one value of p (seen in row 3304) that corresponds to a non-zero value of $K_{m,p}$. One example is spreadsheet cell 3306 in the row corresponding to stripel index 2047 and containing the value $K_{m,p}$=1, which in the context of patterns on projector coding surface 999 implies a transition from zero optical transmission to fully transparent somewhere in pattern p=23. As defined, the slope coefficient of any stripel m applies to the transition at the numerically higher side of the transition, i.e., the transition from stripel m to stripel m+1. In the case of stripel m=2047, the transition to stripel 2048 is defined by line 453, which in turn defines the origin of the y coordinate on projector coding surface 999. In addition, the transition occurs only in pattern p=$p_{MAX}$=23, which is the MSB "knife edge" slide with only one transition. A referral back to line 453 as shown in FIG. 25 provides confirmation that pattern 23 does indeed transition from black to white at the boundary indicated in FIG. 33.

Figure 34:
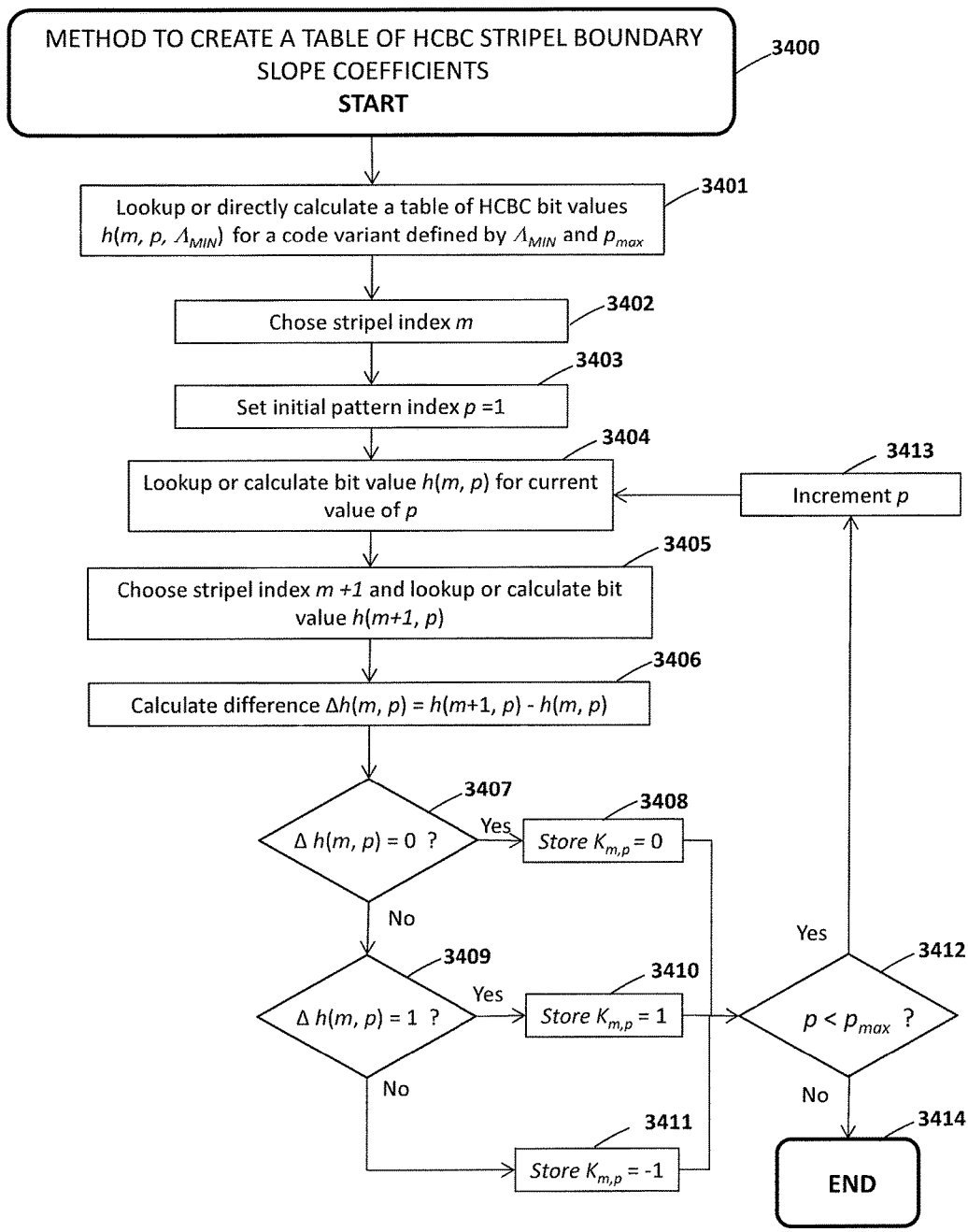
FIG. 34 is a flow chart of example operations of a method of creating a table of HCBC bit value transition locations as represented in FIG. 33, in accordance with embodiments of the present disclosure.

FIG. 34 is a flow chart of example operations in accordance with one example of a method of determining which projector slide pattern contains the transmission transition responsible for a given decoded stripel boundary, consistent with the Hybrid Cyclic Binary Code of the present disclosure. As shown, method 3400 begins with block 3401, pursuant to which the bit values h(m, p, $\Lambda_{min}$) of the chosen HCBC variant are available either by lookup or by separate calculations using the method of the flow charts in FIG. 29A and FIG. 29B. The method then proceeds to block 3402, pursuant to which single stripel m is chosen. The method then proceeds to block 3403, pursuant to which the pattern index p to be used in the first iteration of the method is set at the integer 1. The method then proceeds to block 3404, pursuant to which the binary bit value h(m, p) is either looked up or calculated. The method then proceeds to block 3405, pursuant to which stripel m+1 is defined by adding the decimal number 1 to the pre-determined decimal value of m and the bit value h(m+1, p) is either looked up or calculated. The method then proceeds to block 3406, pursuant to which the difference $\Delta$h(m, p)=h(m+1, p)−h(m, p) is calculated.

The method then proceeds to test block 3407, pursuant to which it is determined whether $\Delta$h(m, p)=0. If YES, the method proceeds to block 3408, pursuant to which the slope coefficient $K_{m,p}$ pertaining to the current value of m and the current value of p may be assigned the value 0 and stored. The method then proceeds to test block 3412, pursuant to which the index p is tested to determine if it is less than the number $p_{MAX}$. For the initial value p=1 the answer to the question in block 3412 is "Yes" and the method proceeds to block 3413 pursuant to which the pattern index in block 3403 is incremented by one and the methods of blocks 3404-3407 are repeated.

If the initial result of test block 3407 is "No", the method proceeds to block 3409, pursuant to which it is determined whether $\Delta$h(m, p)=1?. If YES, the method proceeds to block 3410, pursuant to which the slope coefficient $K_{m,p}$ pertaining to the current value of m and the current value of p may be assigned the value 1 and stored. The method then proceeds again to test block 3412 to determine if the current value of p is less than the number $p_{MAX}$. Again if, the answer is "Yes", the method proceeds to block 3413 and increments the value of p in block 3403 by one and the methods of blocks 3404-3409 are repeated. If the answer to the test question in block 3409 is "No", the method proceeds to block 3411, pursuant to which the slope coefficient $K_{m,p}$ pertaining to the current value of m and the current value of p may be assigned the value −1 and stored. It should be noted that the methods of blocks 3408, 3410 and 3411 are mutually exclusive, i.e. only one value of $K_{m,p}$ may be stored for any given value of index p. Finally when the last increment operation in block 3413 has resulted in a current value $p=p_{MAX}$ and the method has again proceeded to block 3412, the answer to the question in block 3412 will be "No" and the method may proceed to block 3414 and end.

Details of Sub-Stripel Extrapolation Methods

In the discussions to follow it is presumed that all measured structured light sensor signal values have been corrected for nonlinear errors using a method or methods discussed previously in the present disclosure.

Figure 35:
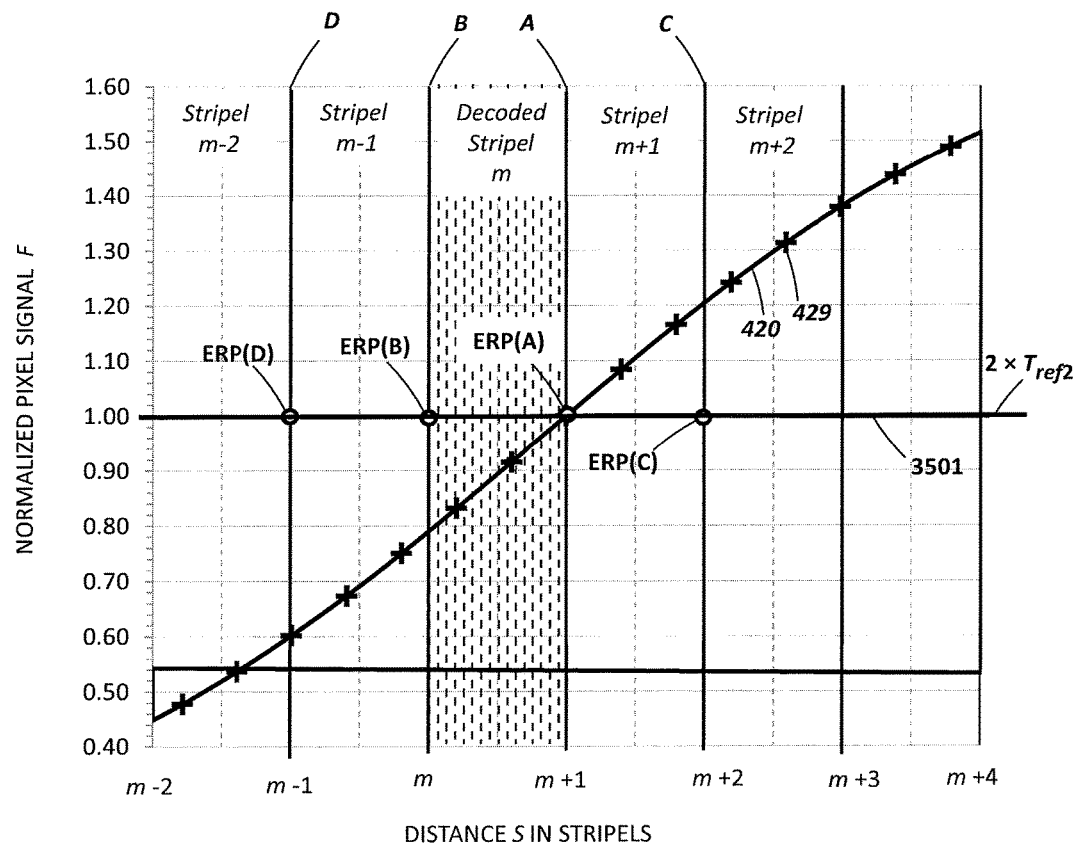
FIG. 35 is an enlarged view of a center part of curve 420 in FIG. 23, showing normalized pixel signal versus distance for a rising slope, in accordance with embodiments of the present disclosure.

The discussion begins with consideration of the measured, normalized and nonlinearity corrected sensor signals associated with projection of HCBC structured light, in particular the relation of measured and normalized signal magnitude with respect to the lateral y coordinate on the projector coding surface 999 on code drum 4507. Since the slopes of the signal versus lateral y position curves depend upon the width and shape of the spatial convolution of composite PSF curves with characteristic square waves, the discussion begins with a review of the example modeled curves in FIG. 22 and FIG. 23, specifically focusing on curve 420 which is consistent with the example system design in the present disclosure. In FIG. 35, the central part of curve 420 is shown as an extension to the left and downward of the magnified view of curve 420 in FIG. 23. Four extrapolation reference points ERP(A), ERP(B), ERP(C) and ERP(D) are identified at the intersection of stripel boundaries A, B, C and D with horizontal line 3501 representing a normalized signal value F of 1.0. The horizontal scale in FIG. 35 emphasizes the region around extrapolation reference point ERP(A) at the right hand ("upper") transition A from stripel m to stripel m+1. Stripel distance S=m+1 in FIG. 35 corresponds to S=0 in FIG. 23. Computer-calculated data points 429 shown as crosses are added to FIG. 35 to provide for fitting of a canonical straight line model in the three-stripel region between boundaries D and C.

Although model curve 420 is associated with a rising slope, i.e., slope coefficient $K_{m,p}=1$, falling slopes with coefficient $K_{m,p}=-1$ are in general as probable as rising slopes. Because the underlying square wave model and the composite LSF blur such as LSF 410 in FIG. 21 that are convolved with the square waves are both highly symmetrical, a falling slope may be modeled with a canonical curve that is simply curve 420 or its straight-line approximation flipped vertically.

Figure 36:
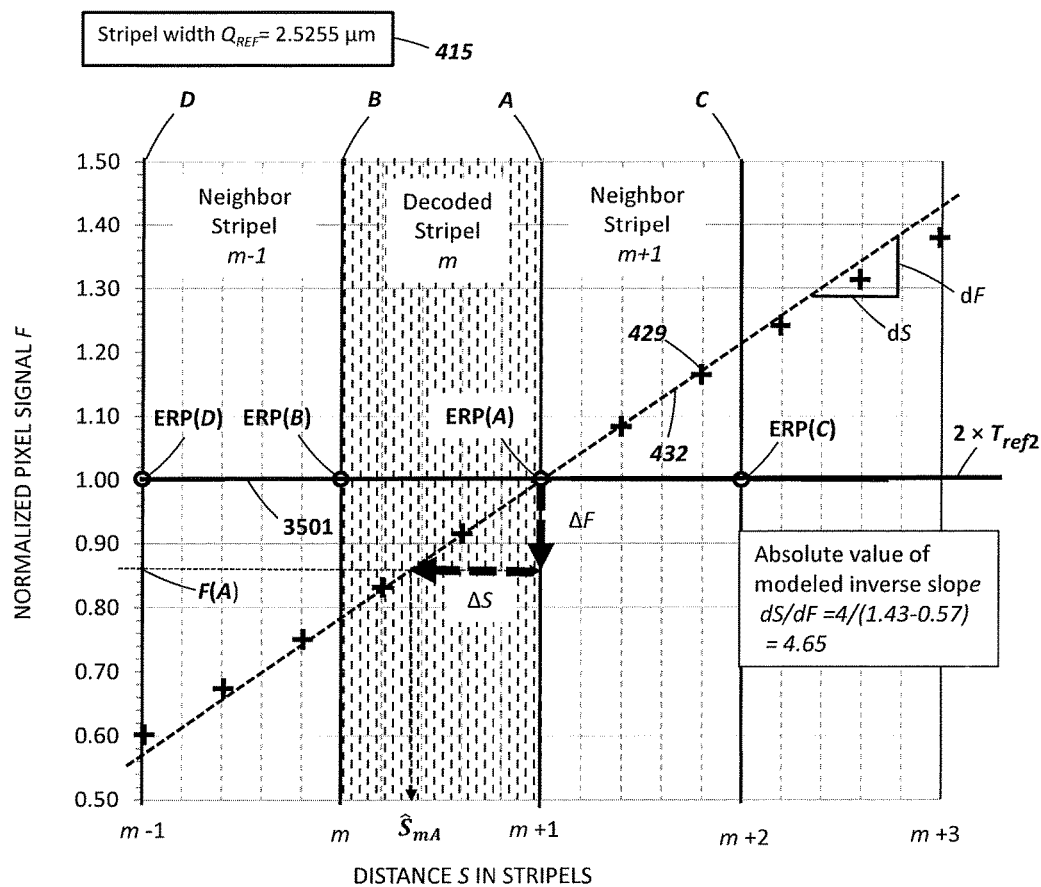
FIG. 36 is a graphical diagram that shows a straight line model of the central part of the curve shown in FIG. 35 with single point extrapolation from the higher edge of a stripel to its interior for a rising slope, in accordance with embodiments of the present disclosure.

FIG. 36 is a graphical illustration of single point extrapolation into stripel m. It shows dashed straight line model 432 fit to the same data points 429 as in FIG. 35 and has a horizontal scale with vertical gridlines at intervals of 0.2 stripels, consistent with the maximum allowable horizontal Y measurement error that would allow a 1 μm Z measurement error for a stripel width of 2.5255 μm, shown in box 415. Horizontal line F(A) is drawn to the right from an example normalized pixel signal value F=0.86 that may be measured for the projected pattern responsible for boundary A. It may be recalled that the responsible pattern index for the numerically upper boundary of any stripel m may be found from a lookup table or chart such as illustrated in FIG. 33 after using the method described in the flow chart of FIG. 34. Line F(A) intercepts line 432 at a horizontal stripel distance of $\hat{S}_{mA}$, which is the extrapolated estimate of the stripel distance S on the projector's slide plane for that single measurement. Given to modeled canonical inverse slope dS/dF=4.65 of line 432, the obvious geometric relation dS/dF=ΔS/ΔF, and the known S coordinate of (m+1) at point ERP(A), a simple formula for $\hat{S}_{mA}$ is $$\hat{S}_{mA}=(m+1)-ABS(1-F(A))\times ABS(dS/dF) \quad (25)$$

Since the measured value of F(A) is 0.86, ABS(1−0.86)=0.14 and therefore Equation (25) becomes $\hat{S}_{mA}=(m+1)-0.14\times 4.65=m+0.349$.

Figure 37:
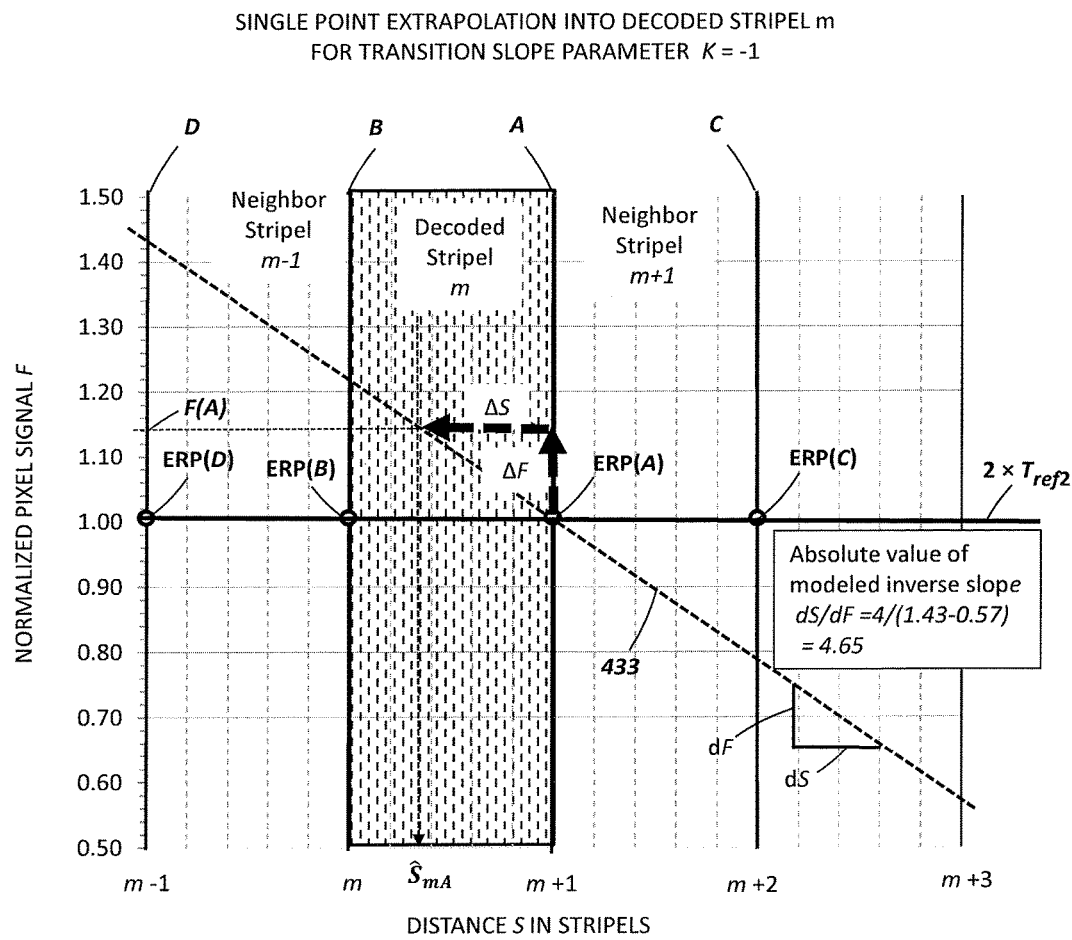
FIG. 37 is a graphical diagram that shows a single point extrapolation from the higher edge of a stripel and a falling slope, in accordance with embodiments of the present disclosure.

FIG. 37 illustrates another single point extrapolation using the same single reference point ERP(A) as in FIG. 36, but with a negative sloped line model curve 433 with the same absolute value of slope dS/dFi=4.65. The Figure shows a measured signal F(A) that is 14% above the reference line of F=1.00 instead of 14% below as for FIG. 36, such that Equation (25) again results in the same estimated stripel distance: $\hat{S}_{mA}=(m+1)-0.14\times 4.65=m+0.349$.

Figure 38:
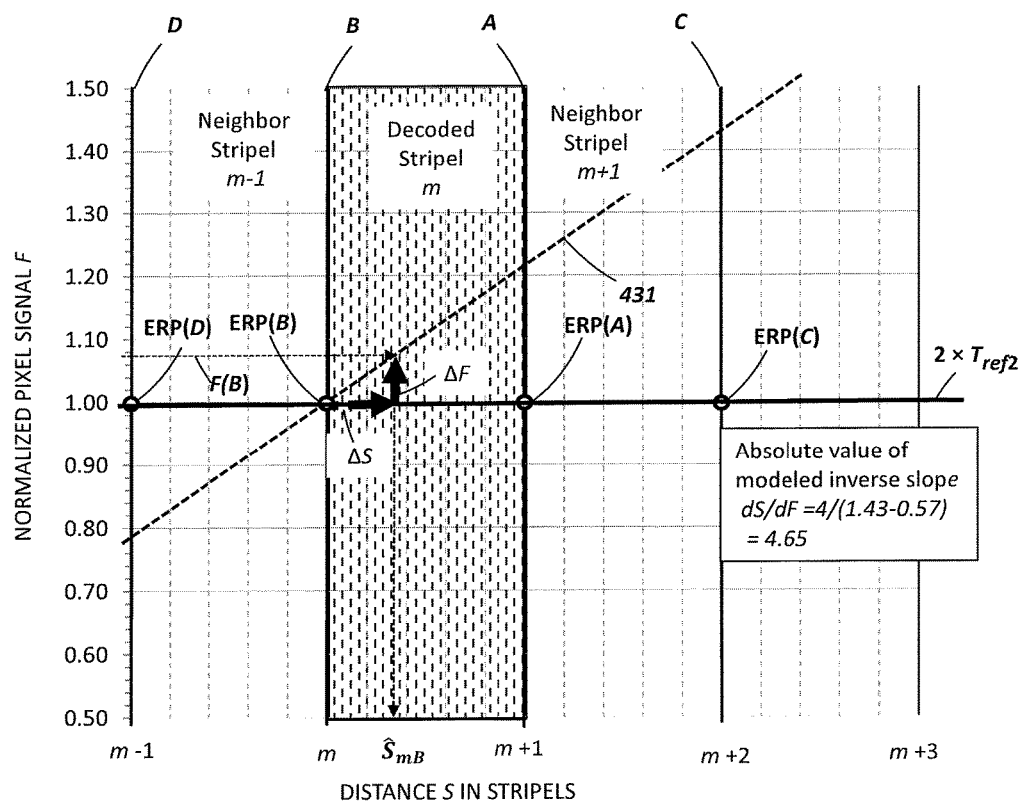
FIG. 38 is a graphical diagram that shows a single point extrapolation from the lower edge of a stripel and a rising slope, in accordance with embodiments of the present disclosure.

FIG. 38 illustrates another single point extrapolation, in this case starting at the numerically lower side B of decoded stripel m. For the same stripel distance $\hat{S}_{mB}=\hat{S}_{mA}$, there will be a different measured signal F(B) corresponding to a different projected slide with pattern index number $p_B$ and a different ERP(B). Note that ERP(B) has a horizontal coordinate S exactly 1 stripel less than that of ERP(A). Since the absolute value of the canonical slope is a constant until adjusted, the only change in Equation (25) would be a subtraction of one stripel and a change of sign in the second term. This results in $$\hat{S}_{mB}=m+ABS(1-F(B))\times ABS(dS/dF) \quad (26)$$

When F(B)>1 as in FIG. 38, and $\hat{S}_{mB}=\hat{S}_{mA}$ for testing purposes, Equation (26) becomes $$\hat{S}_{mA}=m+(F(B)-1)\times 4.65$$

Solving the above equation for F(B), $$F(B)=(\hat{S}_{mA}-m)/4.65+1=0.369/4.65+1=1.079$$

Inspection of the value of F(B) in FIG. 38 shows a value very close to 1.079, providing reasonable confidence in the method.

Figure 39:
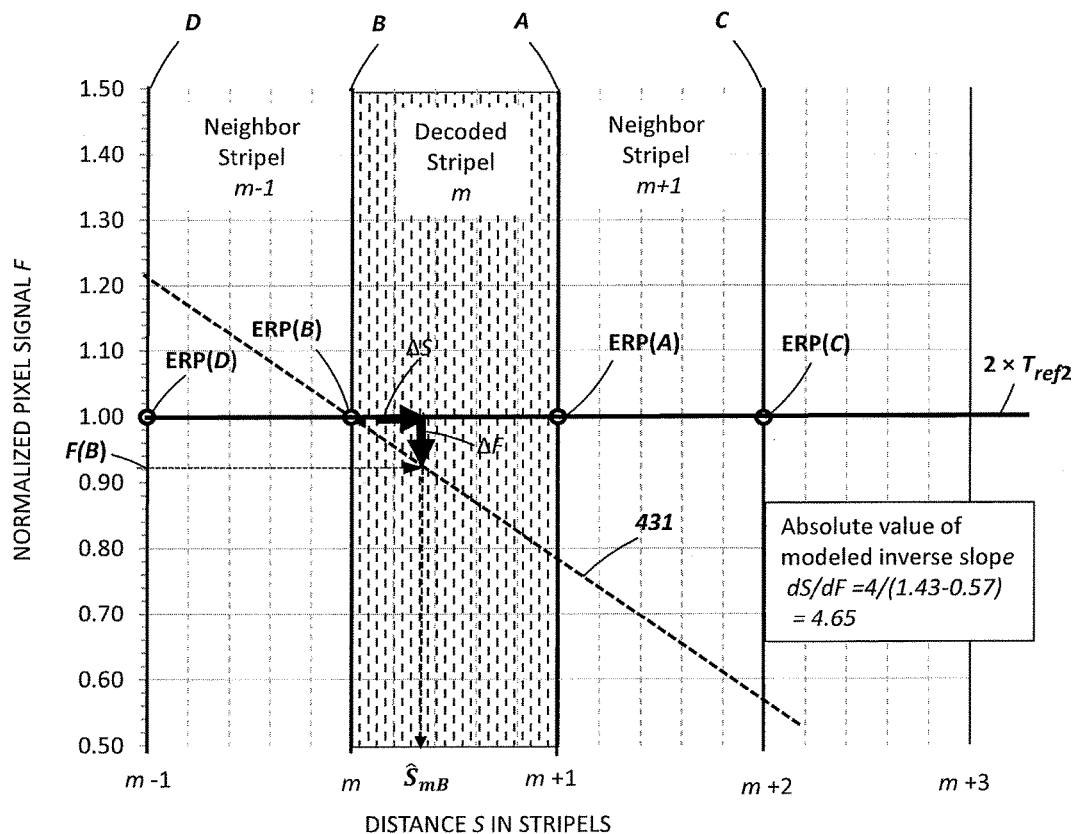
FIG. 39 is a graphical diagram that shows a single point extrapolation from the lower edge of a stripel and a falling slope, in accordance with embodiments of the present disclosure.

FIG. 39 is an example of using the same ERP(B) as in FIG. 38 but with a reversed slope. If the absolute value of the drawn slope of line 431 were the exact same as for FIG. 38 and the drawn distance to $\hat{S}_{mB}$ were exactly the same as in FIG. 38, the value of F(B) would be close to 1−0.079=0.921, close to the graphically determined value in the drawing and again providing confidence in the method.

The foregoing examples consider only measured signals from the two projected patterns responsible for upper and lower boundaries A and B of the decoded stripel. The corresponding two estimates $\hat{S}_{mA}$ and $\hat{S}_{mB}$ may be averaged to decrease measurement error, pursuant to which the error caused by random pixel current noise may be reduced to roughly 71% of the error for a single measurement. In addition, because the canonical response curves as seen in FIG. 36 and other drawings extend at least to adjacent boundaries C and D there is an opportunity to average-in at least two more measurements. Although the additional "outer" signals may in some cases need to be weighted less than the two "inner" signals the four-point process is expected to result in further improvement in accuracy.

Figure 40:
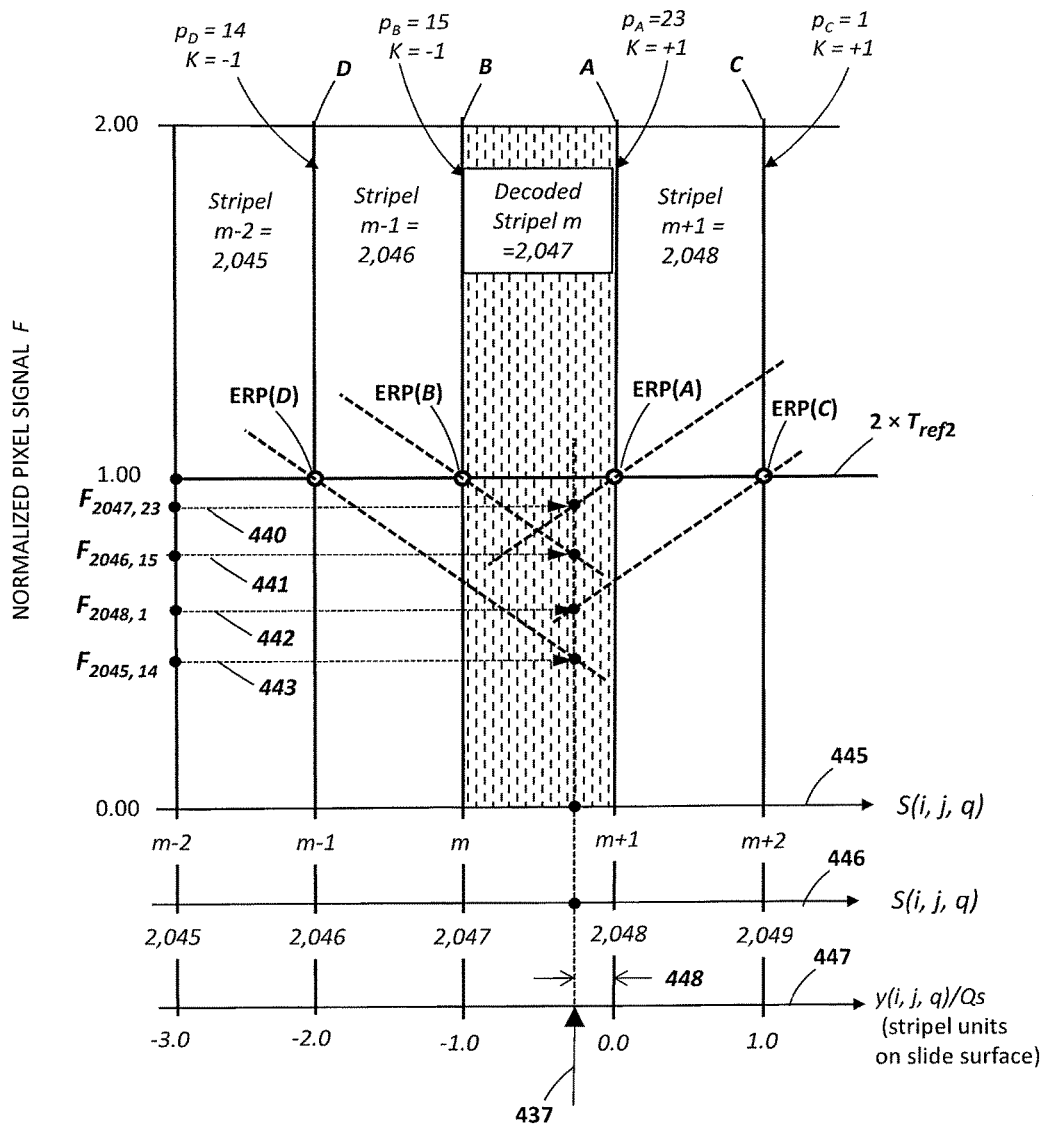
FIG. 40 is a graphical diagram showing an example four-point extrapolation into decoded stripel 2,047, in accordance with embodiments of the present disclosure.

FIG. 40 is an extrapolation example for the case of averaging measurements from four different ERP's corresponding to four different slide pattern signals from the same sequence, for a special case example in which the decoded stripel index number is 2,047. In this case the extrapolation will result in a stripel distance S that is between 2,046 and 2,047. Boundary A between stripels 2047 and 2048 represents slide stripel distances S=2,048 and y/Qs=0. It may be recalled that these coordinates represent the y center of projector coding surface 999 and the y=0 coordinate of the optical axis of projector imaging lens group 4508 in FIG. 10. The spreadsheet table in FIG. 33 and/or the method of FIG. 34 may be used to confirm that the pattern index responsible for transition A is the knife-edge pattern index p=23 with positive slope $K_{m,p}$=+1. In like manner the index responsible for transition C may be confirmed to be p=1 with positive slope $K_{m,p}$=+1, the index responsible for transition B may be confirmed to be p=15 with negative slope $K_{m,p}$=−1, and the index responsible for transition D may be confirmed to be p=14 with negative slope $K_{m,p}$=−1, all of which are indicated by notations associated with the four stripel boundaries in FIG. 40.

Vertical line 437 and its intersections with scales 445, 446, and 447 represents an example back-projected optical ray originating at a camera pixel center, reflecting from a point on the SBM and intersecting projector coding surface 999 at a point with a slightly negative y/Qs coordinate 448 inside decoded stripel 2,047. Line 437 then intersects with each of four canonical model lines representing the four closest extrapolation reference points to decoded stripel 2,047 and creates four horizontal lines 440, 441, 442, and 443 representing four stored normalized signal values F(m, p)=F(2,047, 23), F(2,046, 15), F(2,048, 1), and F(2,045, 14).

Figure 41:
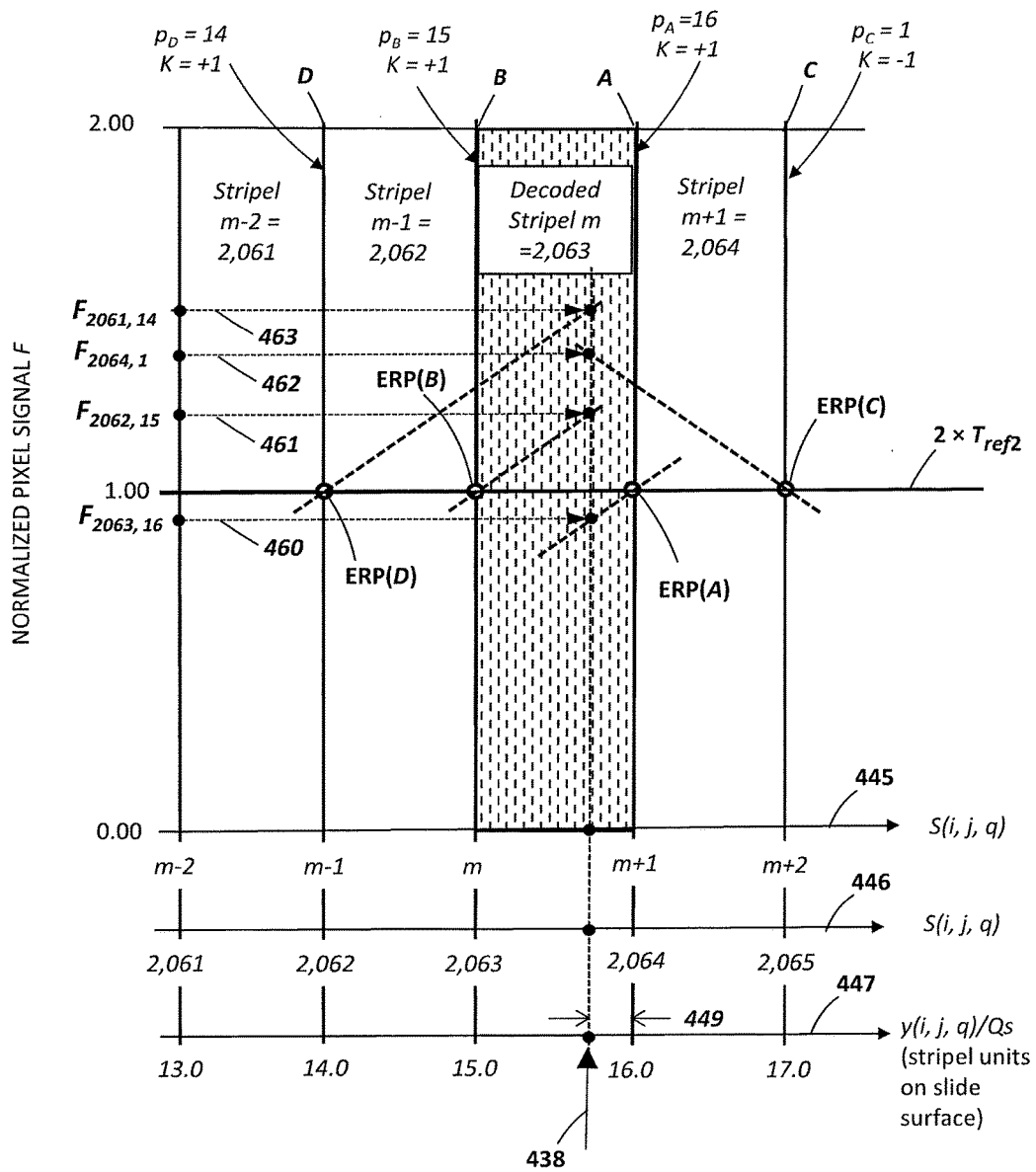
FIG. 41 is a graphical diagram showing an example four-point extrapolation into decoded stripel 2,063, in accordance with embodiments of the present disclosure.

FIG. 41 is a second four point extrapolation example in which the decoded stripel index is 2,063, selected to show a different arrangement of slope coefficients for the four nearest stripel boundaries. In this case, the extrapolation will result in a stripel distance S that is between 2,063 and 2,064. Boundary A between stripels 2,063 and 2,048 represents slide stripel distances S=2,064 and y/Qs=16.0. The spreadsheet image in FIG. 33 and/or the method of FIG. 34 may be used to confirm that the pattern index responsible for transition A is p=16 with positive slope $K_{m,p}$=+1. In like manner the index responsible for transition C may be confirmed to be p=1 with negative slope $K_{m,p}$=−1, the index responsible for transition B may be confirmed to be p=15 with positive slope $K_{m,p}$=+1, and the index responsible for transition D may be confirmed to be p=14 with positive slope $K_{m,p}$=+1, all of which are indicated by notations associated with the four stripel boundaries in FIG. 41.

Vertical line 438 and its intersections with scales 445, 446, and 447 represents an example back-projected optical ray originating at a camera pixel center, reflecting from a point on the SBM and intersecting projector coding surface 999 (scale 447) at a point with a y/Qs coordinate 448 between 15 and 16, inside decoded stripel 2,063. Line 438 then intersects with each of four canonical model lines representing the four closest interpolation/extrapolation reference points to decoded stripel 2,063 and creates four horizontal lines 460, 461, 462, and 463 representing four stored normalized signal values F(m, p)=F(2,063, 16), F(2, 062, 15), F(2,064, 1), and F(2,061, 14).

FIG. 42 is a flow chart of four-point sub-stripel extrapolation operations in accordance with block 3014 in 3D measurement flow chart FIG. 30, consistent with FIGS. 35-41 above and others of the present disclosure. As shown, method 4200 begins at block 4200. The method then proceeds to block 4201, pursuant to which an inner two point extrapolation estimate using stored normalized values of pixel signals measured during a complete HCBC projection sequence and inner extrapolation reference (IRC) points A and B may be performed according to the detailed methods described in flow chart 4300, and graphical diagrams FIGS. 35-39. The method then proceeds to block 4202, pursuant to which the average $\widehat{SmAB}$ (i, j, q) estimate calculated for inner two points IRC(A) and IRC(B) is stored. The method then proceeds to block 4203, pursuant to which a weighting factor between 0 and 1.0 is applied to the inner two point average stripel distance calculated in block 4202. The method then proceeds to block 4204, pursuant to which an outer two point extrapolation estimate using stored normalized values of pixel signals measured during a complete HCBC projection sequence and using outer extrapolation reference points IRC(C) and IRC (D) may be performed, according to the detailed methods described in flow chart FIG. 44 and graphical diagrams FIG. 40 and FIG. 41. The method then proceeds to block 4205, pursuant to which the average stripel distance $\widehat{SmCD}$ (i, j, q) estimate calculated for IRC(C) and IRC(D) is stored. The method then proceeds to block 4206, pursuant to which a weighting factor between 0 and 1.0 is applied to the outer two point average calculated in block 4205 and the result is stored. The method then proceeds to block 4207, pursuant to which the weighted inner average and the weighted outer average are averaged together and the result $\hat{S}$(i, j, q) is stored. The method then proceeds to block 4208, pursuant to which a best estimate of the projector slide surface coordinate $\hat{y}$(i, j, q)=$Q_s$·$\hat{S}$(i, j, q) is stored. The method then proceeds to block 4209, pursuant to which the method described in block 3015 of FIG. 30 is used to look up the value of projector angle θ ($\hat{y}$, i, j, q) from a reference calibrated grid distortion table computed by an optical ray trace computer program. Following the operations of block 4209, the method may proceed to block 4210 and end.

FIG. 43 is a flow chart of detailed operations pursuant to a method of performing an inner two point extrapolation as performed pursuant to block 4201 of FIG. 42. As shown, method 4300 begins at block 4300. The method then proceeds to block 4301, pursuant to which the decoded stripel index number m(i, j, q) associated with camera pixel (i, j) and measurement sequence q is made available by prior decoding operations according to the method of flow chart FIG. 32. The method then proceeds to block 4302, pursuant to which the pattern indexes $p_A$ and $p_B$ associated with boundaries A and B of stripel m are looked up. The two indexes $p_A$ and $p_B$ may be looked up from values previously determined by the method of FIG. 32. Examples are shown in FIG. 40 and FIG. 41 for stripel boundaries A and B. The method then proceeds to block 4303, pursuant to which the two normalized signals from pixel (i, j) corresponding to the two boundaries of stripel m, namely F(i, j, m, $p_A$, q) and F(i, j, m−1, $p_B$, q) are looked up. The method then proceeds to block 4304, pursuant to which the calibrated absolute value of the straight line model slope dS/dF is looked up. An example calculation of the model slope consistent with best focus optical modeling is shown in FIG. 36. The method then proceeds to block 4305, pursuant to which the estimated stripel distance $\hat{S}_{mA}$ consistent with normalized signal F(i, j, m, $p_A$, q) is calculated by Equation (25), where F(A)=F(i, j, m, $p_A$, q). The method then proceeds to block 4306, pursuant to which an average estimated stripel distance $\hat{S}_{mB}$ consistent with normalized signal F(i, j, m, $p_B$, q) is calculated by Equation (26) above, where F(B)=F(i, j, m, $p_B$, q). The method then proceeds to block 4307, pursuant to which the two estimated stripel distances corresponding to the two inner reference points A and B are averaged. The method then proceeds to block 4308 and ends.

FIG. 44 is a flow chart of detailed operations pursuant to a method of performing an outer two point extrapolation as performed pursuant to block 4204 of FIG. 42. As shown, method 4400 begins at block 4400. The method then proceeds to block 4401, pursuant to which the decoded stripel index number m(i, j, q) associated with camera pixel (i, j) and measurement sequence q is made available by prior decoding operations according to the method of flow chart FIG. 32.

The method then proceeds to block 4402, pursuant to which the pattern indexes $p_C$ and $p_D$ associated with boundaries C and D of stripels m+1 and m−2 respectively are looked up Examples are shown in FIG. 40 and FIG. 41 for stripel boundaries C and D. The method then proceeds to block 4403, pursuant to which the two normalized signals from pixel (i, j) corresponding to boundaries C and D of stripels m+1 and m−2 respectively are looked up, namely F(i, j, m+1, $p_C$, q) and F(i, j, m−2, $p_D$, q).

The method then proceeds to block 4404, pursuant to which the calibrated absolute value of the straight line model slope dS/dF is looked up. An example calculation of the model slope consistent with best focus optical modeling is shown in FIG. 36. The method then proceeds to block 4405, pursuant to which the estimated stripel distance $\hat{S}_{mC}$ consistent with normalized signal F(i, j, m+1, $p_C$, q) is calculated by Equation (27) below, where F(C)=F(i, j, m+1, $p_C$, q). The method then proceeds to block 4406, pursuant to which he estimated stripel distance $\hat{S}_{mD}$ consistent with normalized signal F(i, j, m−2, $p_D$, q) is calculated by Equation (28) below, where F(D)=F(i, j, m−2, $P_D$, q).

$$\hat{S}_{mC}=m+2-ABS(1-F(C))\times ABS(dS/dF) \quad (27)$$

$$\hat{S}_{mD}=m-1+ABS(1-F(D))\times ABS(dS/dF) \quad (28)$$

The method then proceeds to block 4407, pursuant to which the two estimated stripel distances are averaged. The method then proceeds to block 4408 and ends.

Direct Photolithographic Writing of HCBC Patterns on a Code Drum/Shell Substrate All HCBC patterns and timing track patterns on surfaces 999 and 998 on drum substrate 4507 may be created by photolithography in which the desired patterns are written directly on the final surface. Writing of both types of patterns may be accomplished by step scanning and temporally modulating an ultraviolet laser beam sharply focused on a thin and uniform layer of solidified photoresist carried on the inner surface of each cylindrical shell.

One method of manufacturing the HCBC and other patterns on the slide drum is to first coat the precision machined inner surface of the silica drum with a thin layer of evaporated metal such as chromium after a precision slot for the lens has been machined in the outer surface and any absorbing lenses are bonded in place. The drum may need to be rotated at a low speed during deposition of the metal film to assure thickness uniformity. The metal-coated drum would then be spun up to a speed of roughly 300 RPM for deposition of liquid photoresist into the region between side dams 120 and 121 shown in FIG. 3.

A preferred thickness of solidified photoresist is between 200 nm and 1 μm in order to later achieve 200 nm or less error or variation in the final HCBC pattern boundaries in the y dimension. In order to achieve this resist thickness it may be desirable to use a very low viscosity resist or add solvent to a commercially available resist, and to very precisely control the mass of liquid that is applied to the inner surface of the spinning cylinder. In addition, the effect of surface tension at side dams 120 and 121 should be considered.

The dams may have heights above the silica inner circumference that are several times more than the desired resist thickness, for example 100 μm or higher in order to contain any unstable liquid resist before it settles to a uniform layer. The cylinder/drum rotation speed is sufficient to provide a centripetal acceleration much greater than that of gravity. During normal measurement operation the rotation speed of the cylindrical shell drum 4507 and bonded silica flange 115 is limited to approximately 5 RPS by the current 120 Hz maximum measurement camera frame rate, but during the photoresist application procedure the camera is not used and the rotation rate may easily be increased to 50 RPS (300 RPM and 314 radians/s). At that rotation rate with an inner drum radius of 76 mm the centripetal acceleration is 765 times the acceleration of gravity, sufficient to provide fluid leveling over most of the area between the side dams. The liquid resist may be applied gradually to the inner surface of shell 4507 during acceleration up to the desired final rotation speed.

When shell/drum 4507 has spun for a time long enough to create a uniform thickness layer, for example less than one minute, heat may be applied to evaporate the solvent, leaving a nearly solid film of photoresist of thickness less than that of the pre-evaporation liquid layer. The photoresist may then be baked to further harden it, after which it is written upon by a sharply focused ultraviolet (example wavelength of 365 nm) laser beam. An estimate of the volume of liquid resist that would be needed to create, for example, a 2 μm thick liquid layer prior to evaporation may be calculated from the product of inner surface circumference (2*pi*76 mm) with the inner surface width (for example 15 mm) and the example 0.002 mm liquid layer thickness. This product indicates a liquid volume of 14.4 cubic mm or 14.4 μL.

It can be seen that having the code patterns on the inner surface of shell/drum 3 allows use of centrifugal force to create a thin and uniform layer of photoresist. Other means of creating a uniform photoresist layer for photolithography could be used if the patterns were to be carried on the outer surface of shell/drum 3, such as spray deposition using a wide thin nozzle during slow rotation.

During HCBC pattern writing the laser assembly is stepped axially along the rotating cylindrical shell's inner surface and on/off modulated. Rotation speed may be the same or lower than used in the liquid application. The desired patterns appear after the non-written photoresist is flushed away.

There may be a single step of the laser after each full rotation of the shell 4507, preferably occurring during the time for writing the resist for both the 100% and the 50% reference patterns. It may prove advantageous during the metal deposition process to mask off the regions of the drum surface without metal deposition, e.g., the 100% and the 50% reference pattern regions. Since these regions will not be metal coated in the first place, the laser may be turned off while in them. Each laser step size should be a small fraction of the single stripel width, e.g., 2.525 μm in the example system design of the present disclosure. The temporal modulation for the remainder of the patterns may be a simple binary on/off modulation of the laser beam according to the HCBC code for each stripel m.

In one reported process of pattern writing on photoresist inside a rotating drum (J. E. Petrzelka and D. E. Hardt, *Proc. of SPIE Vol.* 8612 861205-1, *Massachusetts Institute of Technology, Cambridge, Mass., United States*, "Laser direct write system for fabricating seamless roll-to-roll lithography tools", March, 2013), a circularly symmetrical focused laser spot was used. This symmetry enables writing patterns in any direction, but is not needed for writing the essentially one-dimensional HCBC patterns of the present disclosure as can be seen in FIGS. 5-7. Advantage may then be taken of the essentially one-dimensional emission geometry inherent in diode lasers, for example having actual source dimensions less than 0.1 µm wide and 10 µm long, in order to achieve acceptable power density and accuracy on the surface with a smaller and lower power laser.

There are prior art microlithography lens designs for very high precision integrated circuit manufacturing, for example U.S. Pat. No. 6,700,645 B1. In general, these lenses are designed to operate with shorter wavelength and more expensive UV sources, have many more lens elements, may be both image-wise and object-wise telecentric in order to minimize defocus caused by reticle or wafer warping, achieve NA greater than 1.0 using water immersion at the wafer, and produce line images with width well under 100 nm. For the purpose of a non-contact CMM this degree of performance may not be required. It may thus be reasonable to expect that a future less expensive lens could be designed for use with a single-emitter diode laser and yet improve 3-D measurement accuracy beyond that of the example design of the present disclosure.

EXAMPLES

The following examples pertain to additional non-limiting embodiments of the present disclosure.

Example 1

According to one example there is provided a non-contact coordinate measurement machine, including: an optical assembly, the optical assembly including a structured light projector, at least one optical sensor, and a controller; wherein: the structured light projector includes: a light source; and a code drum including a plurality of hybrid cyclic binary code (HCBC) patterns, the plurality of HCBC patterns including a plurality of weighted numbering system multiple period patterns and a plurality of unweighted numbering system common period patterns; and an optical imaging projector lens; the controller is to cause the light source to project incident light onto the code drum as the code drum rotates about an axis; the code drum and the optical imaging projector lens are configured to produce structured light from the incident light thereon, the structured light to be incident on a surface of an object being measured; and the at least one optical sensor is to measure reflected structured light from the surface of the object being measured and to produce a plurality of measurement signals, the plurality of measurement signals being related to positional coordinates of at least one point on the surface of an object being measured.

Example 2

This example includes any or all of the features of example 1, wherein: the code drum includes a first uniform optical transmission reference feature and a second uniform optical transmission reference feature; the first uniform optical transmission reference feature is configured to transmit a first amount of the incident light; and the second uniform optical transmission reference feature is configured to transmit a second amount of the incident light, wherein the second amount is about 50% of the first amount.

Example 3

This example includes any or all of the features of example 1, wherein: the code drum includes a shell, the shell having an inner surface and an outer surface; and the plurality of HCBC patterns are disposed on or within at least one of the inner surface and the outer surface.

Example 4

This example includes any or all of the features of example 1, wherein the code drum is cylindrical.

Example 5

This example includes any or all of the features of example 2, wherein: the code drum includes a shell, the shell including an inner surface, an outer surface, and at least one optical transmission reference retention feature; and the first and second uniform optical transmission reference features are disposed within the at least one reference retention feature.

Example 6

This example includes any or all of the features of example 5, wherein: the shell has a shell thickness; and the at least one reference retention feature extends fully or partially through the shell thickness.

Example 7

This example includes any or all of the features of example 5, wherein the first uniform optical transmission reference feature is formed at least in part of a first material and the second uniform optical transmission reference feature is formed at least in part of a second material, the second material being different from the first material.

Example 8

This example includes any or all of the features of example 7, wherein: the shell includes a shell substrate material; and the first material is the shell substrate material.

Example 9

This example includes any or all of the features of example 1, wherein the plurality of HCBC patterns are configured to generate a sequence of binary bar patterns on the surface of the object being measured.

Example 10

This example includes any or all of the features of example 9, wherein an optical transmission of each of the sequence of binary bar patterns is associated with a characteristic binary square wave optical transmission waveform specified by a waveform period and a waveform offset from a common position reference.

Example 11

This example includes any or all of the features of example 10, wherein each of the plurality of binary bar patterns has a square wave optical transmission waveform that is offset in position with respect to the common position reference.

Example 12

This example includes any or all of the features of example 1, and further includes: a first positioning mechanism; and a second positioning mechanism; wherein: the first positioning mechanism is configured to control a position of the optical assembly; the second positioning mechanism is configured to control a position of the object being measured; and the controller is configured to control the first positioning mechanism and the second positioning mechanism so as to adjust a relative position of the surface of the object being measured with respect to the optical assembly.

Example 13

This example includes any or all of the features of example 12, wherein the controller is further configured to adjust the relative position of the surface of the object being measured and the optical assembly so as to adjust the focus of the structured light projector and the at least one optical sensor together on the surface of the object being measured.

Example 14

This example includes any or all of the features of example 1, wherein the light source is an incoherent light source.

Example 15

This example includes any or all of the features of example 2, and further includes a light source sensor, wherein the light source sensor configured to detect an intensity of a light output from the light source, and to output a light source sensor signal sequence to the controller, wherein the controller is configured to utilize the light source sensor signal sequence to normalize the plurality of measurement signals.

Example 16

According to this example there is provided a method for measuring positional coordinates of a surface of an object being measured with a non-contact coordinate measurement machine, including: causing a light source of a structured light projector to project incident light onto a code drum as the code drum rotates about an axis, so as, in concert with an imaging projector lens, to produce structured light and non-structured light in a region downfield of the code drum, such that the structured light and non-structured light is incident on a surface of the object being measured; measuring, with at least one optical sensor, reflected structured light and non-structured light from the surface of the object being measured; producing a measurement signal sequence based at least in part on the measured reflected structured light; transmitting the measurement signal sequence to a controller of the structured light projector and the at least one optical sensor, the controller including a processor and a memory; and processing the measurement signal sequence to determine positional coordinates on the surface of the object being measured; wherein the code drum includes a plurality of hybrid cyclic binary code (HCBC) patterns, the plurality of HCBC patterns including a plurality of weighted numbering system multiple period patterns and a plurality of unweighted numbering system common period patterns.

Example 17

This example includes any or all of the features of example 16, wherein: the code drum further includes a first optical transmission reference feature and a second optical transmission reference feature; the first reference feature is configured to transmit a first amount of the incident light; and the second optical transmission reference feature is configured to transmit a second amount of the incident light, wherein the second amount of incident light is about 50% of the first amount of incident light.

Example 18

This example includes any or all of the features of example 16, wherein: the code drum includes a shell, the shell having an inner surface and an outer surface; the plurality of HCBC patterns are disposed on or within at least one of the inner surface and the outer surface; and causing the light source to project incident light onto the code drum includes causing the light source to project light such that at least a portion of the incident light is incident on the inner surface.

Example 19

This example includes any or all of the features of example 17, wherein the structured light is configured to generate a sequence of binary bar patterns on the surface of the object being measured.

Example 20

This example includes any or all of the features of example 19, wherein: each of the unweighted common period patterns is configured to produce a respective one of the plurality of binary bar patterns in the sequence of binary bar patterns, relative to a common position reference; and each of the plurality of binary bar patterns is waveform offset relative to one another and the common position reference.

Example 21

This example includes any or all of the features of example 20, wherein each of the plurality of binary bar patterns has a square wave waveform that is offset with respect to the common position reference.

Example 22

This example includes any or all of the features of example 16, and further includes issuing, with the controller, a position control signal to at least one of a first positioning mechanism and a second positioning mechanism of the non-contact coordinate measurement machine, the first positioning mechanism configured to control a position of an optical assembly including the at least one optical sensor and the structured and non-structured light projector, the second positioning mechanism configured to control a position of the surface of the object being measured; wherein the position control signal is configured to cause at least one of the first positioning mechanism and the second positioning mechanism to adjust a relative position of the surface of the object being measured with respect to the optical assembly.

Example 23

This example includes any or all of the features of example 22, wherein the position control signal is further configured to adjust the relative position of the surface of the object being measured and the at least one optical sensor to one another so as to adjust a focus of the at least one optical sensor on the surface of the object being measured.

Example 24

This example includes any or all of the features of example 16, wherein the light source is an incoherent light source.

Example 25

This example includes any or all of the features of example 16, and further includes: detecting an intensity of a light output from the light source; generating a light source sensor signal sequence to the controller; and normalizing, with the controller, said plurality of measurement signals based at least in part on the light source sensor signal sequence.

Example 26

According to this example there is provided a code drum for encoding light, including: a plurality of hybrid cyclic binary code (HCBC) patterns, the HCBC patterns including a plurality of weighted numbering system multiple period patterns and a plurality of unweighted numbering system common period patterns; wherein the code drum is configured, in concert with an optical imaging projection lens, to convert incoherent light incident thereon to structured light as the code drum rotates about an axis; and each of the plurality of HCBC patterns are configured such that the structured light includes a sequence of binary bar patterns.

Example 27

This example includes any or all of the features of example 26, and further includes a first optical transmission reference feature and second optical transmission reference feature, wherein: the first optical transmission reference feature is configured to transmit a first amount of the incident light; the second optical transmission reference feature is configured to transmit a second amount of the incident light; and the second amount of light is about 50% of the first amount.

Example 28

This example includes any or all of the features of example 26, and further includes a shell, the shell having an inner surface and an outer surface, wherein the plurality of HCBC patterns are disposed on or within at least one of the inner surface and the outer surface.

Example 29

This example includes any or all of the features of example 26, wherein the code drum is cylindrical.

Example 30

This example includes any or all of the features of example 27, wherein: the code drum includes a shell and one or more reference retention features; and at least the first and the second optical transmission reference features are disposed within said one or more reference retention features.

Example 31

This example includes any or all of the features of example 30, wherein: the shell has a shell thickness; and the reference retention feature extends fully or partially through the shell thickness.

Example 32

This example includes any or all of the features of example 30, wherein the first reference feature is formed at least in part of a first material and the second reference feature is formed at least in part of a second material, the second material being different from the first material.

Example 33

This example includes any or all of the features of example 32, wherein: the shell includes a shell substrate material; and the first material is the shell substrate material.

Example 34

This example includes any or all of the features of example 26, wherein each of the unweighted numbering system common period patterns is configured to produce a respective one of the plurality of binary bar patterns in the sequence of binary bar patterns, relative to a common position reference; and each of the plurality of binary bar patterns is waveform offset relative to one another and the common position reference.

Example 35

This example includes any or all of the features of example 34, wherein each of the plurality of binary bar patterns has a square wave waveform that has a waveform offset relative to one another and a waveform offset distance with respect to the common position reference.

Example 36

According to this example there is provided a method for encoding light, including: causing light to be transmitted onto a surface of a code drum as the code drum rotates about an axis, such that light transmitted through the code drum is incident on an optical imaging projection lens, resulting in the production of structured light in a region downfield of the code drum and the optical imaging projection lens; wherein the code drum includes a plurality of hybrid cyclic binary code (HCBC) patterns, the plurality of HCBC patterns including a plurality of weighted numbering system multiple period patterns and a plurality of unweighted numbering system common period patterns, and each of the plurality of HCBC patterns are configured such that the structured light includes a sequence of binary bar patterns.

Example 37

This example includes any or all of the features of example 36, wherein: the code drum further includes a first optical transmission reference feature and second optical transmission reference feature; the first optical transmission reference feature is configured to transmit a first amount of the incident light; the second optical transmission reference feature is configured to transmit a second amount of the incident light; and the second amount of light is about 50% of the first amount.

Example 38

This example includes any or all of the features of example 36, wherein the code drum includes a shell, the shell having an inner surface, an outer surface, and at least one optical transmission reference retention feature.

Example 39

This example includes any or all of the features of example 36, wherein the code drum is cylindrical.

Example 40

This example includes any or all of the features of example 38, wherein and at least the first and the second reference features are disposed within the at least one reference retention feature.

Example 41

This example includes any or all of the features of example 40, wherein: the shell has a shell thickness; and the at least one reference retention feature extends fully or partially through the shell thickness.

Example 42

This example includes any or all of the features of example 37, wherein the first optical transmission reference feature is formed at least in part of a first material and the second optical transmission reference feature is formed at least in part of a second material, the second material being different from the first material.

Example 43

This example includes any or all of the features of example 32, wherein: the shell includes a shell substrate material; and the first material is the shell substrate material.

Example 44

This example includes any or all of the features of example 36, wherein: each of the unweighted common period patterns is configured to produce a respective one of the plurality of binary bar patterns in the sequence of binary bar patterns, relative to a common position reference; and each of the plurality of binary bar patterns is waveform position offset relative to one another and the common position reference.

Example 45

This example includes any or all of the features of example 44, wherein each of the plurality of unweighted binary bar patterns has a square wave waveform that has a position offset magnitude relative to the common position reference.

Example 46

According to this example there is provided a non-contact coordinate measurement machine, including: an optical assembly, the optical assembly including a structured light and non-structured light projector, at least one optical sensor; and a controller; wherein: the structured light and non-structured light projector includes: a light source; an optical imaging projector lens; and a code drum including a plurality of structured light hybrid cyclic binary code (HCBC) patterns and a plurality of non-structured light uniform optical transmission reference patterns, the plurality of structured light HCBC patterns including a plurality of weighted numbering system multiple period patterns, a plurality of unweighted numbering system common period patterns, and a plurality of non-structured light optical transmission reference features, each exhibiting a uniform unique value of light transmissivity; the controller is to cause the light source to project incident light onto the code drum as the code drum rotates about an axis; the code drum is configured, in concert with the lens, to produce structured light and non-structured reference light from the incident light thereon, the structured light and the non-structured reference light to be projected in a sequence and incident on a surface of an object being measured; and the at least one optical sensor is to measure reflected structured light and unstructured reference light from the surface of the object being measured and to produce a plurality of measurement signals, the plurality of measurement signals being related to positional coordinates of at least one point on the surface of the object being measured.

Example 47

This example includes any or all of the features of example 46, wherein: the code drum includes at least a first optical transmission reference feature, a second optical transmission reference feature, a third optical transmission reference feature, and a fourth optical transmission reference feature; the first optical transmission reference feature is configured to transmit a first amount of the incident light; the second optical transmission reference feature is configured to transmit a second amount of the incident light, the third optical transmission reference feature is configured to transmit a third amount of the incident light, and the fourth optical transmission reference feature is configured to transmit a fourth amount of the incident light; wherein the first amount is between about 95% and about 100% of the maximum amount of light transmitted by the HCBC patterns and a common substrate, the second amount is about 50% of the maximum amount transmitted by the HCBC patterns and the common substrate, the third amount is between about 50% and about 95% of the maximum amount transmitted by the HCBC patterns and the common substrate, and the fourth amount is between about 20% and about 50% of the maximum amount transmitted by the HCBC patterns and the common substrate.

Example 48

This example includes any or all of the features of example 46, wherein: the code drum includes a shell, the shell having an inner surface and an outer surface; and the plurality of HCBC patterns and optical transmission reference patterns are disposed on or within at least one of the inner surface and the outer surface.

Example 49

This example includes any or all of the features of example 46, wherein the code drum is cylindrical.

Example 50

This example includes any or all of the features of example 47, wherein: the code drum includes a shell, the shell including an inner surface, an outer surface, and a one or more optical transmission reference retention features; and at least the first optical transmission reference feature, the second optical transmission reference feature and the third optical transmission reference feature are disposed within the one or more optical transmission reference retention features.

Example 51

This example includes any or all of the features of example 50, wherein: the shell has a shell thickness; and each of the one or more optical transmission reference retention features extend fully or partially through the shell thickness.

Example 52

This example includes any or all of the features of example 50, wherein some of the optical transmission reference features are formed at least in part of a first material substrate common to the plurality of HCBC patterns and some of the reference features are formed at least in part of a combination of a common first material and at least one second material, the at least one second material being different from the first material.

Example 53

This example includes any or all of the features of example 52, wherein: the shell includes a shell substrate material; and the first material is the shell substrate material.

Example 54

This example includes any or all of the features of example 46, wherein the plurality of HCBC patterns are configured such that the structured light includes a sequence of binary bar patterns.

Example 55

This example includes any or all of the features of example 54, wherein the optical transmission of each of the sequence of binary bar patterns is associated with a characteristic binary square wave optical transmission waveform specified by a waveform period and a waveform offset from a common position reference.

Example 56

This example includes any or all of the features of example 54, wherein each of the plurality of binary bar patterns has a periodic optical transmission waveform that is a binary square wave of equal width high transmission and low transmission regions, each of the regions corresponding to one half of a repetition period.

Example 57

This example includes any or all of the features of example 46, further including a light source sensor, the light source sensor configured to detect temporal variations of an intensity of a light output from the light source, and to output a light source sensor signal sequence related to angular rotation positions of the code drum to the controller, wherein the controller is configured to utilize the light source sensor signal sequence to normalize the plurality of measurement signals.

Example 58

According to this example there is provided a method for measuring positional coordinates of a surface of an object being measured with a non-contact coordinate measurement machine, including: causing a light source of a structured light projector to project incident light onto a code drum as the code drum rotates about an axis, so as to produce, in concert with an optical imaging projection lens, structured light and non-structured light in a region downfield of the code drum, such that the structured light and non-structured light are incident on a surface of the object being measured; measuring, with at least one optical sensor, reflected structured light and non-structured light from the surface of the object being measured; producing a measurement signal sequence based at least in part on the measured reflected structured light; transmitting the measurement signal sequence to a controller of the structured light projector and the at least one optical sensor, the controller including a processor and a memory; and processing the recorded plurality of measurement signals to determine positional coordinates on the surface of an object being measured; wherein the code drum includes a plurality of hybrid cyclic binary code (HCBC) patterns, the plurality of HCBC patterns including a plurality of weighted numbering system multiple period patterns and a plurality of unweighted numbering system common period patterns.

Example 59

This example includes any or all of the features of example 58, wherein: the code drum further includes a first optical transmission reference feature, a second optical transmission reference feature and a third optical transmission reference feature; the first optical transmission reference feature is configured to transmit a first amount of the incident light; the second optical transmission reference feature is configured to transmit a second amount of the incident light; and the third optical transmission reference feature is configured to transmit a third amount of the incident light; wherein the second amount of transmitted light is about 50% of the first amount of incident light and the third amount of transmitted light is about 70% of the first amount of incident light.

Example 60

This example includes any or all of the features of example 58 wherein: the code drum includes a shell, the shell having an inner surface and an outer surface; the plurality of HCBC patterns are disposed on or within at least one of the inner surface and the outer surface; and causing the light source to project incident light onto the code drum includes causing the light source to project light such that at least a portion of the incident light is incident on the inner surface.

Example 61

This example includes any or all of the features of example 60, wherein the structured light is configured to generate a sequence of binary bar patterns on the surface of the object being measured.

Example 62

This example includes any or all of the features of example 61, wherein: each of the unweighted numbering system common period patterns is configured to produce a respective one of the plurality of binary bar patterns in the sequence of binary bar patterns, relative to a common position reference; and each of the plurality of binary bar patterns is waveform offset relative to one another and the common position reference.

Example 63

This example includes any or all of the features of example 58, and further includes: issuing, with the controller, a position control signal to at least one of a first positioning mechanism and a second positioning mechanism of the non-contact coordinate measurement machine, the first positioning mechanism configured to control a position of an optical assembly including the at least one optical sensor and the structured light and non-structured light projector, the second positioning mechanism configured to control a position of the surface of the object being measured; wherein the position control signal is configured to cause at least one of the first positioning mechanism and the second positioning mechanism to adjust a relative position of the surface of the object being measured to the at least one optical sensor and the structured light and non-structured light projector.

Example 64

This example includes any or all of the features of example 58, and further includes: detecting an intensity of a light output from the light source; generating a light source sensor signal sequence; and normalizing, with the controller, the plurality of measurement signals based at least in part on the light source sensor signal sequence.

Example 65

According to this example there is provided a code drum for encoding light, including: a plurality of hybrid cyclic binary code (HCBC) patterns, the HCBC patterns including a plurality of weighted numbering system multiple period patterns and a plurality of unweighted numbering system common period patterns; wherein the code drum is configured, in concert with an optical imaging projection lens, to convert incoherent light incident thereon to structured light as the code drum rotates about an axis; and each of the plurality of HCBC patterns are configured such that the structured light is configured to produce a sequence of binary bar patterns on a surface of an object being measured.

Example 66

This example includes any or all of the features of example 65, wherein the code drum further includes a first optical transmission reference feature and second optical transmission reference feature, wherein: the first optical transmission reference feature is configured to transmit a first amount of said incident light; the second optical transmission reference feature is configured to transmit a second amount of said incident light; and said second amount of light is about 50% of said first amount.

Example 67

This example includes any or all of the features of example 65, further including a first optical transmission reference feature and second optical transmission reference feature, wherein: the first optical transmission reference feature is configured to transmit a first amount of the incident light; the second optical transmission reference feature is configured to transmit a second amount of the incident light; and the first amount of light is about 200% of the second amount.

Example 68

This example includes any or all of the features of example 66, and further includes a shell, the shell having an inner surface and an outer surface, wherein the plurality of HCBC patterns are disposed on or within at least one of the inner surface and the outer surface.

Example 69

This example includes any or all of the features of example 66, wherein the code drum is cylindrical.

Example 70

This example includes any or all of the features of example 66, wherein: the code drum includes a shell, the shell including an inner surface, an outer surface, and one or more reference retention features; and the first and second optical transmission reference features are disposed within the one or more reference retention features.

Example 71

This example includes any or all of the features of example 70, wherein: the shell has a shell thickness; and the one or more reference retention features extend fully or partially through the shell thickness.

Example 72

This example includes any or all of the features of example 67, wherein the first optical transmission reference feature is formed at least in part of a first material and the second optical transmission reference feature is formed at least in part of a second material, the second material being different from the first material.

Example 73

This example includes any or all of the features of example 72 wherein: the shell includes a shell substrate material; and the first material is the shell substrate material.

Example 74

This example includes any or all of the features of example 65, wherein, each of the unweighted common period patterns is configured to produce a respective one of the plurality of binary bar patterns in the sequence of binary bar patterns, relative to a common position reference; and each of the plurality of binary bar patterns is waveform offset relative to one another and the common position reference.

Example 75

According to this example there is provided a method for encoding light, including: projecting incident light onto a code drum as the code drum rotates about an axis, such that light transmitted through the code drum is incident on an optical imaging projection lens, resulting in the production of structured light in a region downfield of the code drum and the optical imaging projection lens; wherein the code drum includes a plurality of hybrid cyclic binary code (HCBC) patterns, the plurality of HCBC patterns including a plurality of weighted numbering system multiple period patterns and a plurality of unweighted numbering system common period patterns and each of the plurality of HCBC patterns are configured such that the structured light includes a sequence of binary bar patterns on a surface of an object being measured.

Example 76

This example includes any or all of the features of example 75, wherein the code drum further includes a first optical transmission reference feature and second optical transmission reference feature, wherein: the first optical transmission reference feature is configured to transmit a first amount of said incident light; the second optical transmission reference feature is configured to transmit a second amount of said incident light; and said second amount of light is about 50% of said first amount.

Example 77

This example includes any or all of the features of example 75, wherein the code drum includes a shell, the shell having an inner surface and an outer surface, wherein the plurality of HCBC patterns are disposed on or within at least one of the inner surface and the outer surface.

Example 78

This example includes any or all of the features of example 75, wherein the code drum is cylindrical.

Example 79

This example includes any or all of the features of example 76, wherein: the code drum includes a shell, the shell including an inner surface, an outer surface, and one or more reference retention features; and the first and second optical transmission reference features are disposed within the one or more reference retention features.

Example 80

This example includes any or all of the features of example 75, wherein: the shell has a shell thickness; and the one or more optical transmission reference retention features extend fully or partially through the shell thickness.

Example 81

This example includes any or all of the features of example 76, wherein the first optical transmission reference feature is formed at least in part of a first material and the second optical transmission reference feature is formed at least in part of a second material, the second material being different from the first material.

Other than in the examples, or where otherwise indicated, all numbers expressing endpoints of ranges, and so forth used in the specification and claims are to be understood as being modified in all instances by the term "about," wherein about means+/−5% of an indicated value. Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the present disclosure are approximations, unless otherwise indicated the numerical values set forth in the specific examples are reported as precisely as possible. Any numerical value, however, inherently contains certain errors necessarily resulting from the standard deviation found in their respective testing measurements.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A non-contact coordinate measurement machine, comprising:
    an optical assembly comprising a structured light projector, at least one optical sensor, and a controller, wherein:
        the structured light projector comprises:
            a light source; and
            a code drum comprising a plurality of hybrid cyclic binary code (HCBC) patterns, the plurality of HCBC patterns including a plurality of weighted numbering system multiple period patterns and a plurality of unweighted numbering system common period patterns; and
            an optical imaging projector lens;
        the controller is configured to cause the light source to project incident light onto the code drum as the code drum rotates about an axis;
        the code drum and optical imaging projector lens are configured to produce structured light from the incident light thereon, the structured light to be incident on a surface of an object being measured;
        the at least one optical sensor is to measure reflected structured light from the surface of the object being measured and to produce a plurality of measurement signals, the plurality of measurement signals being related to positional coordinates of at least one point on the surface of an object being measured;
        the code drum comprises a shell, the shell having an inner surface and an outer surface; and
        said plurality of HCBC patterns are disposed on or within at least one of said inner surface and said outer surface.

2. The non-contact coordinate measuring machine of claim 1, wherein:

the code drum comprises a first optical transmission reference feature and a second optical transmission reference feature;

the first optical transmission reference feature is configured to transmit a first amount of said incident light; and the second optical transmission reference feature is configured to transmit a second amount of said incident light, wherein said second amount is about 50% of said first amount.

3. The non-contact coordinate measurement machine of claim 2, further comprising a light source sensor, the light source sensor configured to detect an intensity of a light output from said light source, and to output a light source sensor signal sequence to said controller, wherein said controller is configured to utilize said light source sensor signal sequence to normalize said plurality of measurement signals.

4. The non-contact coordinate measurement machine of claim 2, wherein:

the code drum further comprises at least one optical transmission reference retention feature; and at least said first and second optical transmission reference features are disposed within said optical transmission reference retention features.

5. The non-contact coordinate measurement machine of claim 1, wherein said plurality of HCBC patterns are configured to generate a sequence of binary bar patterns on the surface of the object being measured.

6. The non-contact coordinate measurement machine of claim 5, wherein an optical transmission of each of said sequence of binary bar patterns is associated with a characteristic binary square wave optical transmission waveform specified by a waveform period and a waveform offset from a common position reference.

7. The non-contact coordinate measurement machine of claim 6, wherein each of said plurality of binary bar patterns has a square wave optical transmission waveform that is offset in position with respect to the common position reference.

8. A method for measuring positional coordinates of a surface of an object being measured with a non-contact coordinate measurement machine, comprising:

causing a light source of a structured light projector to project incident light onto a code drum as the code drum rotates about an axis, so as, in concert with an optical imaging projector lens, to produce structured light and non-structured light in a region downfield of the code drum, such that the structured light and non-structured light is incident on a surface of the object being measured;

measuring, with at least one optical sensor, reflected structured light and non-structured light from the surface of the object being measured;

producing a measurement signal sequence based at least in part on the measured reflected structured light and non-structured light;

transmitting the measurement signal sequence to a controller of the structured light projector and the at least one optical sensor, the controller comprising a processor and a memory; and processing the measurement signal sequence to determine positional coordinates on the surface of the object being measured;

wherein:

the code drum comprises a plurality of hybrid cyclic binary code (HCBC) patterns the plurality of HCBC patterns including a plurality of weighted numbering system multiple period patterns and a plurality of unweighted numbering system common period patterns;

the code drum comprises a shell, the shell having an inner surface and an outer surface; and said plurality of HCBC patterns are disposed on or within at least one of said inner surface and said outer surface.

9. The method of claim 8, wherein:

the code drum further comprises a first optical transmission reference feature and a second optical transmission reference feature;

the first optical transmission reference feature is configured to transmit a first amount of said incident light; and the second optical transmission reference feature is configured to transmit a second amount of said incident light, wherein the second amount of incident light is about 50% of the first amount of incident light.

10. The method of claim 9, wherein said structured light is configured to generate a sequence of binary bar patterns on the surface of the object being measured.

11. The method of claim 10, wherein:

each of said unweighted numbering system common period patterns and each of said weighted numbering system multiple period patters are configured to produce a respective one binary bar pattern in said sequence of binary bar patterns, relative to a common position reference; and each binary bar pattern in said sequence is waveform offset relative to each other binary bar pattern in said sequence of binary bar patterns and the common position reference.

12. The method of claim 11, wherein each binary bar pattern in said sequence of binary bar patterns has a square wave optical transmission waveform that is offset with respect to the common position reference.

13. The method of claim 8, wherein causing the light source to project incident light onto said code drum comprises causing said light source to project light such that at least a portion of the incident light is incident on the inner surface.

14. The method of claim 8, further comprising:

detecting an intensity of a light output from the light source;

generating a light source sensor signal sequence; and normalizing, with said controller, said plurality of measurement signals based at least in part on said light source sensor signal sequence.

15. A code drum for encoding light, comprising:

a plurality of hybrid cyclic binary code (HCBC) patterns, the HCBC patterns including a plurality of weighted numbering system multiple period patterns and a plurality of unweighted numbering system common period patterns;

wherein:

said code drum is configured, in concert with an optical imaging projection lens, to convert incoherent light incident thereon to structured light as said code drum rotates about an axis; and each of said plurality of HCBC patterns are configured such that said structured light comprises a sequence of binary bar patterns;

the code drum comprises a shell, the shell having an inner surface and an outer surface; and said plurality of HCBC patterns are disposed on or within at least one of said inner surface and said outer surface.

16. The code drum of claim 15, further comprising a first optical transmission reference feature and second optical transmission reference feature, wherein:
- the first optical transmission reference feature is configured to transmit a first amount of said incident light;
- the second optical transmission reference feature is configured to transmit a second amount of said incident light; and
- said second amount of light is about 50% of said first amount.

17. The code drum of claim 16, wherein:
- the code drum further comprises one or more reference retention features; and
- at least said first and said second optical transmission reference features are disposed within said one or more reference retention features.

18. The code drum of claim 15, wherein:
- each of said unweighted numbering system common period patterns is configured to produce a respective one of the plurality of binary bar patterns in said sequence of binary bar patterns, relative to a common position reference; and
- each of the plurality of binary bar patterns has a waveform offset relative to one another and the common position reference.

19. The code drum of claim 18, wherein each of said plurality of binary bar patterns has a square wave optical transmission waveform that has an offset distance with respect to the common position reference.

20. A method for encoding light, comprising:
- causing light to be incident onto a surface of a code drum as the code drum rotates about an axis, such that light transmitted through the code drum is incident on an optical imaging projection lens, resulting in the production of structured light in a region downfield of the code drum and the optical imaging projection lens;

wherein:
- the code drum comprises a plurality of hybrid cyclic binary code (HCBC) patterns, the plurality of HCBC patterns including a plurality of weighted numbering system patterns and a plurality of unweighted numbering system common period patterns;
- each of said plurality of HCBC patterns are configured such that said structured light comprises a sequence of binary bar patterns;
- the code drum comprises a shell, the shell having an inner surface and an outer surface; and
- said plurality of HCBC patterns are disposed on or within at least one of said inner surface and said outer surface.

21. The method of claim 20, wherein:
- the code drum further comprises a first optical transmission reference feature and second optical transmission reference feature;
- the first optical transmission reference feature is configured to transmit a first amount of said incident light;
- the second optical transmission reference feature is configured to transmit a second amount of said incident light; and
- said second amount of light is about 50% of said first amount.

22. The method of claim 20, wherein:
- the code drum further comprises-at least one optical transmission reference retention feature; and
- at least said first and second optical transmission reference features are disposed within said at least one optical transmission reference retention features.

23. The method of claim 20, wherein
- each of said unweighted numbering system common period patterns is configured to produce a respective one of the plurality of binary bar patterns in said sequence of binary bar patterns, relative to a common position reference; and
- each of the plurality of binary bar patterns are waveform offset relative to one another and the common position reference.

24. The method of claim 23, wherein each of said plurality of binary bar patterns has a square wave optical transmission waveform that has a position offset magnitude relative to the common position reference.

\* \* \* \* \*

UNITED STATES PATENT AND TRADEMARK OFFICE
CERTIFICATE OF CORRECTION

PATENT NO.          : 10,429,183 B2
APPLICATION NO.     : 15/711238
DATED               : October 1, 2019
INVENTOR(S)         : Philip M. Johnson Page 1 of 1

It is certified that error appears in the above-identified patent and that said Letters Patent is hereby corrected as shown below:

In the Claims

In Column 80, Line 66, in Claim 2, delete "measuring machine" and insert -- measurement machine --, therefor.

In Column 84, Line 22, in Claim 22, delete "comprises-at" and insert -- comprises at --, therefor.

Signed and Sealed this
Third Day of December, 2019

Andrei Iancu
*Director of the United States Patent and Trademark Office*